US010453454B2

(12) United States Patent
Homma et al.

(10) Patent No.: US 10,453,454 B2
(45) Date of Patent: Oct. 22, 2019

(54) DIALOG SYSTEM WITH SELF-LEARNING NATURAL LANGUAGE UNDERSTANDING

(71) Applicant: Hitachi, Ltd., Chiyoda-ku, Tokyo (JP)

(72) Inventors: Takeshi Homma, San Jose, CA (US); Masahito Togami, Mountain View, CA (US)

(73) Assignee: HITACHI, LTD., Tokyo (JP)

( * ) Notice: Subject to any disclaimer, the term of this patent is extended or adjusted under 35 U.S.C. 154(b) by 42 days.

(21) Appl. No.: 15/794,825

(22) Filed: Oct. 26, 2017

(65) Prior Publication Data

US 2019/0130904 A1 May 2, 2019

(51) Int. Cl.

| | |
|---|---|
| ***G10L 15/22*** | (2006.01) |
| ***G10L 15/06*** | (2013.01) |
| ***G06F 17/27*** | (2006.01) |
| ***G10L 15/18*** | (2013.01) |
| ***G10L 15/30*** | (2013.01) |
| ***G06F 16/332*** | (2019.01) |
| ***G06N 20/00*** | (2019.01) |
| ***G06N 3/02*** | (2006.01) |
| ***G10L 13/08*** | (2013.01) |

(Continued)

(52) U.S. Cl.

CPC .......... *G10L 15/22* (2013.01); *G06F 16/3329* (2019.01); *G06F 17/2785* (2013.01); *G06N 3/02* (2013.01); *G06N 20/00* (2019.01); *G10L 13/08* (2013.01); *G10L 15/063* (2013.01); *G10L 15/18* (2013.01); *G10L 15/26* (2013.01); *G10L 15/30* (2013.01); *G10L 15/065* (2013.01); *G10L 2015/0635* (2013.01); *G10L 2015/081* (2013.01); *G10L 2015/223* (2013.01); *G10L 2015/225* (2013.01)

(58) Field of Classification Search

CPC ................................ G10L 15/22; G10L 15/30

See application file for complete search history.

(56) References Cited

U.S. PATENT DOCUMENTS

| | | | | |
|---|---|---|---|---|
| 7,203,646 | B2 * | 4/2007 | Bennett | G06F 17/2775 704/257 |
| 8,332,226 | B1 * | 12/2012 | Rahim | G10L 15/30 704/231 |

(Continued)

OTHER PUBLICATIONS

Fujita, Y., et al., Unified ASR System Using LGM-Based Source Separation, Noise-Robust Feature Extraction, and Word Hypothesis Selection, Dec. 13-17, 2015, Scottsdale AZ, 2015 IEEE Workshop, 7 pages.

Mikolove, T., et al. Efficient Estimation of Word Representations in Vector Space, 2013, Cornell University, 12 pages.

(Continued)

*Primary Examiner* — Jialong He

(74) *Attorney, Agent, or Firm* — Procopio, Cory, Hargreaves & Savitch LLP

(57) ABSTRACT

Example implementations described herein are directed to a dialog system with self-learning natural language understanding (NLU), involving a client-server configuration. If the NLU results in the client is not confident, the NLU will be done again in the server. In the dialog system, the human user and the system communicate via speech or text information. The examples of such products include robots, interactive voice response system (IVR) for call centers, voice-enabled personal devices, car navigation system, smart phones, and voice input devices in the work environments where the human operator cannot operate the devices by hands.

19 Claims, 37 Drawing Sheets

(51) Int. Cl.

| | |
|---|---|
| ***G10L 15/26*** | (2006.01) |
| *G10L 15/065* | (2013.01) |
| *G10L 15/08* | (2006.01) |

(56) References Cited

U.S. PATENT DOCUMENTS

| | | | | |
|---|---|---|---|---|
| 8,484,031 | B1 * | 7/2013 | Yeracaris | G10L 15/30 704/270.1 |
| 8,601,030 | B2 * | 12/2013 | Bagchi | G06F 16/3329 707/802 |
| 8,892,439 | B2 * | 11/2014 | Odell | G10L 15/30 704/251 |
| 9,009,046 | B1 * | 4/2015 | Stewart | G10L 15/18 704/251 |
| 2002/0143551 | A1 * | 10/2002 | Sharma | G10L 15/30 704/270.1 |
| 2004/0111253 | A1 * | 6/2004 | Luo | G06F 17/2715 704/4 |
| 2006/0149555 | A1 | 7/2006 | Fabbrizio et al. | |
| 2011/0112827 | A1 | 5/2011 | Kennewick et al. | |
| 2012/0253789 | A1 * | 10/2012 | Heck | G10L 15/1822 704/9 |
| 2013/0085753 | A1 * | 4/2013 | Bringert | G10L 15/32 704/233 |
| 2013/0151250 | A1 * | 6/2013 | VanBlon | G10L 15/32 704/235 |
| 2014/0136183 | A1 * | 5/2014 | Hebert | G06F 17/30654 704/9 |
| 2014/0288932 | A1 * | 9/2014 | Yeracaris | G10L 15/30 704/249 |
| 2015/0039317 | A1 * | 2/2015 | Klein | G10L 15/22 704/275 |
| 2016/0037311 | A1 * | 2/2016 | Cho | G06Q 10/00 455/466 |
| 2016/0098393 | A1 * | 4/2016 | Hebert | G06F 17/28 704/9 |
| 2017/0169013 | A1 * | 6/2017 | Sarikaya | G06F 17/28 |
| 2017/0213545 | A1 | 7/2017 | Kwon et al. | |

OTHER PUBLICATIONS

Higashinaka, R., et al.,The Dialogue Breakdown Detection Challenge: Task Description, Datasets, and Evaluation Metrics, 10th edition of the Language Resources and Evaluation Conference, May 23-28, 2016, Portorož (Slovenia), 5 pages.

Vinyals, O., et al., A Neural Conversational Model, ICML Deep Learning Workshop 2015, 8 pages.

Clarke, J. et al., Global Inference for Sentence Compression an Integer Linear Programming Approach, Journal of Artificial Intelligence Research, 2008, 31 pages.

Bordes, A. et al., Learning End-To-End Goal-Oriented Dialog, 5th International Conference on Learning Representations, 2017, 15 pages.

Mohiri, M. et al., Weighted finite-state transducers in speech recognition, In Computer Speech & Language, vol. 16, Issue 1, 2002, pp. 69-88, ISSN 0885-2308, https://doi.org/10.1006/csla.2001.0184.

Yao, K. et al., Recurrent Neural Networks for Language Understanding, in Interspeech, 2013 (pp. 2542-2528).

Serban, I. et al., Building End-To-End Dialogue Systems Using Generative Hierarchical Neural Network Models by Serban et al., In AAAI, Feb. 12, 2016 (pp. 3776-3784).

Ferreira, E. et al., Zero-shot semantic parser for spoken language understanding, Sixteenth Annual Conference of the International Speech Communication Association, 2015, 5 pages.

Fiscus, J., A Post-Processing System to Yield Reduced Word Error Rates: Recognizer Output Voting Error Reduction (ROVER), In Automatic Speech Recognition and Understanding, 1997. Proceedings., 1997 IEEE Workshop on (pp. 347-354).

Ferreira, E. et al., Online Adaptative Zero-Shot Learning Spoken Language Understanding Using Word-Embedding in Acoustics, Speech and Signal Processing (ICASSP), 2015 IEEE International Conference on (pp. 5321-5325).

Nio, L. et al., Neural Network Approaches to Dialog Response Retrieval and Generation, IEICE Transactions on Information and Systems 99, No. 10 (2016): 2508-2517.

Forsyth, E. et al., NPS Chat—http://faculty.nps.edu/cmartell/NPSChat.htm, (last accessed Oct. 25, 2017).

Alice—http://alice.pandorabots.com,(last accessed Sep. 20, 2017).

Stanford NLP Parser—https://nlp.stanford.edu/software/lex-parser.shtml, (last accessed Oct. 25, 2017).

Extended European Search Report for related European Application No. 18193107.2 , dated Feb. 22, 2019; 15 pages.

* cited by examiner

6010

Seed (Dialog Act vs. Chunk Table)

| Dialog Act (6020) | Chunk (6030) | Relevance Value (6040) | Positive Feedback (6050) | Negative Feedback (6060) | Fixed Flag (6062) | Vote Count (6064) |
|---|---|---|---|---|---|---|
| *affirm()* | yes | | | | | |
| | okay | | | | | |
| *inform(area=north)* | north | | | | | |
| | north area | 0.9 | | | | |
| *inform(food=chinese)* | chinese | | | | | |
| | chinese food | | | | | |
| *inform(food=asian oriental)* | asian oriental | | | | | |
| | asian oriental food | | | | | |
| ... | ... | | | | | |

6070

Semantic Space

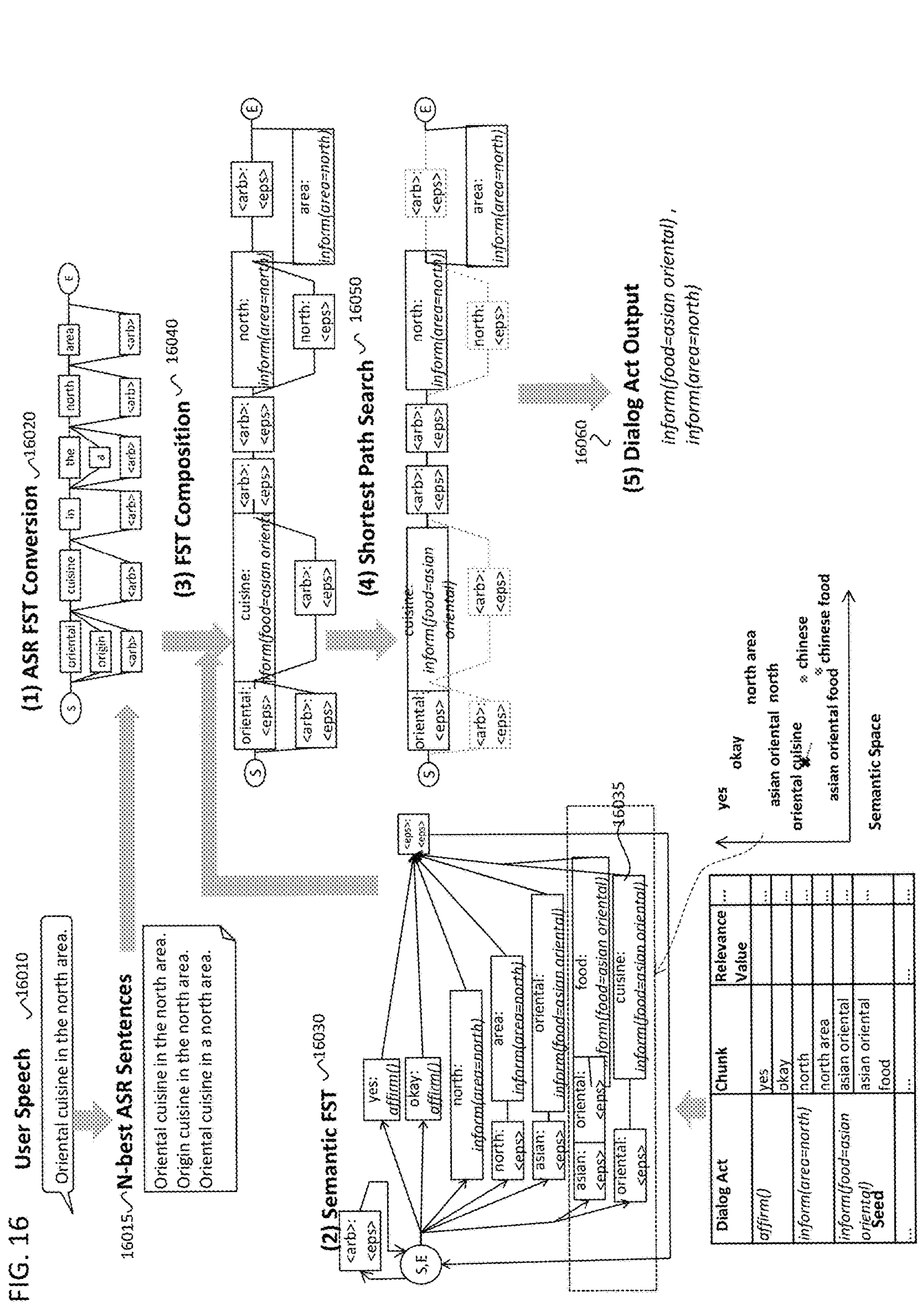
FIG. 16
User Speech 16010
Oriental cuisine in the north area.
16015 N-best ASR Sentences
Oriental cuisine in the north area.
Origin cuisine in the north area.
Oriental cuisine in a north area.
(1) ASR FST Conversion 16020
(2) Semantic FST 16030
16035
(3) FST Composition 16040
(4) Shortest Path Search 16050
16060
(5) Dialog Act Output
inform(food=asian oriental),
inform(area=north)
Dialog Act
Chunk
Relevance Value
affirm()
yes
okay
inform(area=north)
north
north area
inform(food=asian oriental)
asian oriental
asian oriental food
Seed
Semantic Space
chinese
chinese food

FIG. 17

Training Data

17010 17020 17030

| Sentence | Dialog Act | Word-level Dialog Act |
|---|---|---|
| north | *inform(area=north)* | north *inform(area=north)* |
| what is the phone number | *request(slot=phone)* | what is the / phone number *request(slot=phone)* |
| persian | *inform(food=persian)* | persian *inform(food=persian)* |
| is there anything else | *reqalts()* | is there anything else *reqalts()* |
| what's their address and phone number | *request(slot=addr), request(slot=phone)* | what's their / address *request(slot=addr)* / and / phone number *request(slot=phone)* |
| uh yes a cheap restaurant | *affirm(), inform(pricerange=cheap)* | uh yes *affirm()* / a / cheap *inform(pricerange=cheap)* / restaurant |
| ... | ... | ... |

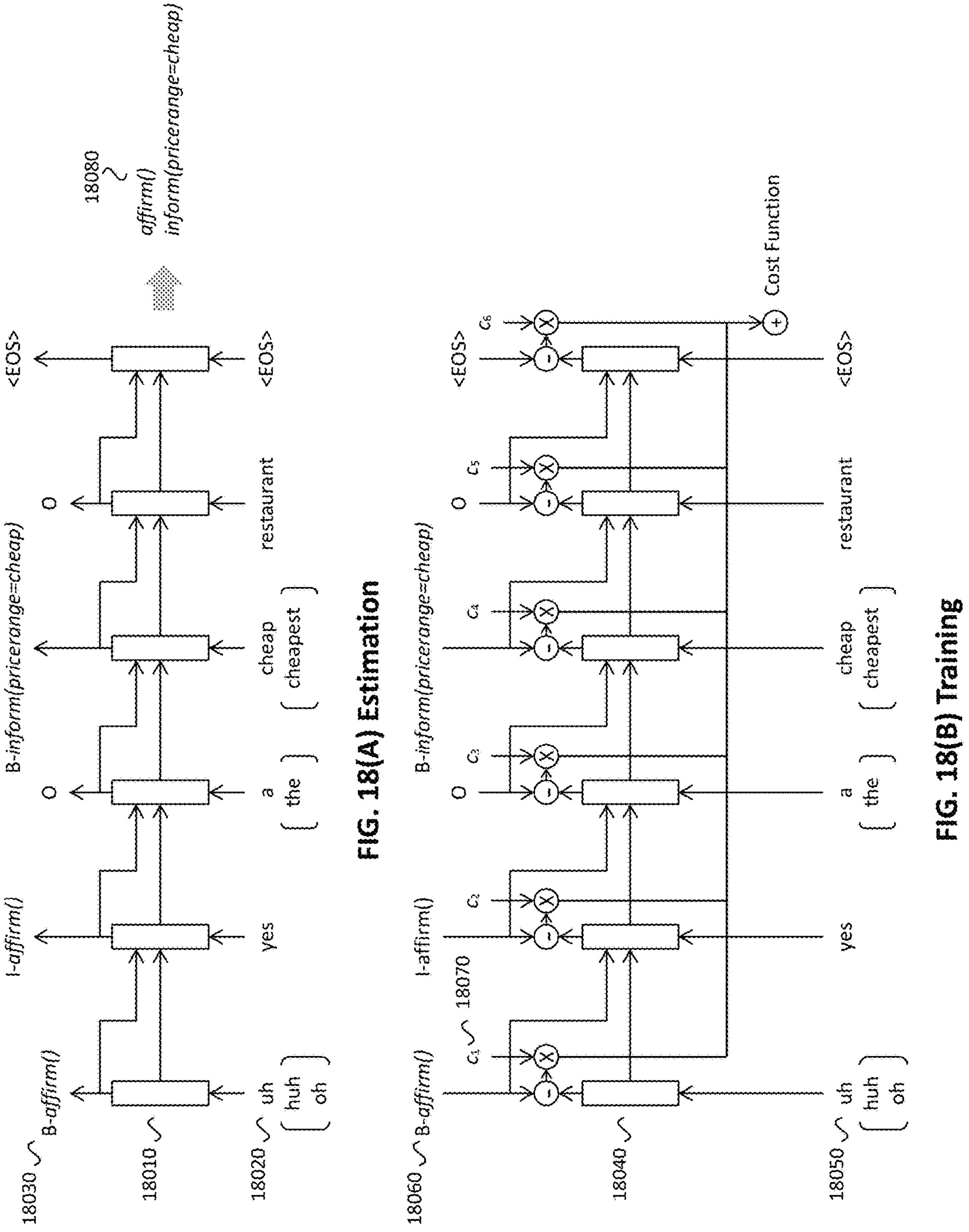
FIG. 18(A) Estimation
FIG. 18(B) Training

FIG. 24

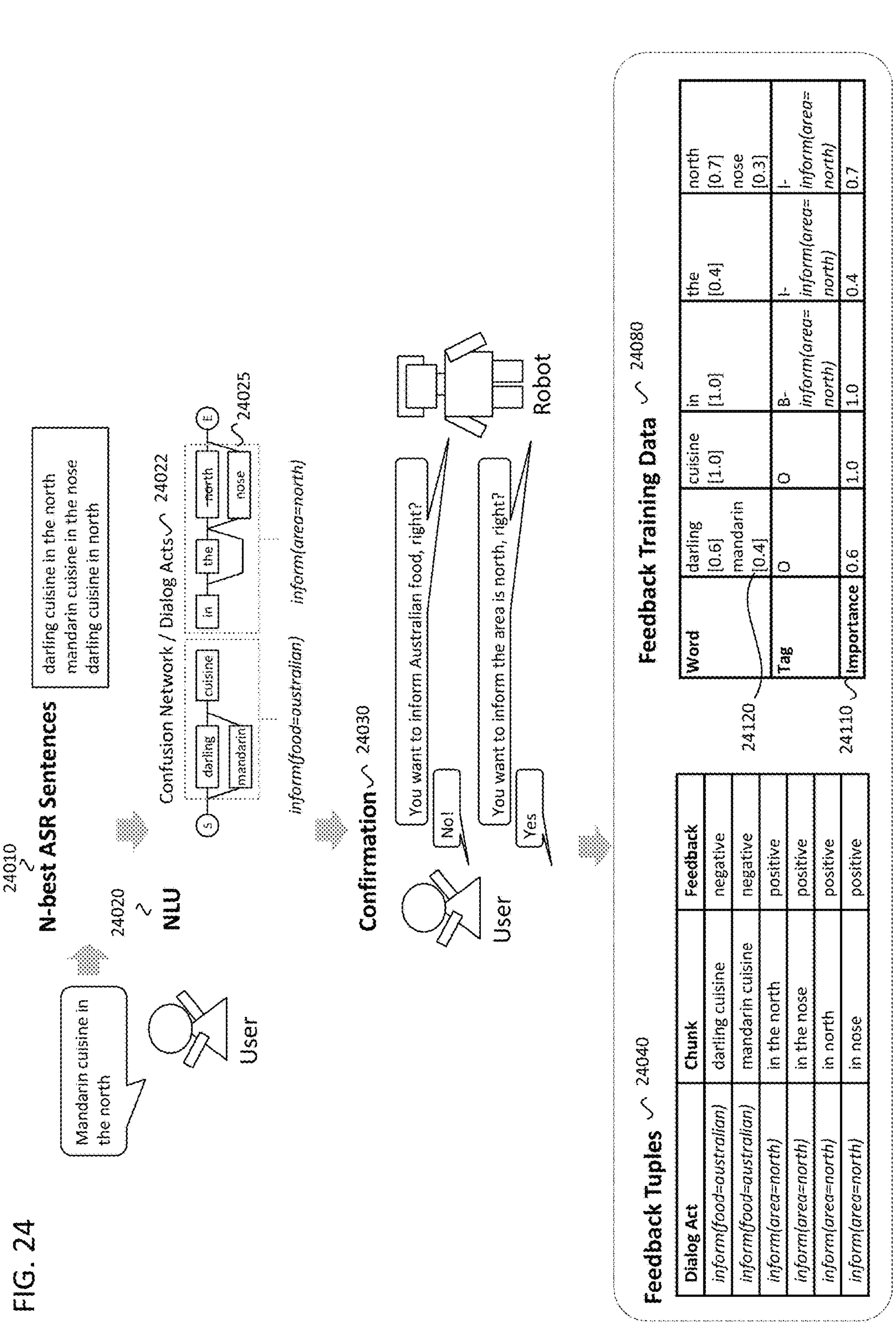

| Dialog Act | Chunk | Feedback |
|---|---|---|
| *inform(food=australian)* | darling cuisine | negative |
| *inform(food=australian)* | mandarin cuisine | negative |
| *inform(area=north)* | in the north | positive |
| *inform(area=north)* | in the nose | positive |
| *inform(area=north)* | in north | positive |
| *inform(area=north)* | in nose | positive |

| **Word** | darling [0.6] mandarin [0.4] | cuisine [1.0] | in [1.0] | the [0.4] | north [0.7] nose [0.3] |
|---|---|---|---|---|---|
| **Tag** | O | O | B-*inform(area=north)* | I-*inform(area=north)* | I-*inform(area=north)* |
| **Importance** | 0.6 | 1.0 | 1.0 | 0.4 | 0.7 |

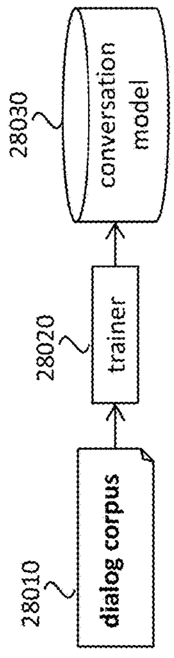
FIG. 28(a) - Training
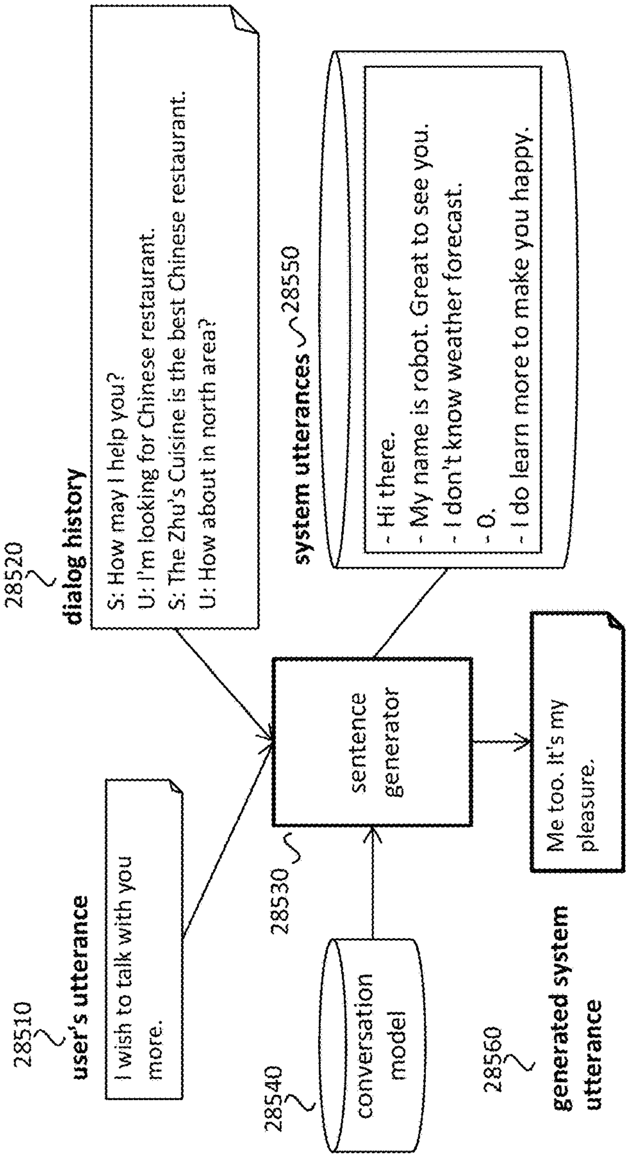
FIG. 28(b) - Sentence Generation

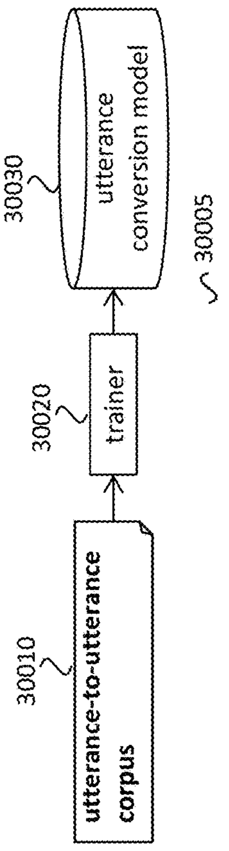
FIG. 30(a) Training
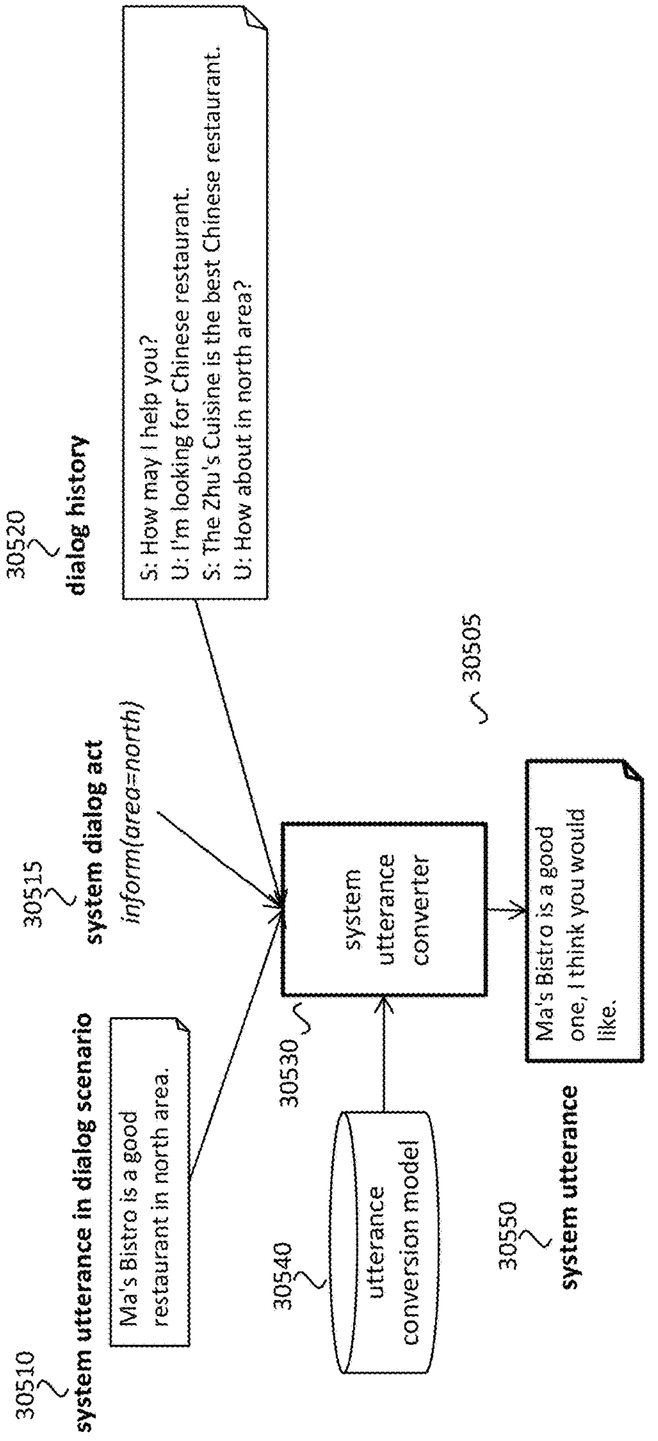
FIG. 30(B) System Utterance Conversion

FIG. 31

Utterance-to-utterance Corpus

31010 31020 31030

| Regular Utterance | System Dialog Act | Rewritten Utterance |
|---|---|---|
| (Name) is a good restaurant in north area. | *inform(area=north)* | (Name) is a good one. I think you like |
| What kind of food would you like? | *request(slot=food)* | what kind of food do you want to take? |
| You are looking for a restaurant is that right? | *confirm-domain()* | Do you like restaurants in that category? |
| ... | ... | ... |

DIALOG SYSTEM WITH SELF-LEARNING NATURAL LANGUAGE UNDERSTANDING

BACKGROUND

Field

The present disclosure is related generally to dialog systems, and more specifically, to dialog systems that can learn natural language understanding (NLU) models from actual user-system dialog logs.

Related Art

Related art implementations involve an NLU algorithm utilizing finite state transducers, where the NLU model is updated and improved automatically by using user responses on the NLU results (i.e. self-learning NLU). In conjunction, related art implementations can involve a dialog system that is maintained by utilizing a "dialog breakdown" detector. The dialog breakdown detector detects a situation where the user cannot proceed through the conversation with the dialog system. The dialog breakdown detector also identifies the reason of dialog breakdown, which can involve NLU errors, automatic speech recognition (ASR) errors, dialog control errors, and so on. The identified reasons are added to the dialog logs. In related art implementations, the human maintainers can choose the dialog logs of interest, and that can improve NLU models or other programs/data relating to the dialog system in order to avoid dialog breakdowns in future human-system conversations.

In the related art, there is a dialog system that detects NLU errors automatically. If the dialog system detects an NLU error, then the system outputs an utterance that confirms to the user whether NLU results are correct. If the user indicates that the NLU results are wrong, then the system connects the user with a human operator so that the user can interact with the human operator directly to accomplish the user tasks.

BRIEF DESCRIPTION OF DRAWINGS

FIG. 16 illustrates an FST conversion model, in accordance with an example implementation.

FIG. 17 shows the training data for RNN-based NLU, in accordance with an example implementation.

FIGS. 18(*a*) and 18(*b*) illustrate recurrent neural networks (RNN) and its use of training and estimation, in accordance with an example implementation.

FIG. 24 illustrates how to generate feedback information from N-best ASR outputs, in accordance with an example implementation.

FIGS. 28(*a*) and 28(*b*) illustrate a system diagram for the system dialog utterance system, in accordance with an example implementation.

FIGS. 30(*a*) and 30(*b*) illustrate the processes of the utterance conversion, in accordance with an example implementation.

FIG. 31 illustrates utterance-to-utterance corpus for the training, in accordance with an example implementation.

SUMMARY

Figure 1:
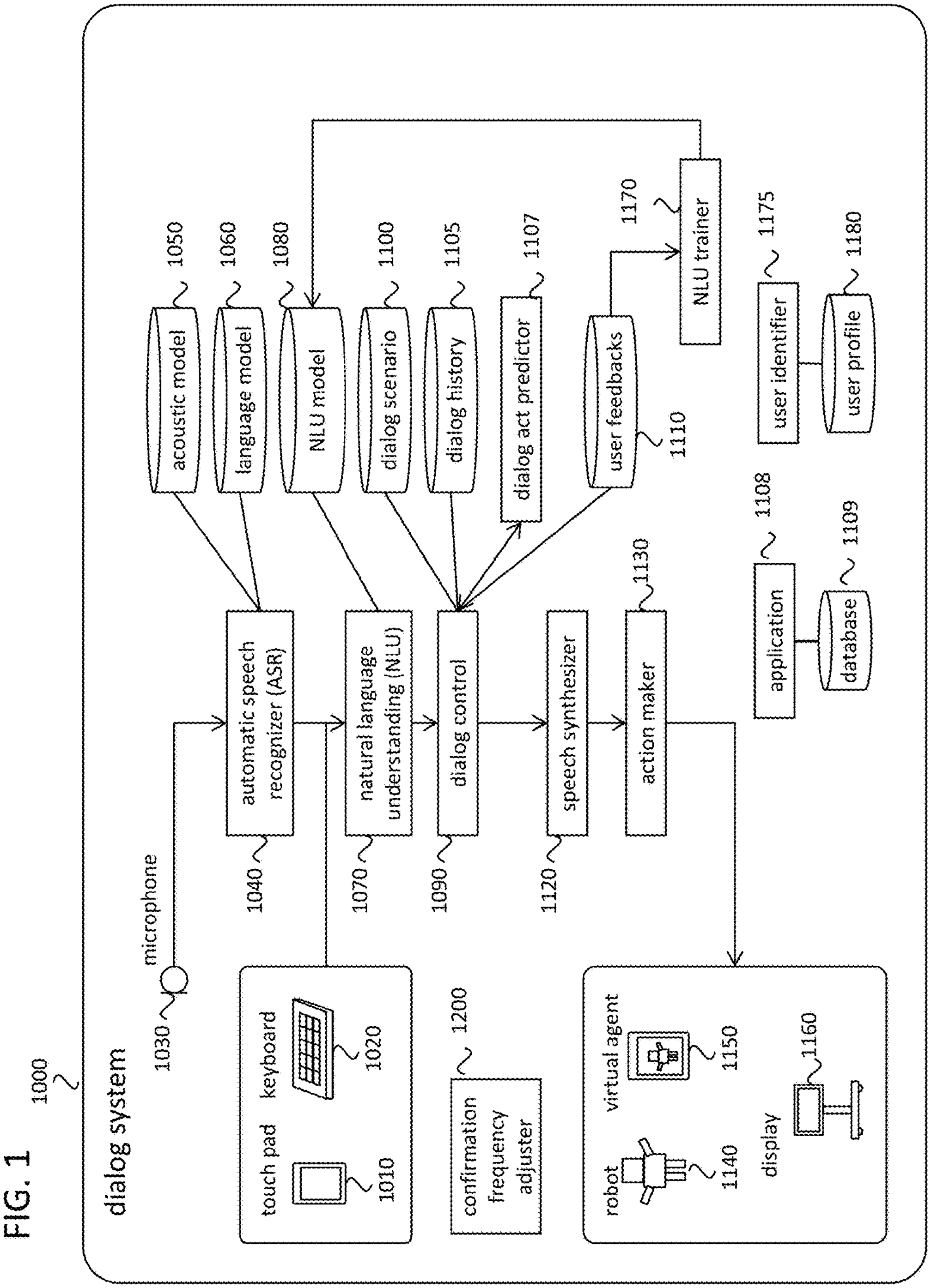
FIG. 1 illustrates the components of the dialog system in accordance with an example implementation.

Dialog systems sometimes face on the situation where the NLU module in the dialog system fails to understand the user utterance due to the limited knowledge stored in the dialog system. Even though the dialog system can update its NLU module automatically by utilizing the actual user responses, it is also difficult for the dialog system to know the correct NLU result from the limited user response and the limited knowledge.

If a server is utilized, richer knowledge than the dialog system (i.e. client side) can be provided to accomplish more precise NLU process on the user utterances and the user feedbacks. In addition, the server can gather the user feedback and dialog logs from many dialog systems connecting to the server. Therefore, such an implementation can improve NLU by utilizing such a variety of information.

Therefore, the server may help ongoing dialogs in the client-side dialog system especially when the self-learning NLU will be incorporated. However, it is not straightforward to integrate the dialog systems at the client side and the server side. Example implementations described herein address such limitations as follows.

1) Timing control when the dialog system accesses to the cloud server. The server has more knowledge than the dialog systems, thus the server has a higher possibility to provide correct NLU results than the dialog system. However, if the dialog system accesses the server each time the user says something, the response time from the user utterance to the system utterance becomes longer due to limitation of network speed. Longer response time causes the user dissatisfaction on the conversation. To address this limitation, example implementations determine optimal timings when the dialog system should ask to the server based on the dialog history (dialog logs) and the NLU results in the dialog system.

2) Updating NLU knowledge on the dialog system by using update information sent from the server. The cloud server manages a large dialog history obtained from many dialog systems. Therefore, the information for NLU updates generated in the server can improve the NLU accuracy of the dialog system. However, NLU accuracy degradation may occur for specific users. Because the NLU update information from the server may overwrite the NLU rules in the dialog system that specific users prefer, the dialog system may suddenly become unable to understand the user utterances that such specific users had been previously uttering to the dialog system, which is a degradation in user experience. Example implementations avoid such NLU degradation while improving NLU accuracies by utilizing NLU updating information provided by the server.

3) Managing uncertainty of user feedback. The user feedback obtained during actual human-machine conversations contains useful information for improving NLU models. The user feedback, however, can also contain improper feedback that are not useful or cause degradation in the form of NLU accuracies. Therefore, user feedback information should be evaluated in terms of degree of certainty. Example implementations estimate the reliability of user feedback, and determine how to utilize such user feedback for improvement of NLU models.

Aspects of the present disclosure can include a method for a dialog system including a client device configured with a text input method to receive user input, and a first natural language understanding (NLU) model configured to communicate with the server, the user input involving at least one of text input typed by the user or Automatic Speech Recognition (ASR) output obtained from the user speech, and a server managing a second NLU model, wherein the first NLU model and the second NLU model are different. The method may involve determining NLU results of an input dialog at the client device from applying the first NLU model; for a confidence score of the NLU results obtained from applying the first NLU model not meeting a threshold, having the client device access the server to execute an NLU process by using the second NLU model on the input dialog; and for the confidence score of the NLU results obtained from applying the first NLU model meeting the threshold, having the client device execute actions based on the NLU results obtained from applying the first NLU model.

Aspects of the present disclosure can include a non-transitory computer readable medium storing instructions for a dialog system including a client device configured with a text input method to receive user input, and a first natural language understanding (NLU) model configured to communicate with the server, the user input involving at least one of text input typed by the user or Automatic Speech Recognition (ASR) output obtained from the user speech, and a server managing a second NLU model, wherein the first NLU model and the second NLU model are different. The instructions may involve determining NLU results of an input dialog at the client device from applying the first NLU model; for a confidence score of the NLU results obtained from applying the first NLU model not meeting a threshold, having the client device access the server to execute an NLU process by using the second NLU model on the input dialog; and for the confidence score of the NLU results obtained from applying the first NLU model meeting the threshold, having the client device execute actions based on the NLU results obtained from applying the first NLU model.

DETAILED DESCRIPTION

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

In a first example implementation, there is a dialog system configuration that utilizes finite state transducer (FST)-based NLU.

(1) Components of Dialog System and Cloud Server

FIG. 1 illustrates the components of the dialog system 1000 in accordance with an example implementation. Input interfaces such as the touch pad 1010 and the keyboard 1020 can be utilized to receive user input. Microphone 1030 receives the user speech. The automatic speech recognizer (ASR) 1040 converts the sound signal of the user utterance obtained by the microphone to a text. The acoustic model 1050 and the language model 1060 contain data that is utilized in the ASR. The dialog system 100 can receive the user input from either speech or typing. In example implementations described herein, the text of user input is referred to as an "utterance", regardless of whether the underlying input is by speech or typing. The natural language understanding module (NLU) 1070 converts the utterance to dialog acts. The dialog act expresses what the user wants to do by communicating with the dialog system 1000. In an example implementation, suppose that the dialog system is made for restaurant information guidance to the user. Below are some examples of the user utterance and corresponding dialog acts.

| Utterance | Dialog Acts | Meaning of Dialog Act |
|---|---|---|
| I want to know restaurants in the north | inform (area = north) | The user informs the area should be north. |
| I want to know Chinese restaurants | inform (food = chinese) | The user informs the food type should be Chinese. |
| Can I see more options? | reqalts ( ) | The user requests alternative restaurant options. |

One utterance may have not only one dialog act but also multiple dialog acts. For example, if user utters "1 want to know Chinese restaurants in the north," the utterance contains two dialog acts: inform(food=chinese) and inform (area=north). The right portion from the equal symbol (i.e. "north" in "area=north") is hereinafter referred to as the "value." In example implementations described herein, the dialog acts are presumed to be predefined, however, the present disclosure is not limited thereto. For example, the values of the dialog acts can be derived from the corresponding uttered words by copying the corresponding word to the value, or other word-to-value conversion methods using any other desired implementation.

The NLU model 1080 contains data that is necessary to achieve NLU. The type of NLU model is determined on the NLU algorithm that the system adopts. In the first example implementation, the NLU algorithm is based on the FST.

Figure 2:
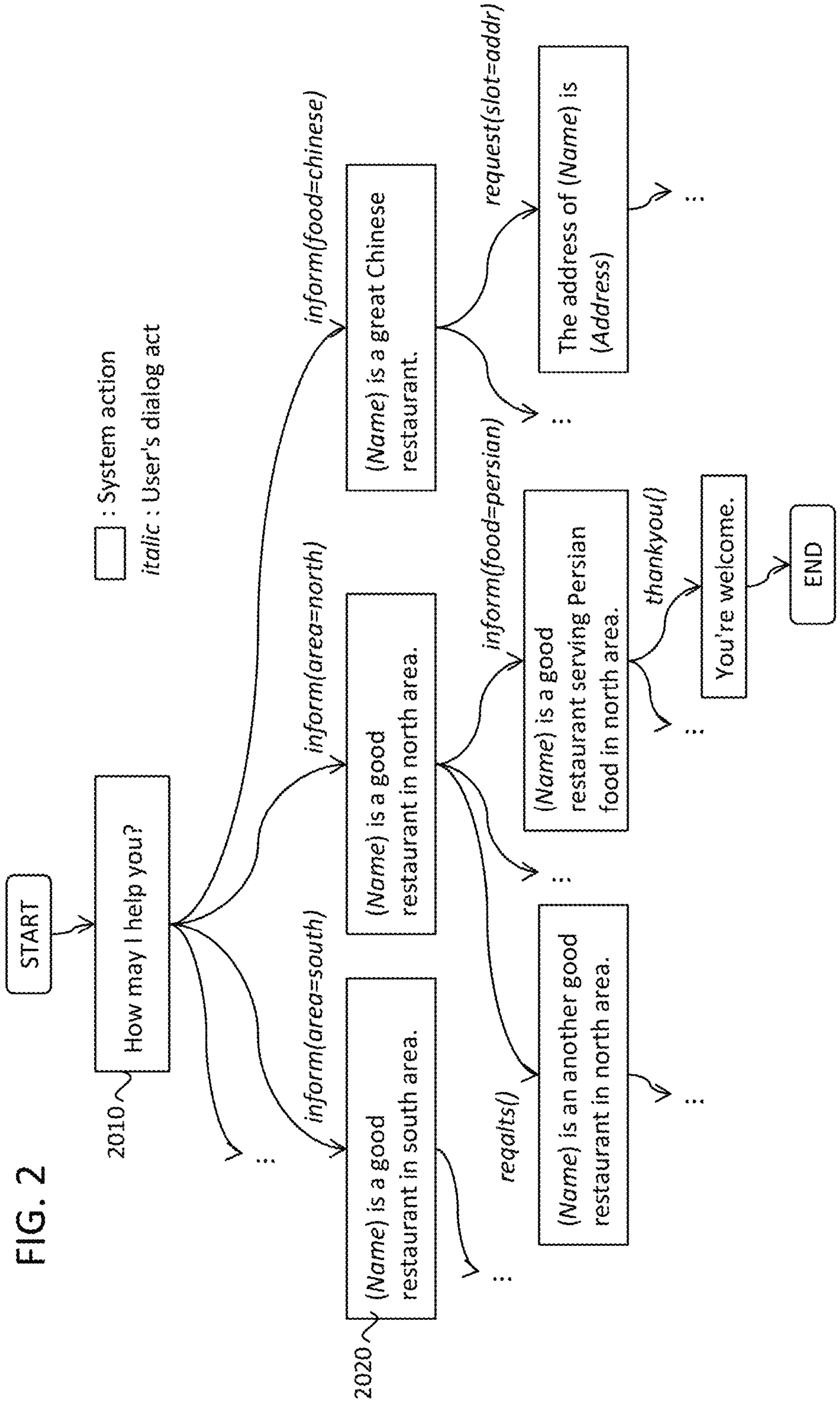
FIG. 2 illustrates an example dialog scenario, in accordance with an example implementation.

The dialog control 1090 controls the information flow between human and dialog system. The dialog control controls its dialog flow along the dialog scenario 1100. An example of the dialog scenario is shown in FIG. 2. The dialog scenario involves system actions, expected dialog acts after each system action, and state transition rules corresponding to each user dialog act. In FIG. 2, for example, one state 2010 shows that the system action is to say "How may I help you?" The expected user dialog acts are inform(area=south), inform(area=north), inform (food=Chinese), and so on. If the user dialog act is inform (area=south), a dialog state transition occurs via an arc that corresponding to the dialog act of inform(area-=south) then it arrives at the state 2020 where the system action is to say "(Name) is a good restaurant in south area." The (Name) is replaced by the actual restaurant name obtained by doing restaurant information retrieval on the application 1108 and the database 1109. Then, the system utterance at this state will be output from the dialog system.

The dialog history 1105 stores previous system actions and corresponding user utterances or user inputs. Dialog history 1090 also contains the dialog acts of each user utterance, the dialog acts of each system utterance, and other information. The dialog act predictor 1107 predicts the expected subsequent dialog acts of the user with consideration of the dialog history. Detail of the dialog act predictor will be described after. The user feedbacks 1110 stores the user utterances against the confirmation dialogs elicited by the dialog system to confirm the NLU result offered from the dialog system are correct or not. The NLU trainer 1170 trains the NLU models by using the user feedbacks then stores it to the NLU model.

The speech synthesizer 1120 makes a speech signal from system utterance. The made speech signal will be played from the speaker equipment of the dialog system, and then the user can listen to that the system utterance. Action maker 1130 makes any other actions of the dialog system than the speech synthesizer, which includes robot gestures, robot motions, pictures or drawings to be displayed. The robot 1140, the virtual agent 1150, and the display 1160 are output devices of the dialog system to provide information to the users.

User identifier 1175 identifies the user communicating with the dialog system. This user identification can be done by using known arts like as: voice-based personal identification, face image identification, finger print identification, finger vein identification, and so on. Depending on the desired implementation, the user can have a personal Radio Frequency Identifier (RFID) tag, and the user puts on sensors from the robot or other devices so that the system can identify the user. In addition, if the dialog is done via the virtual agent working on the smartphone, the owner information of the smartphone can be utilized to identify the user. The user profile 1180 contains each user preference on the dialog system. There is the case that one user utterance has different meanings (different dialog acts) for different users. In that case, NLU models should be altered based on the user identification result. Therefore, the user profile contains the NLU models optimal for each user. Once user identifier identifies the user, then the system changes the NLU model that the identified user prefers.

Figure 3:
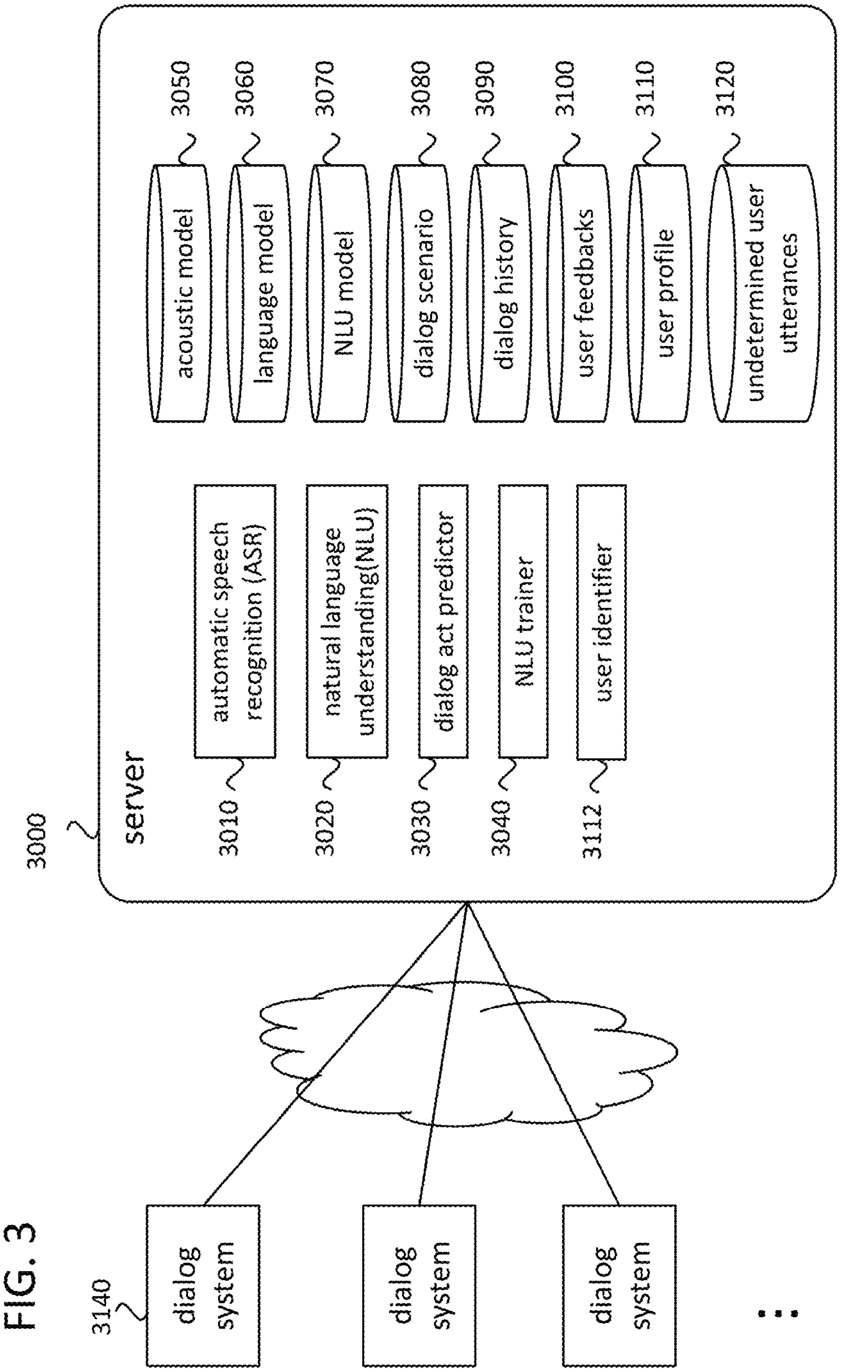
FIG. 3 illustrates components of the server, in accordance with an example implementation.

FIG. 3 illustrates components of the server 3000, in accordance with an example implementation. The server connects with one or more dialog systems 3140 (i.e. dialog system 1000). The ASR 3010, the acoustic model 3050, and the language model 3060 are components to recognize the user speech and to convert speech to text. The ASR and related models (3010, 3050, 3060) can be used to recognized user speech uploaded from the dialog system to the server 3000. The NLU 3020 and the NLU model 3070 are configured to obtain dialog acts from the user utterance. The dialog scenario 3080 contains the rules between dialog acts and next dialog states and system actions as shown in FIG. 2. The dialog history 3090 stores the dialog histories between the user and the dialog system obtained from one or more dialog systems connecting to the server. The user feedbacks 3100 contain the user responses against the system utterance to confirm NLU results are correct. User feedbacks 3100 contain the user feedbacks obtained at one or more dialog systems 3140. The user identifier 3112 identifies the user relating to uploaded information (the user feedbacks and the dialog histories) with using the information in the user profile 3110. Each data on the user feedback and the dialog history are thought to be better to have the user information indicating who talked with the dialog system. Both or either of the dialog system or the server may have the user identifier. The user profile 3110 also contains the information to determine whether each user feedback is trustable or not. The user profile 3110 includes the confidence value of users, frequency of conversation of each user, and so on. The NLU trainer 3040 trains and updates the NLU model 3070 by using the user feedbacks 3100 gathered from one or more dialog systems. The dialog act predictor 3030 predicts the next dialog acts of the user that are expected to come next with consideration of the dialog history. Undetermined user utterances 3120 stores the user utterances that failed automatic identification regarding the intention of the utterance (i.e. dialog acts). The stored user utterances in 3120 can be checked by human system maintainers, whereupon checking results will be utilized to improve the dialog system (the NLU models, the dialog scenario, and any other components).

(2) Process of the System

Figure 4A:
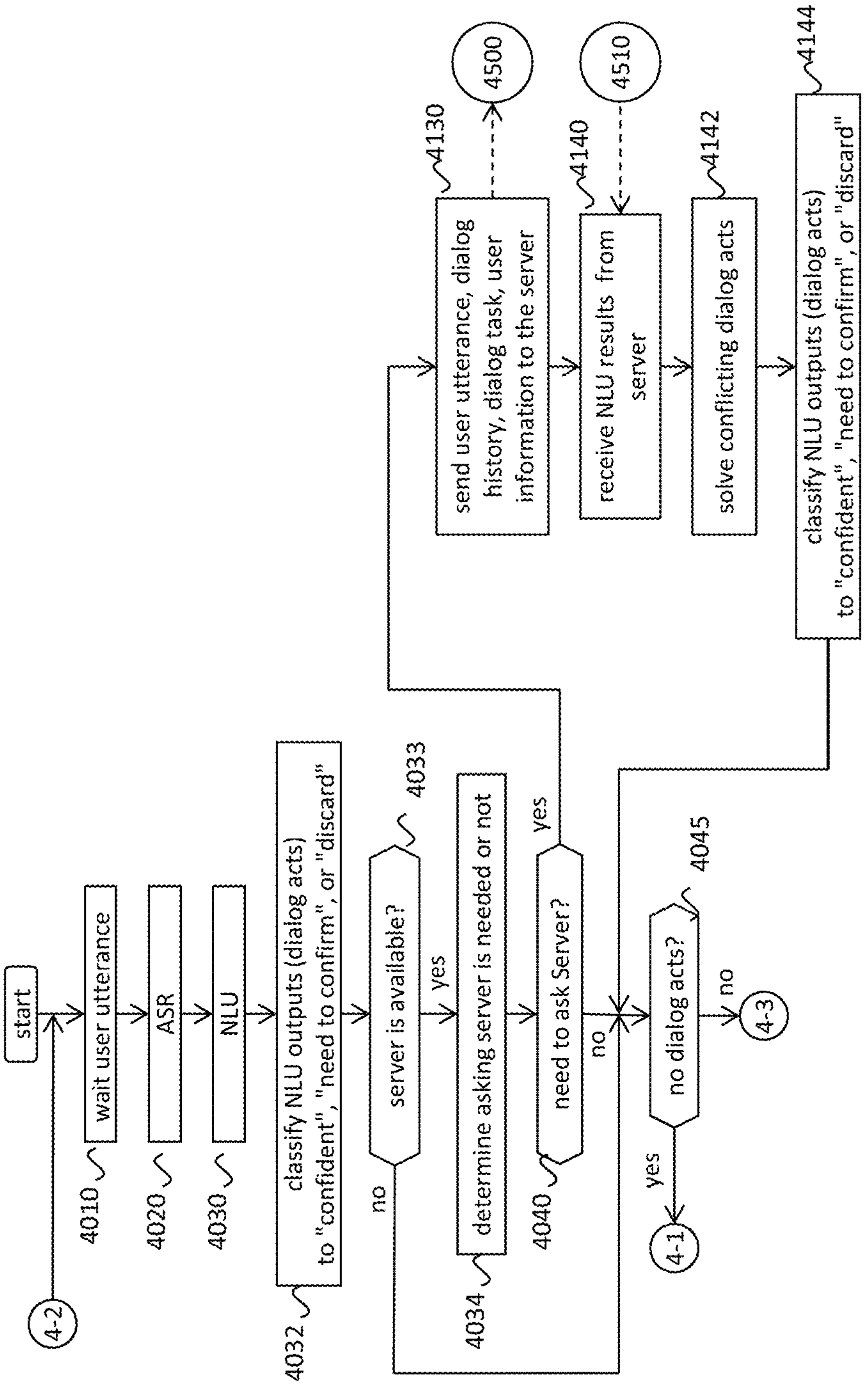
FIGS. 4(*a*) and 4(*b*) illustrate the process flow of the dialog system, in accordance with an example implementation.
Figure 4B:
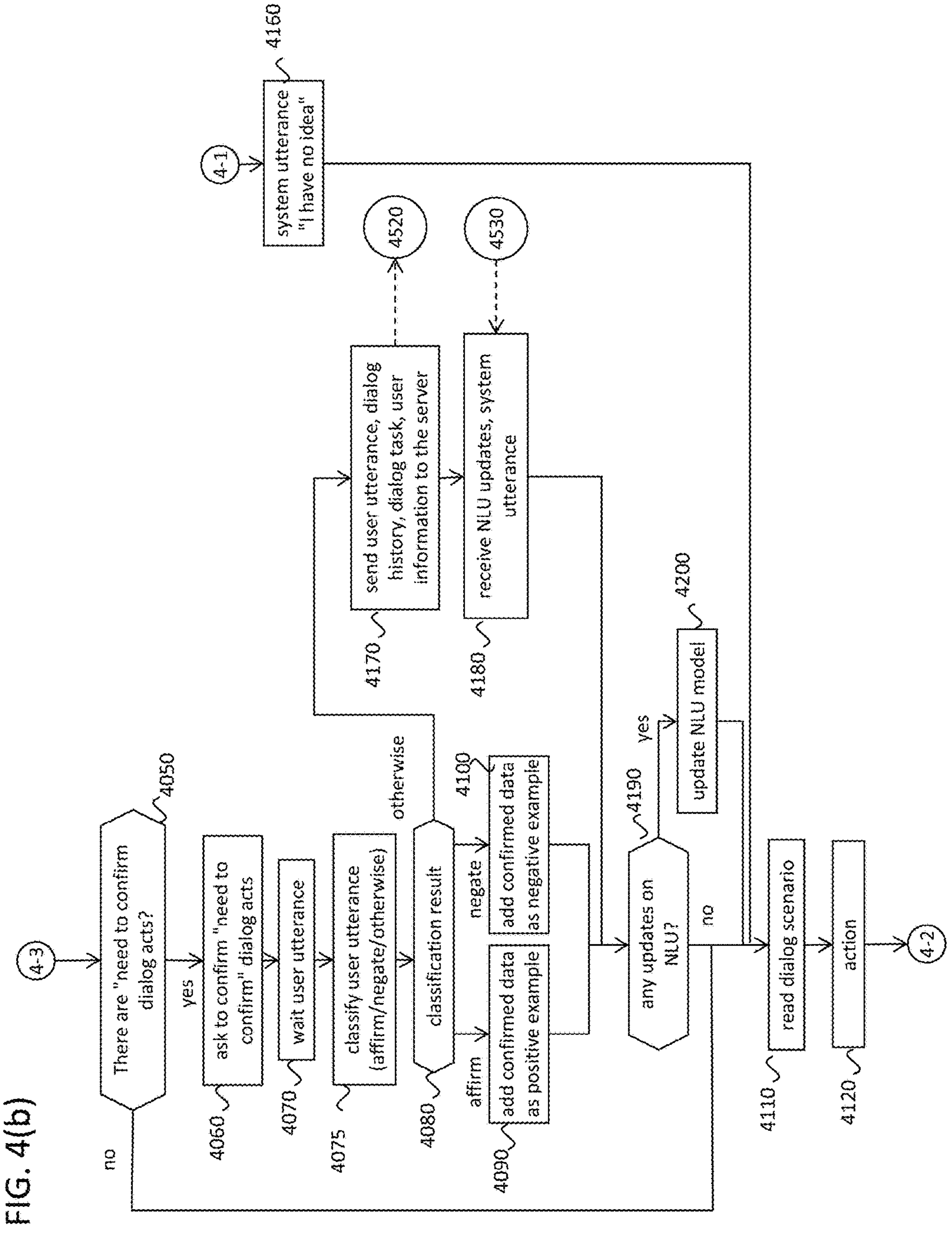

FIGS. 4(*a*) and 4(*b*) illustrate the process flow of the dialog system, in accordance with an example implementation. The flow begins with waiting for a user utterance via the microphone or the typing equipment (4010). Then, if the input is speech, the speech is input to the ASR to convert to text (4020). If the input is typing, the ASR process 4020 can be skipped. The utterance text is sent to the NLU to get the NLU results (4030). The process flow of the dialog system is further described herein with respect to other figures.

In the first example implementation, FST-based NLU are utilized. Some the NLU algorithms receive an utterance text, and output dialog acts and corresponding phrases that expresses each dialog act. As far as the NLU outputs such information, any NLU algorithms can be applicable to achieve this invention (e.g. Recurrent Neural Networks (RNN), Conditional Random Field (CRF), word matching, morpheme matching, NLU by handcrafted rules). Other example implementations (e.g., RNN-based NLU algorithms) are also described herein. In addition, although examples herein assume one utterance has just one dialog act, it is reasonable that all the words in the user utterance have the same dialog act. In that case, NLU algorithms that are good at utterance classification task can also be applied (Support Vector Machine (SVM), logistic regression, stacked neural network, and so on).

Figure 5:
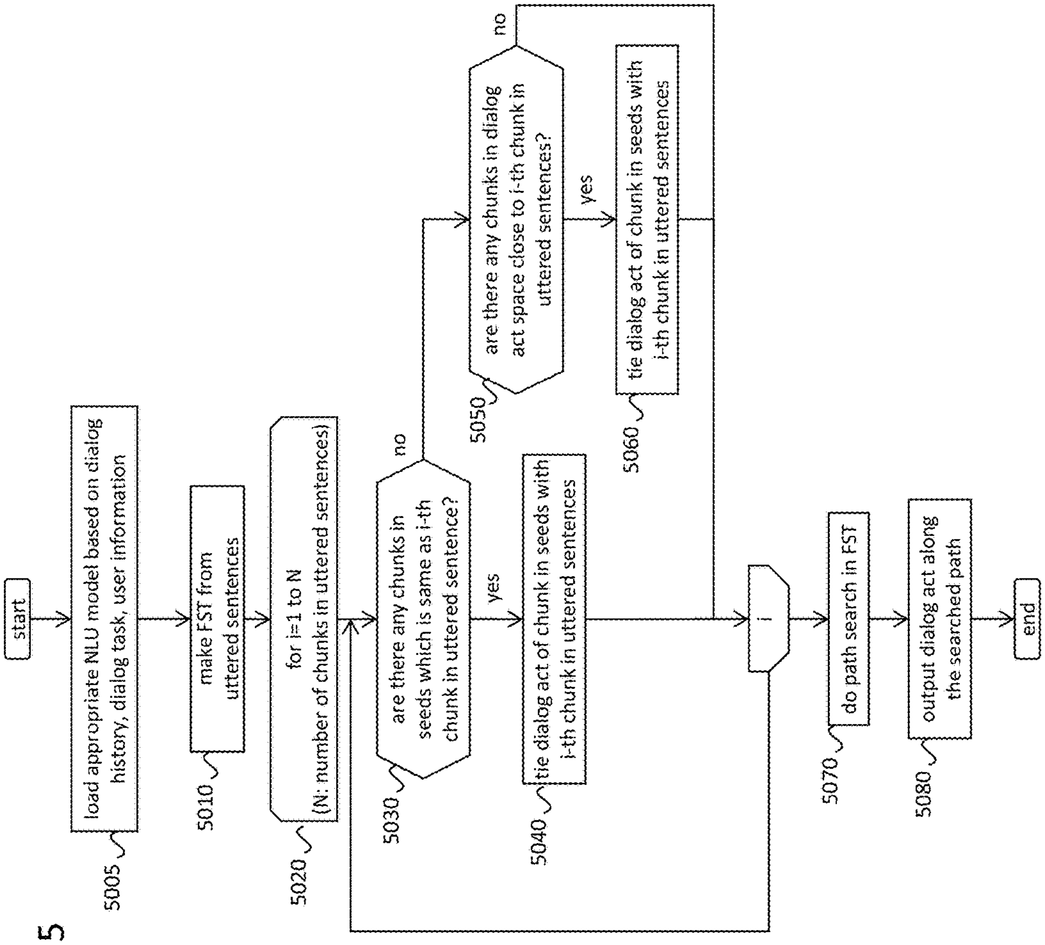
FIG. 5 illustrates an example flow of the FST-based NLU, in accordance with an example implementation.
Figure 6:
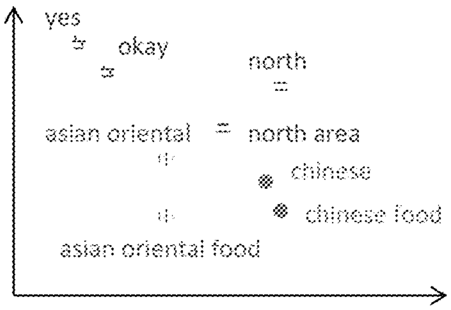
FIG. 6 illustrates the NLU models for the FST-based NLU, in accordance with an example implementation.
Figure 7:
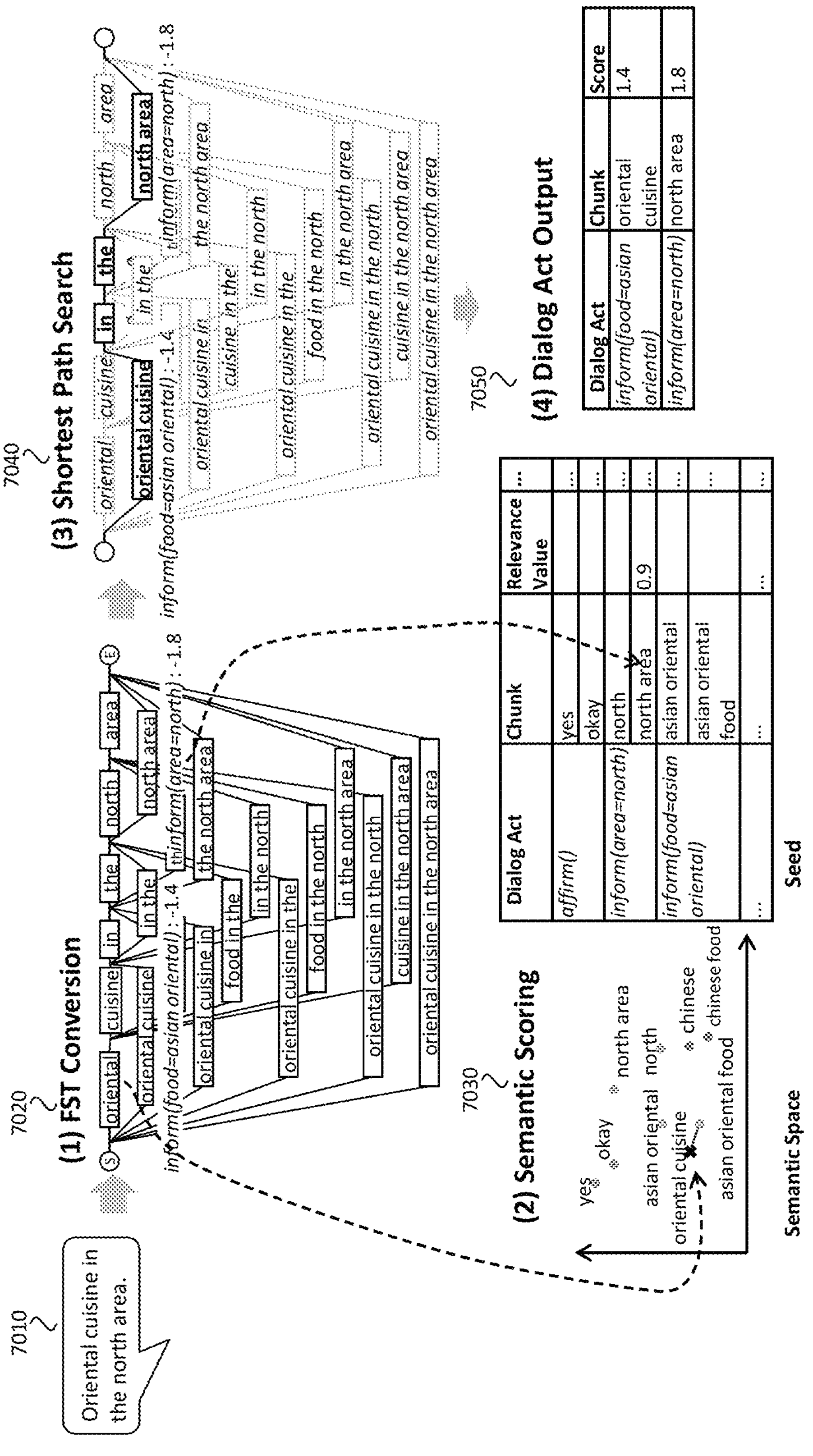
FIG. 7 illustrates the detailed data flow relating to the FST-based NLU, in accordance with an example implementation.

FIG. 5 illustrates an example flow of the FST-based NLU, in accordance with an example implementation. FIG. 6 illustrates the NLU models for the FST-based NLU, in accordance with an example implementation. FIG. 7 illustrates the detailed data flow relating to the FST-based NLU, in accordance with an example implementation.

The NLU model (FIG. 6) contains the seed 6010 and the semantic space 6070. The seed 6010 is a table that shows dialog acts 6020 and "chunks" 6030. Therefore, each row in the table is called as "dialog act-chunk pair." In example implementations, the seed 6010 is developed by human developers firstly, then it will be improved and enriched by incorporating automatic self-learning algorithms on NLU which learns new/updated dialog act-chunk pairs based on the system conversation experience with the users as described herein. The chunks are partial words or whole words of the user's utterance which are expected to be uttered by the user when the user shows the corresponding dialog act. The semantic space 6070 describes the space where two words/phrases pair are placed closer points each other if the two words/phrases have similar meanings. The semantic space can be constructed by using known word embedding technology, sentence embedding technology, word meaning information derived from word meaning database, thesaurus, or through other methods according to the desired implementation.

In the flow of FIG. 5, firstly, it loads the NLU model which is appropriate for the user identification result, current dialog task, and the current dialog history (5005). The user identification result helps select a NLU model that is suitable to each user talking with the dialog system. The kinds of the dialog acts are changed depending on the type of the task. For instance, if the dialog system is directed to the restaurant reservation task, the user may utter words to inform the food type of the restaurants (e.g. dialog act of inform (food= . . . )). However, if the dialog system is directed to an airplane ticket reservation task, the dialog act of inform (food= . . . ) will not likely be uttered from the users. Therefore, example implementations change the NLU model to be loaded depending on the kind of the task.

In addition, there can be cases that the dialog acts that the user may utter will be changed depending the dialog state or the dialog history, even if the system is directed to just one task. Furthermore, each user has their own imprint on the NLU. For example, one user usually says "nay" to express the dialog act of negating, but other users may use "nay" to express the meaning of "rather than" and never say it to express for the dialog act of negating. In that case, the NLU model should be customized to each user; i.e. the dialog system prepares the different NLU models for each user. Therefore, supposing that the dialog system has two or more kinds of the NLU models, the example implementations of the system can load the most suitable NLU model based on the user identification result, the current dialog task, and the dialog history. Further, such example implementations can be realized when the number of the NLU model is just one.

Then, the user utterance will be converted to a finite state transducer (utterance FST) (5010). FIG. 7 shows an example of utterance FST 7020 of the utterance 7010. One arc shows one chunk in the utterance. The arcs of the FST include all combinations of any numbers of words in the utterance. Due to computation limitations of the dialog system, constraints may be set to limit the maximum number of words for one arc. Then, the iteration starts to see all the chunks in the utterance (5020). If a chunk in focus is included in the seed (5030) (yes), the chunk is tied with the corresponding dialog act and its relevance value 6040 (5040). The relevance value 6040 shows how strong the relationship is between the chunk and the dialog act. In the FST 5010, the chunk "north area" is tied with the dialog act of "inform(area=north)" because the chunk "north area" in the seed has the relevance value of 0.9 with the dialog act of "inform(area=north)". The corresponding chunk in the FST is going to have the weight determined based on the relevance value. In this example implementation, the weight value is adopted by multiplying original relevance value in the seed (i.e. 0.9) by the number of words in the chunk (i.e. 2). Through multiplying the relevance value by number of words in the chunk, the dialog act obtained from longer words is more confident than ones obtained from shorter words. The multiplied value can be regarded as a weight of the FST. In addition, the ASR outputs the confidence value of each recognized words. Therefore, the weight of the chunk will be adjusted depending on the ASR confidence value of the words in the chunk. Although we explain after, the most confident dialog acts will be gotten by doing the shortest path search within the FST, where the FST paths having lower cumulative weight will be extracted. From that reason, the negative of the relevance value is fed to the FST as the weight of the arc. The shortest path search or any other calculation methods for the FST is shown in.

If the chunk in the FST differs from any chunks in the seed, the NLU tries to find the chunks in the seed that is close enough to the chunk in the FST in the semantic space (5050). The judgement of sufficiency can be done by a threshold criteria: If the distance (similarity) between two chunks in the semantic space is less (more) than a predefined threshold, it judges that the distance is sufficient. If such chunks are found (5060) (yes), the NLU ties the chunk in the FST with the dialog act and the relevance value of the chunk in the seed which is close enough to the chunk in the FST. For example, suppose that the phrase "oriental cuisine" is close to a chunk of "asian oriental food" in the seed (7030). The chunk of "asian oriental food" has relevant dialog act of "inform(food=asian oriental)". Then, the arc of "oriental cuisine" in the FST has a corresponding dialog act, which is "inform(food=asian oriental)" In this case, the weight of this are is determined by several clues: The relevance value in the seed, the distance (similarity) between "oriental cuisine" and "asian oriental food" in the semantic space, number of words in the chunk, and so on.

After doing these processes for all chunks in the FST, the shortest path search is executed in the FST (5070). Finally, the NLU outputs the dialog acts obtained from the shortest path (5080). In this example (shortest path search 7040, dialog act output 7050), two dialog acts, inform(food=asian oriental) and inform(area=north), are output. In addition, the chunk eliciting each dialog act, and the score of each dialog act (equal to positive value of the weight) are obtained. The score of the dialog acts indicates the degree as to the confidence of the dialog act.

The shortest path search basically outputs only one path where the summation of the weights is minimized. Alternatively, the shortest path search which finds two or more paths that have smaller cumulative weights than any other paths are also appreciable.

Turning back to the flow at FIG. 4(*a*), after getting NLU results by the method above, the dialog system classifies obtained dialog acts to "confident", "need to confirm", or "discard" (4032). This classification will be done along the procedure shown in FIG. 8.

Figure 8:
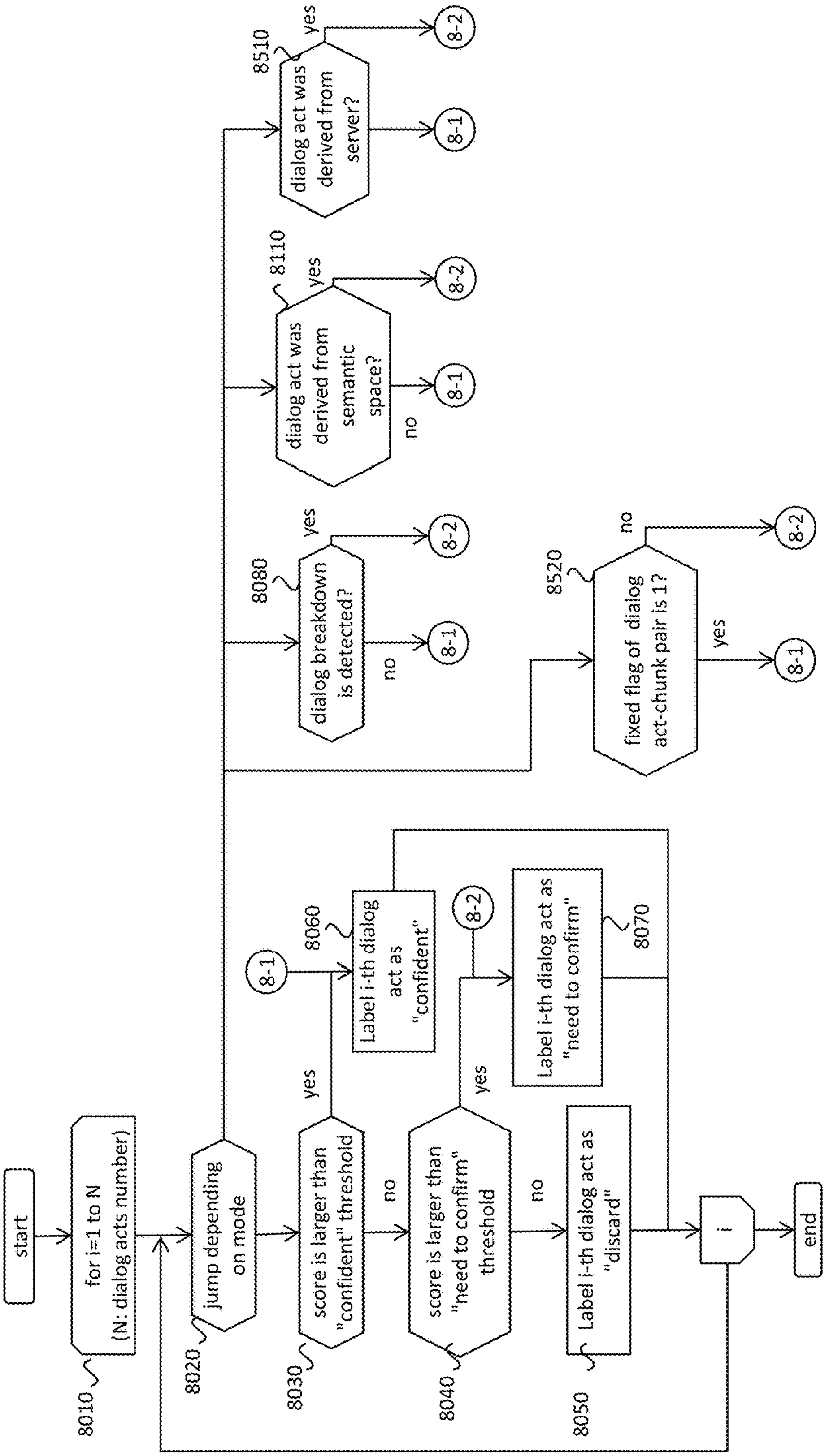
FIG. 8 illustrates an example flow to classify NLU outputs, in accordance with an example implementation.

FIG. 8 illustrates an example flow to classify NLU outputs, in accordance with an example implementation. At first, the flow checks all the dialog acts obtained by the NLU (8010). The classification procedure involves several criteria for the determination. Therefore, different processes may be executed depending on the mode of criteria (8020). In a first mode, the dialog acts are classified based on its score. If the score is larger than predefined threshold for "confident" (8030), it is classified as "confident" (8060). Otherwise, if the score is larger than predefined threshold for "need to confirm" (8040), it is classified as "need to confirm" (8070). Otherwise, the dialog act is classified as "discard" (8050).

In another mode, there is a judgement for dialog breakdown in the user-system conversation. There are several ways to detect dialog breakdown. For example, if the user says the same utterance as previous user utterances, then the implication is that the user has an intended utterance that the system did not understand, so the user repeated the utterance several times. Therefore, if such iterative utterances are detected, dialog breakdown can be judged to have occurred. In addition, any desired implementation can be utilized to accomplish dialog breakdown detection. If the dialog breakdown is detected (8080), the dialog act is classified as "need to confirm." (8070) Otherwise, the dialog act is classified as "confident." (8060) Methods utilizing dialog breakdown detection have advantages against the first mode utilizing score of dialog acts. The score sometimes shows unsuitable values; there are the cases where the score gets higher although the dialog act is actually wrong due to poor accuracy of the NLU model. Therefore, the method using the dialog breakdown detection compensates for the drawback of the first method.

In another mode, the example implementation is based on the "source" of the dialog act: the seed or the semantic space. As mentioned above, the seed is originally made by human developers. In addition, even though the dialog system uses self-learning methods that update the seed automatically, the seed only contains the dialog act-chunk pairs which were confirmed by the users at least once. Therefore, if the dialog act was elicited from the seed, it is thought to have sufficient confidence. Meanwhile, the dialog acts which are derived from the semantic space are determined to be less confident because these are not confirmed by the users yet. Therefore, if the dialog act is derived from the seed (8110), it is judged as "confident" (8060), otherwise it is judged as "need to confirm," (8070)

Further, such judgements of FIG. 8 can be based on any of the modes implemented singularly or in any combination.

Turning back to FIG. 4(*a*), after the dialog acts are classified, the system judges whether the server is available or not (4033). If the server is available (yes), the flow proceeds to 4034 where the system judges whether accessing to server is necessary or not. The detail of this judgement is provided with respect to FIG. 9

Figure 9:
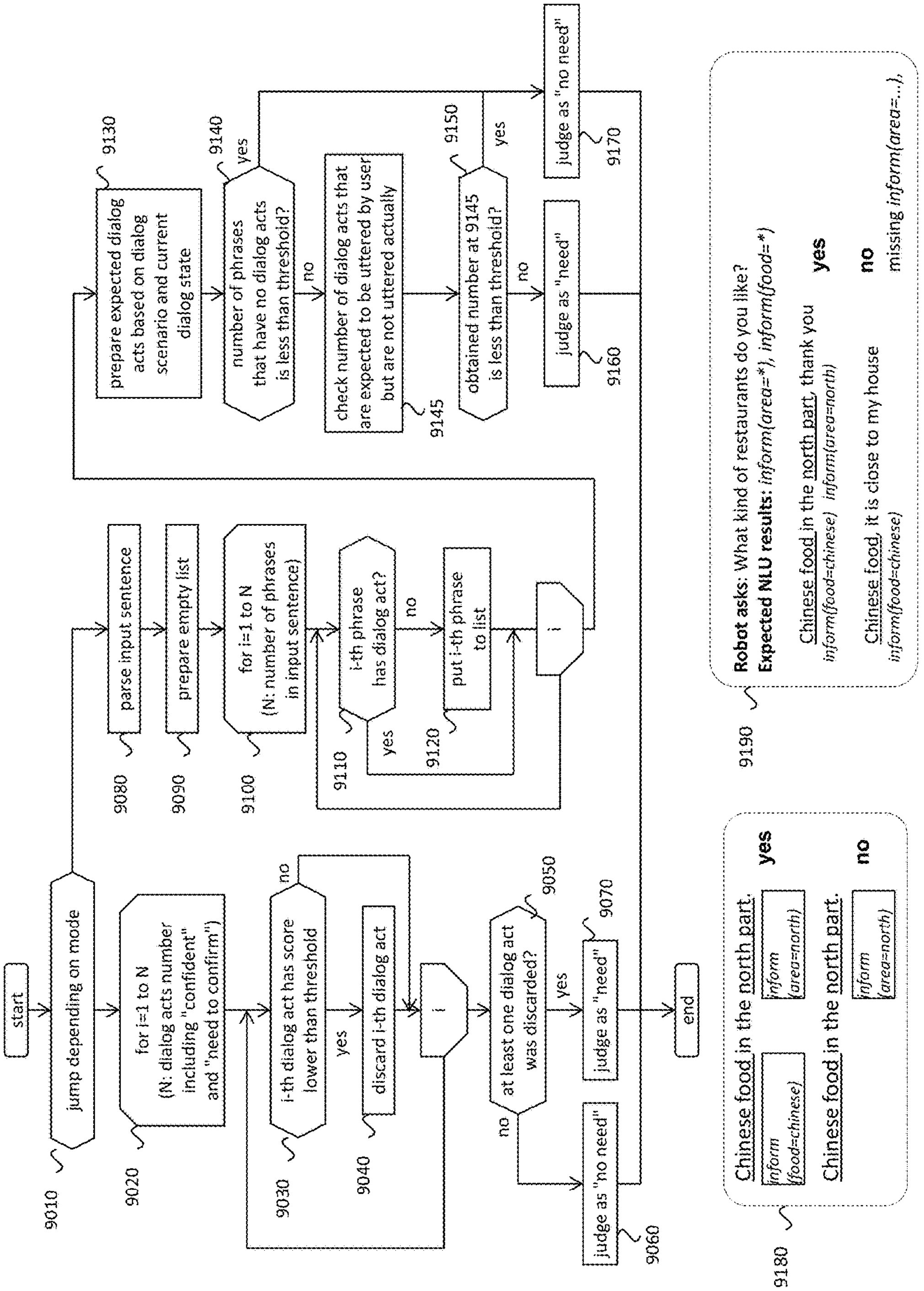
FIG. 9 illustrates an example flow regarding whether the server needs to be queried, in accordance with an example implementation.

FIG. 9 illustrates an example flow regarding whether the server needs to be queried, in accordance with an example implementation. This server accessing judgment also has two modes (9010). In a first mode, example implementations use a threshold on the dialog act scores. The system refers to all dialog acts (9020) and discards the dialog acts that have lower score than the threshold (9030, 9040). The processes before also have such a discarding process based on thresholds (e.g. 8050), however, in this case the server is expected to have more precise NLU than the dialog system. At the time when the discarding process before is done (8050), the dialog system does not know whether the server is available or not. However, at this point (9040), the dialog system already knows the server is available. Therefore, the dialog system will conduct a more precise dialog act estimation for the dialog acts that are determined to be "a little bit unconfident." Thus in example implementations, the threshold in 9040 is larger than 8050. Then, if at least one of the dialog acts are discarded, the system judges the server accessing is "needed" (9050, 9060, 9070).

In a second mode, the system parses the utterance text and divide it to one or more phrases (9080). This parsing can be done by any parser known in the art, according to the desired implementation. For instance, if the utterance of "Chinese food in the north part thank you" is parsed, it is divided to phrases: "Chinese food", "in", "the north part", "thank", and "you."

Next, the system extracts the phrases that does not have any assigned dialog acts (9090, 9100, 9110, 9120). Then, the system enumerates all of dialog acts that the user may say in the current dialog state (9130). This process is done by the dialog act predictor at 1107 in FIG. 1 by referring to the dialog scenario. Each dialog state in the dialog scenario has several arcs (i.e. dialog state transitions). Each arc also has the dialog acts indicating the condition that the corresponding dialog state transition occurs. Therefore, by checking these arcs, the system can enumerate all the dialog acts that may be uttered by the user next. In addition, categorized dialog acts can also be utilized instead of raw dialog acts. For instance, at a dialog state, the succeeding dialog acts can be assumed as inform(area=south), inform(area=north), inform(area=west), inform(area=east), inform (food=chinese), inform(food=american), inform (pricerange=cheap), inform(pricerange=moderate), inform (pricerange=expensive), and thankyou( ). In this case, the system can categorize these dialog acts to inform(area=*), inform(food=*), inform(pricerange=*), and thankyou( ). Then, the system checks the number of the phrases that have no dialog acts (9140). If the number is less than the threshold (yes), the system judges that there is "no need" to access the server (9170). Otherwise, the system goes to 9145 to check the number of dialog acts that are expected to be uttered by the user but are not uttered actually. If the number is less than the threshold (yes), the system judges that there is "no need" to access the server (9150, 9170). Otherwise (no), the system judges that there is a "need" to access the server (9160).

The breakdown 9180 shows an example of the judgement at 9140. The upper example of the breakdown 9180 shows that the utterance is "Chinese food in the north part" and the phrase with no dialog act is only "in." (the word of "the" also has no assigned dialog act, but "the" is a part of the phrase of "the north part"). Therefore, the system judges that there is "no need" to access the server. In the bottom example of breakdown 9180, there are phrases with no dialog acts are "Chinese food" and "in". There are more phrases with no dialog acts than the upper example. Therefore, the process goes to 9145 for further investigation.

The breakdown 9190 shows an example of the judgement at 9150. The upper example of the breakdown 9190 is that the utterance has dialog acts of inform(food=Chinese) and inform(area=north). Bottom example is that the utterance has a dialog act of inform(food=Chinese) only. In addition, we assume that the expected dialog acts are inform(area=*) and inform(food=*). Therefore, the bottom example lacks the dialog act of inform(area=*), so it is judges as "need" to access the server.

The judgement at 9150 can be done by several ways. Suppose that the expected dialog acts are inform(area=*), inform(food=*), inform(pricerange=*), and thankyou( ). It may be expected that the user often makes the utterances that has two or more dialog acts out of "inform" dialog acts (inform(area=*), inform(food=*), and inform(pricerange=*)). However, the user often utters just "thank you", which has a corresponding dialog act of just thankyou). Therefore, it is also reasonable that several different thresholds for different types of dialog acts can be set. For instance, if the user utterance has the dialog act of thankyou( ), the system can judge that the expected dialog acts was obtained, so the system proceeds to 9170 and judges as "no need" to access the server.

The judgement in 9140 can be done by several ways. Not only phrase level investigation, but also word level investigation is also applicable. If we adopt word level investigation, the parser is not necessary. In addition, if all the words with no dialog acts are functional words, these functional words barely have sole dialog acts. Therefore, it is reasonable to judge as "no need" to access server.

Turning back to FIG. 4(*a*), after the judgement about server access (4034) is conducted, the system proceeds to 4130 if the server accessing is judged as needed (4040). The dialog system sends the user utterance (text), the dialog history, the dialog task that the user is doing with the dialog system now, and the user information (4130, 4500). The dialog system can also send the user speech signal to the server.

Figure 10:
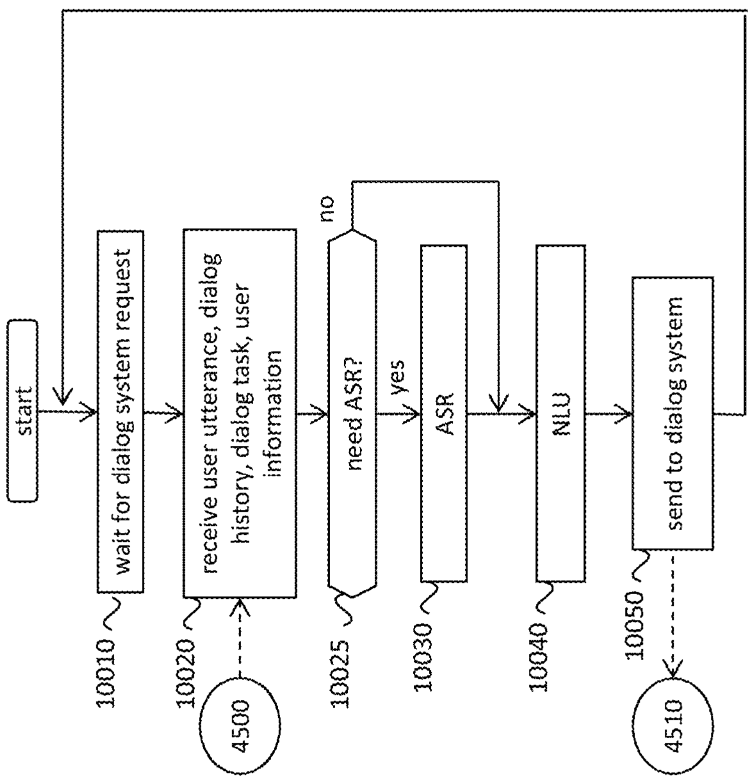
FIG. 10 illustrates an example flow for the server, in accordance with an example implementation.

The procedure of the server is described in FIG. 10. When the server receives the access from the dialog system (10010), the server receives the uploaded information from the dialog system (10020, 4500). If the uploaded information contains the user speech signal, and the server judges that ASR is needed (10025) (yes), the server does ASR to convert the user speech signal to the utterance text (10030). The ASR method can be same as the dialog system. Further, suppose that acoustic models and the language models in the server have more ASR accuracy than the ones in the dialog system. Therefore, even in situations which the ASR in the dialog system fails to convert to correct text, ASR can still be done successfully in the server.

Then the utterance text (sent from the dialog system or obtained by the ASR in the server) is sent to the NLU. The NLU converts the utterance text to dialog acts (10040). The methods of the NLU is same as the dialog system. In addition, suppose that the NLU models on the server is superior than ones in the dialog system in terms of its accuracy. Therefore, even though the NLU in the dialog system was failed to get correct dialog acts, it has high possibility to do successful NLU in the server.

Figure 11:
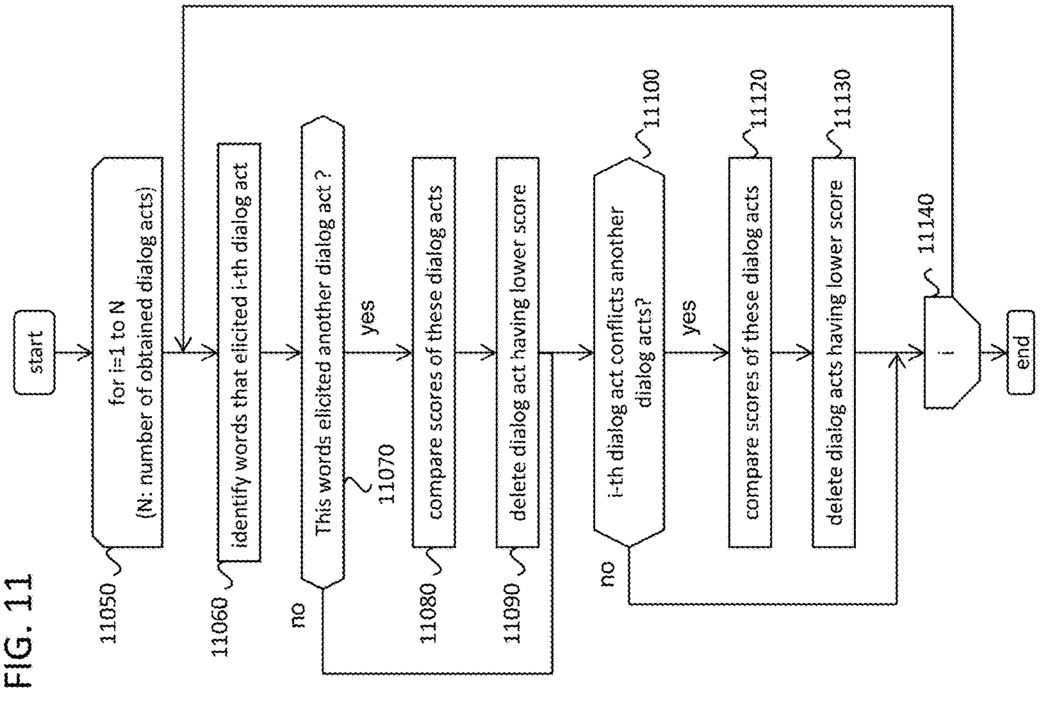
FIG. 11 illustrates an example flow for the dialog system, in accordance with an example implementation.

The NLU results will be sent to the dialog system (10050, 4510) and the dialog system receives the information (4140). After that, the dialog system solves the conflicting obtained dialog acts (4142). This process is shown in FIG. 11. In the processes in FIG. 11, the dialog system refers to all the dialog acts obtained (11050). Then, the dialog system checks whether one word in the utterance elicits two or more dialog acts (11060, 11070). There are the cases that NLU in the dialog system and NLU in the server make different dialog acts from one same word. In addition, if the NLU is configured to output two or more paths in the shortest path search, the same case happens. In these cases, the process compares the score of the dialog acts (11080), and delete the dialog acts that have lower scores (11090). The score comparison (11080) can be conducted in several different ways. For instance, the NLU results obtained in the server tend to have higher confidence than NLU results obtained in the dialog system because NLU models in the server were made from richer knowledge than the dialog system. Therefore, the NLU scores of the server can be increased by multiplying adding a certain value to overcome the NLU scores of the dialog system. On the other hand, there can be cases in which NLU results obtained by the dialog system is more trustable than the ones received from the server, as the seed in the dialog system may be updated automatically based on the daily dialog history between the user and the dialog system. In such situations, the NLU models in the dialog system may already be customized to suit the personal preference of the user. In that case, the NLU results obtained in the dialog system can be prioritized. In order to know the chunks to be prioritized, the relevance value 6040 can be used as a reference, or other metrics depending on the desired implementation (e.g., the positive feedbacks 6050, the negative feedbacks 6060, the fixed flag 6062, and the vote count 6064 as described herein).

Then, the system checks conflicting dialog acts each other (11100). For example, the user might never say the utterance containing the dialog acts of both inform(area=south) and inform(area=north) at the same time as they may be mutually exclusive. Another example can be that the user never expresses two dialog acts, affirm( ) and negate( ), at the same time as they may be mutually exclusive. Such a dialog acts are regarded as "conflicting." If such conflicting dialog acts are found, it compares the score of these dialog acts (I 11120), then deletes dialog acts having the lower score (11130). The several different ways can be applicable for comparison of the scores of the dialog acts (11130) as well as the flow 11080. Then the loop will reiterate back to 11060 at 11140.

After getting the NLU results by the methods above, the dialog system classifies obtained dialog acts to "confident", "need to confirm", or "discard" (4144). The process is basically the same as 4032. The different points from 4032 are as follows. Firstly, the threshold values can be changed from 4023. Next, the forth mode is added to FIG. 4 where all the dialog acts obtained from NLU in the server will be regarded as "need to confirm" (8510). If the dialog acts are derived from the server, it is better to confirm the user whether it is correct or not for the user because it is the first time for the user to see this NLU result obtained from the server. If it is confirmed that the NLU results is correct from the user, the NLU pattern will be stored to the NLU models in the dialog system, then the NLU in the dialog system can output the same NLU results without accessing the server. In addition, the judgement based on any combination of these modes are applicable.

Then, if no dialog acts are gotten (4045), the dialog system says that the system cannot understand what the user said (4160).

Figure 12:
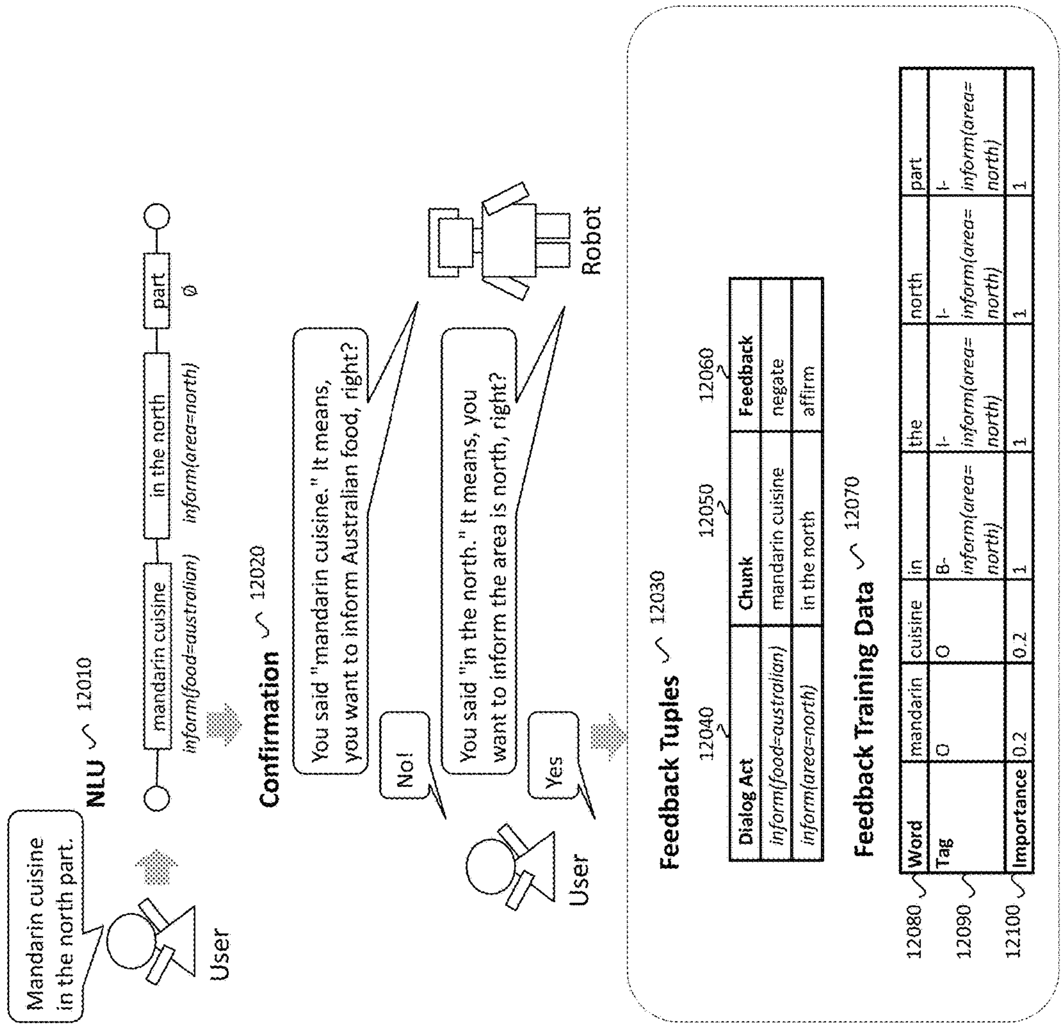
FIG. 12 illustrates an example of dialog confirmation, in accordance with an example implementation.

Then, if there are one or more "need to confirm" dialog acts (4050), the system asks the users to confirm whether these dialog acts are correct or not. The example of the confirmation dialog is shown in FIG. 12. Suppose that two dialog acts, inform(food=australian) and inform(area=north) are found, and both need to be confirmed. Then, the dialog system (i.e. the robot in this figure) makes the speech outputs to confirm whether the dialog acts are correct (12020), and waits for the user response (4070). At this situation, the system assumes that the user says an affirming utterance (e.g. "yes") or negating utterance (e.g. "no"). Then, the system classifies the user response as affirming, negating, or otherwise (4075). This classification can be done by using known utterance classification algorithms through any desired implementation. Based on the classification result, the system makes feedback tuples (12030). The feedback tuples can include the dialog act (12040), the chunk (12050), and the feedback (12060). If the user response is classified as affirming, the dialog act and the corresponding chunk are stored with the positive example (4090). If user response is classified as negating, the dialog act and the corresponding chunk are stored with the negative feedback (4100). FIG. 12 shows the case where the user negated inform (food=australian), and affirmed inform(area=north) (12030).

Figure 13:
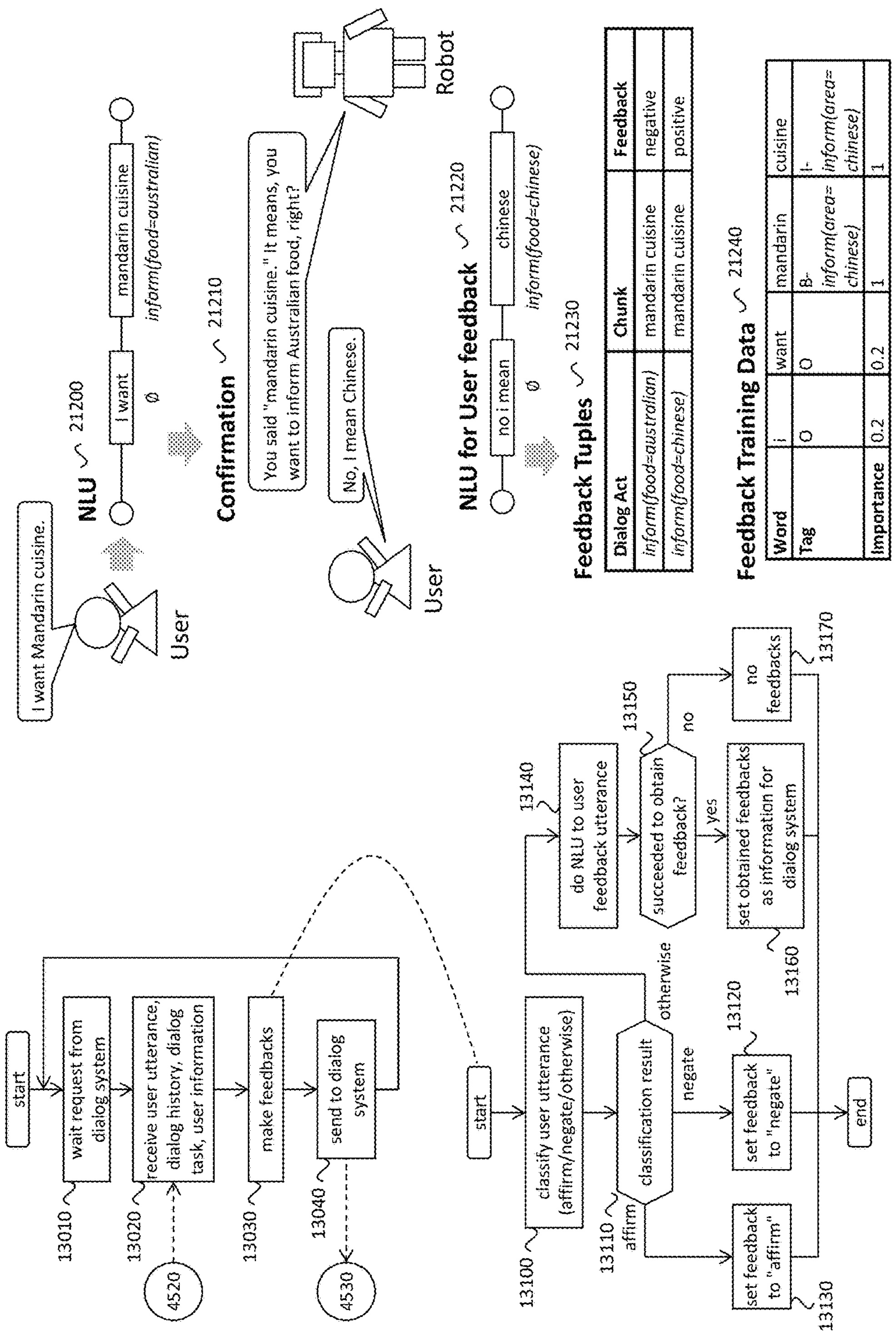
FIG. 13 illustrates an example flow for the server for analysis on the uploaded user response, in accordance with an example implementation.

In some situations, the user responses can be classified as "otherwise": it is neither affirming nor negating. In that case, the user response (text, speech signal, or both) will be sent to the server with the dialog history, the current dialog task, the user information (4170, 4520). Then the server does analysis on the uploaded user response. The server process is described in FIG. 13. The server waits the access from the dialog system (13010), then receives the information from the dialog system (13020, 4520). Based on the information uploaded from the dialog system, the server generates feedback information (13030), as illustrated in the flow at 13100. The server classifies the user response as affirming, negating, or otherwise (13100), and can be implemented similarly to the process at 4075 in the dialog system. The classification algorithm or data for the utterance classification in the server may be better than the ones in the dialog system in terms of accuracy. Therefore, the classification in the server is utilized again. If the classification result is affirming or negating, the server makes the feedback tuple that has positive or negative feedback, respectively (13120, 13130). If the classification result is otherwise, the server does NLU (13140) on the user response. This NLU is specialized to analyze the user response against the confirmation dialog. This NLU example is shown from 21200 to 21240. Suppose that the user utterance was "I want mandarin cuisine." When the dialog system asks "It means, you want to inform Australian food, right?", the user responded "No, I mean Chinese" (21200, 21210). This user response is parsed to analyze the dialog acts, then the server recognized the chunk of "Chinese" has the dialog act of inform(food=chinese) (21220). From this NLU result, the user's original phrase, "mandarin Chinese" can be determined to mean the dialog act of inform(food=chinese). Therefore, the feedback tuple for the chunk of "mandarin cuisine" and the dialog act of inform (food=chinese) with positive feedback is made. In addition, the NLU result on the first user utterance 12010 was that the chunk "mandarin cuisine" has the dialog act of inform (food=australian). Therefore, one additional feedback tuple for the chunk of "mandarin cuisine" and the dialog act of inform(food=australian) with negative feedback is made (21230).

After doing these processes, the feedback tuples will be sent to the dialog system (13150, 13160, 13170, 13040, 4530).

Then, the dialog system receives the feedback information from the server as illustrated at 4180 of FIG. 4(*b*). If the dialog system has any NLU updates (i.e. the system sent one or more feedback tuples), the dialog system updates its NLU models (4200).

Figure 14:
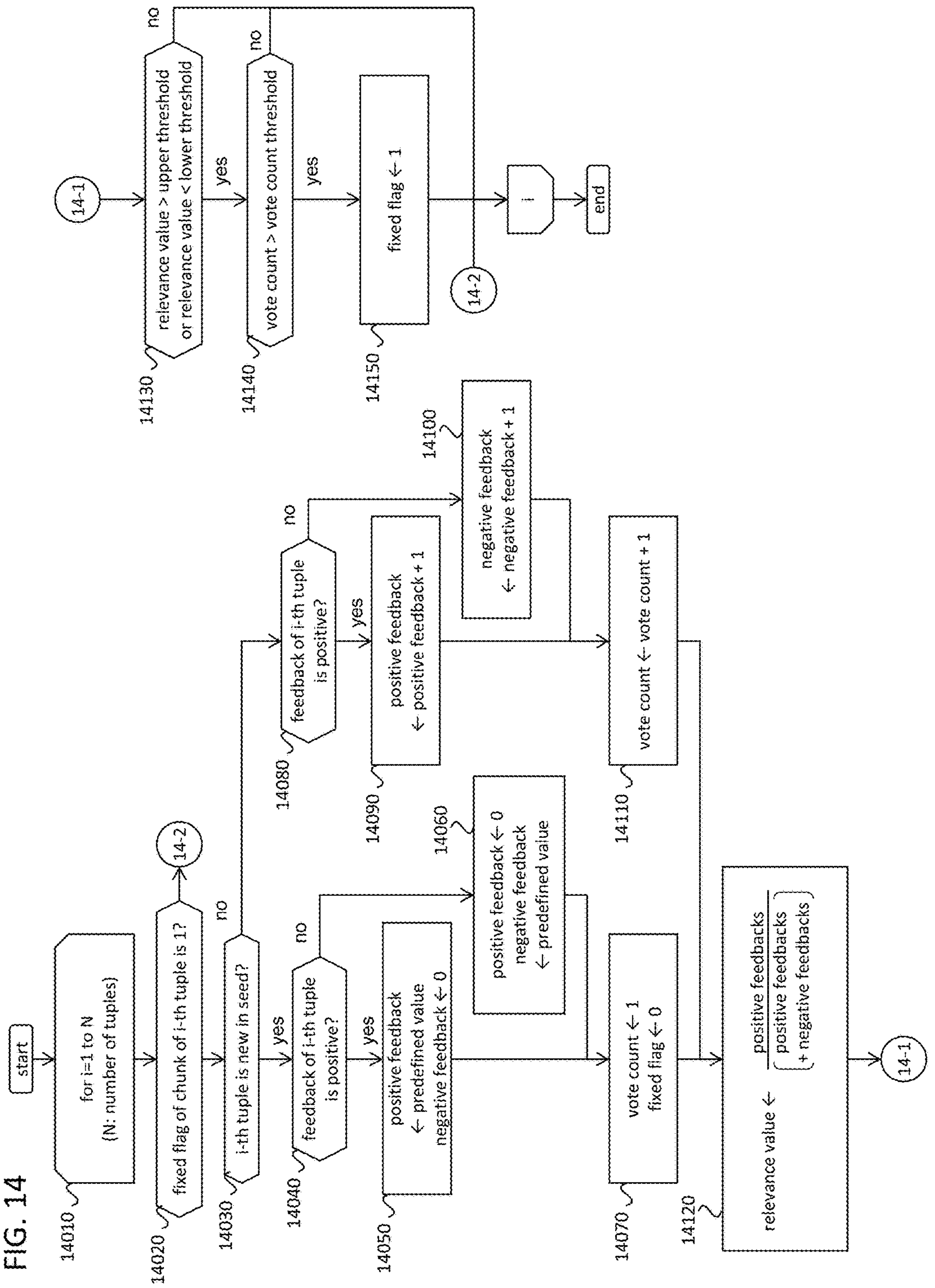
FIG. 14 illustrates a flow for updating models, in accordance with an example implementation.

The procedure of updating the NLU models is shown in FIG. 14. In addition, the seed of FIG. 6 is referenced again. The seed contains the positive feedback 6050, the negative feedback 6060, the fixed flag 6062, and the vote count 6064. The positive feedback and the negative feedback store the number of processed feedback tuples where the feedback is positive or negative, respectively. The fixed flag indicates that if the dialog act-chunk pair should not be changed in the automatic NLU update process, it goes to 1, otherwise 0. In the initial state of the seed, the dialog act-chunk pairs that are made by human developers should be set the fixed flag to 1 because these dialog act-chunk pairs are confident enough and it seems better not to change the parameters of such dialog act-chunk pairs to keep NLU process by using these confident dialog act-chunk pairs. The vote count stores the number of obtained feedback tuples relating to the corresponding dialog act-chunk pair.

The procedure refers all the feedback tuples (14010). Then, if a focused tuple has the chunk that exists in the seed with fixed flag of 1, it skips any updating process (14020). The reason why the updating process is skipped is that, if the chunk already has the "strongly-tied" dialog act in the seed, then the chunk should be maintained as is. Then, if the dialog act-chunk pair of the tuple is not seen in the seed (14030), it initializes the positive/negative feedback by a predefined number. If the feedback in the tuple is positive, it sets the positive feedback as a predefined value (usually we set the predefined number as 1 or more), and the negative feedback as 0 (14040, 14050). If the feedback in the tuple is negative, it sets the negative feedback as a predefined value, and the positive feedback as 0 (14060). Then, the vote count is set to 1, and the fixed flag is set to 0 (i.e. non-fixed) (14070).

If the dialog act-chunk pair is already seen in the seed (14030), the positive or negative feedback is incremented according to the feedback in the tuple. If the feedback in the tuple is positive, it sets the positive feedback as a predefined value (14080, 14090, 14100). The vote count is also incremented (14110).

Then, the relevance value is updated by the ratio of positive feedback to total feedback (14120). By updating the relevance value, the dialog act-chunk pair which was positively confirmed several times becomes a larger relevance value, and the pair which was negatively confirmed negatively several times gets smaller relevance value. Therefore, this procedure archives self-learning algorithm to improve NLU accuracy in automatic manner.

After updating the relevance value, the system proceeds to judge whether the dialog act-chunk pair should be fixed or not. If the relevance value is small enough or large enough (14130), and the vote count is large enough (14140), the dialog act-chunk pair is judged that the pair should be fixed, so the fixed flag is changed from 0 to 1 (14150). This idea is standing on that: If one dialog act-chunk pair was already exposed to the user many times, and is confirmed to almost correct or almost wrong, there are no needs to confirm it to the users any more. This idea brings new criteria to classify the dialog acts to "need to confirm" or "confident." For instance, if the fixed flag is 1, it is not necessary to confirm it to the user any more. Therefore, the process judges the dialog act-chunk pair as "confident" (8520 in FIG. 8). Any other criteria for judgement of "need to confirm" dialog act will be applicable by using the relevance value, the positive feedback, the negative feedback, the fixed flag, and the vote count in the seed.

Then, the dialog system reads the dialog scenario, and determines the next system action and next dialog state (4110). Lastly, the dialog system outputs an action which can be in the form of speech synthesis, robot movement, robot action, update on the display screen, and so on (4120). Then the dialog system waits the next user utterance.

Furthermore, the dialog system can control or adjust the frequency of the confirmation dialogs. The confirmation frequency adjustor 1200 of FIG. 1 provides the user interface (e.g., display and touch pad) to adjust the confirmation frequency to the users. If the user does not want to have such confirmation dialogs, the user can tell his/her preference via the user interface of the confirmation frequency adjustor. This information will be used to determine the thresholds relating to the start condition of the confirmation dialogs.

The user feedback to the confirmation dialog can also be utilized to adjust each chunk position on the semantic space. If two chunks are determined to have the same dialog act, the position of the chunks are moved closer to each other. Otherwise, if two chunks are determined to have different dialog acts, the position of the chunks are moved farther away from each other. This position change can be conducted by any desired implementation such as as non-linear coordinate transformation.

Thus in the first example implementation described above, the dialog system can automatically update NLU models and improves NLU accuracy by utilizing actual user responses to the system. The first example implementation described above includes the client-server configuration of a dialog system where the server has NLU with higher accuracy than the client (the client functions as the dialog system in the first example implementation). The client asks the server only when assistance from the NLU of the server is needed. Therefore, a faster response time to the user can be provided as well as improved NLU accuracy. In addition, the NLU of the client can have improved accuracy with using NLU updates from the server. The update information from the server is basically limited to the information that are relating to the dialog history where the user actually had with the system. It means that the amount of the data downloaded from the server is smaller than the case when all the NLU updates happened in the server are to be downloaded. Therefore, the first example implementation realizes an effective NLU updates with less network traffic.

Figure 15:
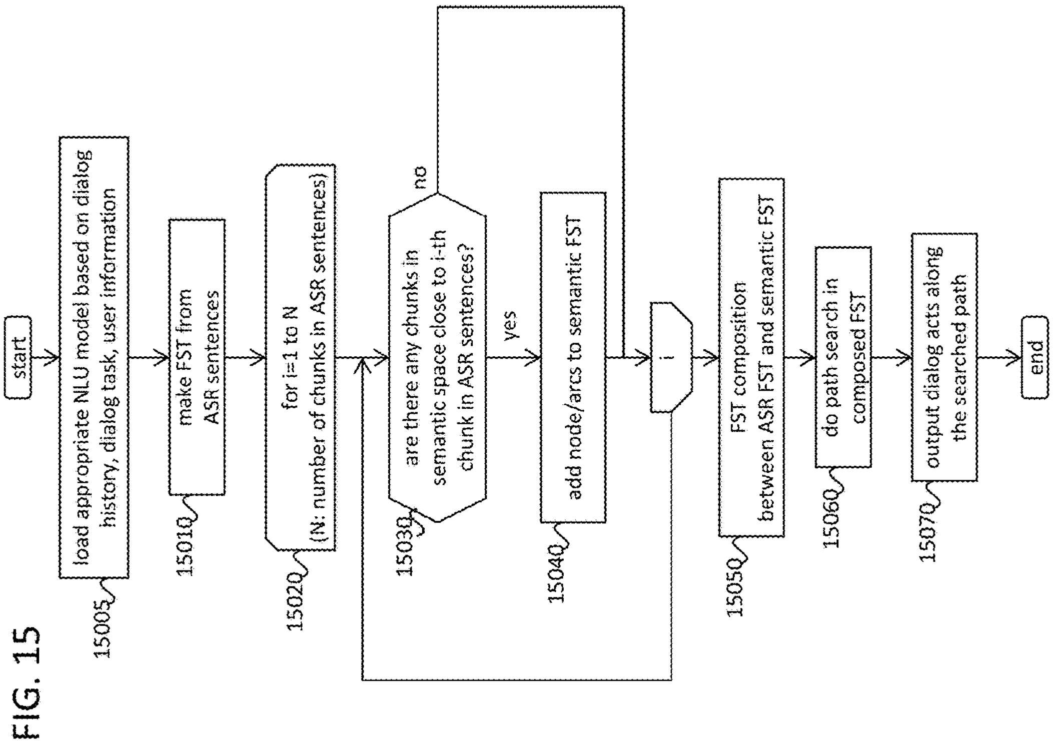
FIG. 15 illustrates an example flow for the NLU process in accordance with an example implementation.

Second Example Implementation: Dialog System Configuration Through Use of Another Type of FST-Based NLU The second example implementation changes the method of NLU from the first example implementation. The second example implementation changes the process detail on NLU (4030, 10040, 13140) from the first example implementation. The NLU process is shown in FIG. 15. Firstly, the system loads the NLU model which is appropriate for the user identification result, the current dialog task, and the dialog history (15005). Then, the utterance is converted to a finite state transducer (FST) (15010).

The FST conversion method is shown in FIG. 16. In the second example implementation, the utterance text can be obtained from ASR, and the ASR outputs N-best sentences, which contains one or more sentences that the ASR recognized in the order of the confidence. With reference to the example of FIG. 6, suppose that the user says "Oriental cuisine in the north area" (16010), and the N-best ASR sentences are "Oriental cuisine in the north area", "Origin cuisine in the north area", and "Oriental cuisine in a north area" (16015). Each of the words or sentences in the ASR sentence have confidence values output from the ASR. Then, the N-best ASR sentences are converted to a confusion network (16020), where each word has each confidence value. The confusion network can be made by using word alignment algorithms as known in the art in accordance with the desired implementation. In an example implementation, each "sausage" (a set of words that appear at the same time) in the confusion network has arcs with arbitrary word output ("<arb>" are in the FIG. 16), which allows the flexible matching at the FST composition process after. In addition, any other methods are applicable as far as the confusion network like FIG. 16 can be generated. Then, the confusion network is regarded as an ASR FST, where each are has the recognized word as output, and the negative confidence value as weight.

Meanwhile, the semantic FST (16030) is made from the seed. Each are along a path from start node to end node in the semantic FST takes the word in chunk as input, the dialog act as output (the last arc only), and the negative of the confidence value of the dialog act as weight which is determined based the relevance value in the seed. The relevance value will be divided by the number of words of a chunk, then each arc corresponding to each word has the weight same as the divided relevance value. It is also applicable that the weight will be fed only the words that are "important" to determine the dialog act. One possible way is that only the content words has weight. The weights can be adjusted by any clues like as the number of words in the chunk as we described in the first embodiment. In addition, the sematic FST has an arc where the input is arbitrary word ("<arb>") and the output is null ("<eps>") which enables flexible match in the FST composition process between the ASR FST and the semantic FST. The semantic FST creation is usually done before the users start the conversation with the dialog system.

Then, the NLU process checks all the chunks in the ASR FST (15020). If a chunk in the ASR FST has close chunk of the seed in the semantic space (15030), the corresponding dialog act-chunk pair in the seed is added to the semantic FST (15040). For instance, when the chunk of "oriental cuisine" in the ASR FST is close to the chunk of "Asian oriental food" in the seed in the semantic space, a path is added to the semantic FST where the arcs in the path has corresponding dialog act, chunks, and relevance scores (16035).

Then, the NLU does FST composition between the ASR FST and the semantic FST (15050). The method of composition calculation can be conducted in accordance with any desired implementation. The example of the FST composition result is shown in 16040.

Then, the NLU does the shortest path search on the composed FST (15060, 16050). Finally, the system gets output dialog acts (16060), and corresponding score and chunks (15070).

There are several ways to incorporate the semantic space to the semantic FST. For example, when the dialog system makes the semantic FST, the system also can search any words/phrases that are close to already-known chunks in the seed. Then, the found words/phrases can be added to the semantic FST as new chunks that have the same dialog act. The weight of such chunks can be determined based on the distance (similarity) on the semantic space and any other desired implementation. Through such implementations, it is not necessary that the semantic FST will be modified at every time when new user utterance comes, as shown at 15040 and 16035. One drawback of this alternative is that there are many candidates of chunks that are close to known chunks so that the size of the semantic FST becomes huge. To avoid this drawback, the new chunks to be added to the semantic space can be limited to the words/phrases that appears in the dialog history obtained from many users, the dialog corpus which is public use, and any other text data. Another alternative is that, although the concept is same as 15040, the FST composition calculation program can be modified to cope with the semantic space. Another method to enrich the ASR FST or the semantic FST is to utilize a word meaning database such as a thesaurus. If the word database shows that one word in the FST has a similar meaning to another word, the NLU can add the found word parallel to the original word.

In addition, N-best ASR sentences in the NLU of the first example implementation can be processed. As mentioned in the first example implementation, one ASR sentence can be converted to a FST (7010, 7020). If N-best ASR sentences are available, each of the sentences can be converted to a corresponding ASR FST by using the same method as the first example implementations. Then, these FSTs obtained from each ASR sentence can be gathered to construct one FST by using union calculation or through any desired implementation.

Thus the second example implementation illustrates an example alternative FST-based NLU algorithm. The NLU of the first example implementation expands all combinations of the words in the ASR to make ASR FST. On the other hand, the NLU of the second example implementation does not require this expansion. That leads to achieve the NLU process with lesser computation time and lesser memory than the first example implementation.

Third Example Implementation: Dialog System Configuration with Using RNN-Based NLU The third example implementation changes the method of NLU from the previously described example implementations. The third example implementation uses an NLU algorithm standing on recurrent neural network (RNN).

FIG. 17 shows the training data for RNN-based NLU, in accordance with an example implementation. The training data can include the sentence 17010, the dialog act 17020, and the word-level dialog act 17030. When RNN-based NLU is used, the training data can be prepared as shown in FIG. 7. To collect the training data, the developers can conduct a corpus collection experiment where a speaker utters various sentences while the speaker imagines the situation where they ask something to the dialog system. The collected sentences are then annotated by the annotators to give dialog acts to each utterance in word level.

FIGS. 18(*a*) and 18(*b*) illustrate recurrent neural networks (RNN) and its use of training and estimation, in accordance with an example implementation. Each cell in the RNN (18010, 18040) can be in the form of Elman RNN, Long short-term memory (LSTM), Gated recurrent unit (GRU), and so on according to the desired implementation.

When the RNN is trained by using the training data, the word (18050) and corresponding word-level dialog act (18060) are fed to the RNN. The dialog act fed to the RNN has the form of an IOB2 (Inside Outside Beginning 2) tag. Then, the log likelihood of the estimation of the word-level dialog act is calculated by using tentative RNN parameters. All of the log likelihood (converted to negative) are then summed. The summed value is regarded as a cost function. Then, the RNN parameters are updated so as to minimize the cost function. The coefficients shown at 18070 is the mask values. In the usual RNN training, the mask value is always 1. However, suppose that there is a level of uncertainty for some of the word-level dialog acts in the training data. If the dialog act has such uncertainty, a smaller mask value can be utilized to reduce the influence of such dialog acts on the NLU model.

In the actual NLU process, the trained RNN is used. The words of the user utterance are fed to the RNN (18020), then the RNN outputs corresponding dialog acts by IOB2 format (18030). After converting IOB2 format to original dialog act format, we can get estimated dialog acts (18080). The score of the dialog acts are also obtained by calculating from the post probability (RNN output value) of each word-level RNN cell eliciting the dialog act. If one dialog act is elicited from two or more RNN cells, the score of the dialog act can be calculated by summing, averaging, getting maximum, and/or getting minimum among the post probabilities output from these RNN cells. The score of the dialog act can be calculated from the post probabilities of only the RNN cells where the inputs were content words. In addition to the word input (18020, 18050), additional information of each word such as Part-of-Speech tag (POS tag) can also be input to the RNN.

There are several ways to get the semantic space involved. One possible method is to use an embedding layer in the RNN. The input word to the RNN is typically expressed by a one-hot vector. The one-hot vector is a multidimensional vector, and each element corresponds to each word. The vector has value of 1 at the element corresponding to the word, and all other elements are set to 0. This vector is then compressed to dense multidimensional vector with fewer dimensions than the one-hot vector by multiplying the one-hot vector and the embedding matrix (the parameter of the embedding layer). This embedding process has almost the same effect as the projection on the semantic space; the embedded vectors from two words that have similar meanings are put at close positions to each other. Therefore, the semantic space can be realized by incorporating the embedding layer. In addition, the parameters of the embedding layer can be obtained through any desired implementation on the training data shown in FIG. 17, or on the large text corpus. Another way to involve the semantic space is that the words having similar meanings with the recognized words are added to the input of the RNN. The same method as the first example implementation is used to find similar words by calculating the distance (similarity) among the words in the semantic space. In order to cope with two or more words as an input to one RNN cell, it is applicable to use "N-hot" vector where all the elements corresponding to the input words have value of 1 and all other elements have value of 0.

Figure 19:
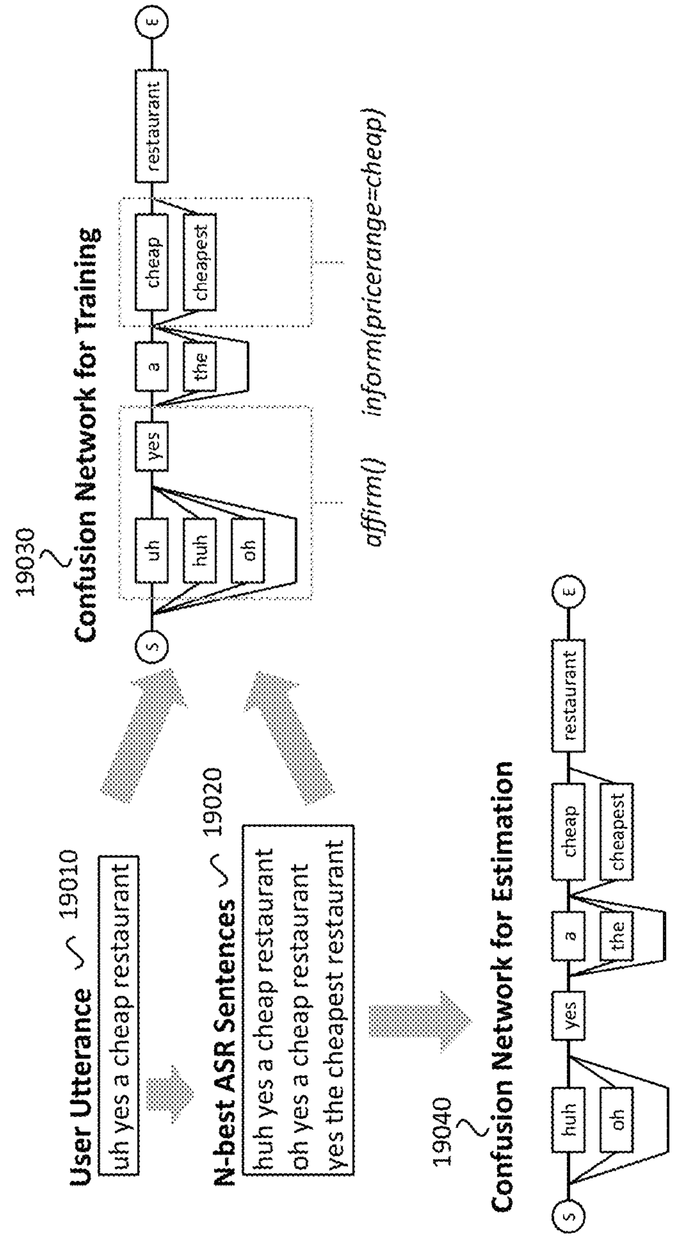
FIG. 19 illustrates an example flow to achieve N-best ASR input to the RNN, in accordance with an example implementation.

The N-hot vector idea is also applicable to achieve N-best ASR input to the RNN. FIG. 19 illustrates an example flow to achieve N-best ASR input to the RNN, in accordance with an example implementation. First, the training data is created that incorporates ASR sentences. In the corpus collection experiment, suppose the speaker says “uh yes a cheap restaurant” (19010). The utterance is fed to the ASR and the N-best ASR sentences are obtained (19020). From the correct speaker utterance text (19010) and the N-best ASR sentences (19020), it is possible to construct a confusion network with word-level dialog acts (19030) by using word alignment methods according to any desired implementation. One sausage (a word set at the same time; e.g. “uh”, “huh”, and “oh”) can be fed to a RNN cell by the N-hot vector manner as explained. In addition, the values of the elements might not be set to 1, but rather to the confidence value of each word output from the ASR. In the dialog act estimation phase, what the user actually said may not be known. However, the ASR sentences are known, so the system can construct the confusion network from the ASR sentences only (19040). Then, the confusion network is fed to the RNN by the same manner. The idea of using ASR N-best sentences for both training and estimation of RNN-based NLU can effective to improve NLU accuracies when the ASR sentences contain word errors.

Figure 20:
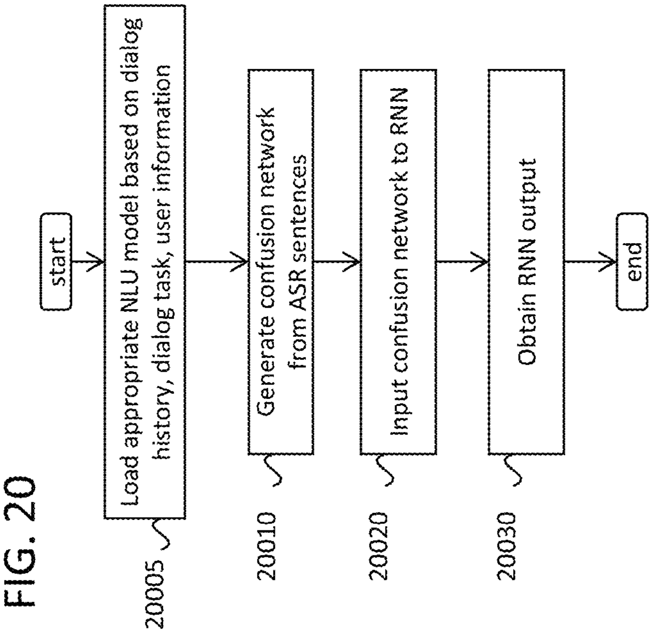
FIG. 20 illustrates an example flow of the RNN-based NLU, in accordance with an example implementation.

FIG. 20 illustrates an example flow of the RNN-based NLU, in accordance with an example implementation. The flow of FIG. 20 is a deviation for the process on NLU (4030, 10040, 13140) from the example implementations described above. Firstly, the system loads the appropriate NLU model for the user identification result, the current dialog task, and the dialog history (20005). Then, the utterance is converted to the confusion network (20010). The confusion network is fed to the RNN (20020) and obtains the dialog acts from the RNN (20030).

Turning to FIG. 12, the feedback training data 12070 shows the feedback training data obtained from user responses against the confirmation dialogs. It is comparable to feedback tuples used in the example implementations above. Once the user response against the confirmation dialog is received, feedback information can be generated by using the dialog act, the words that elicited the dialog act, and the positive/negative feedback from the user. From this feedback information, the feedback training data is made. The feedback training data can include the word 12080, the tag 12090, and the importance 12100. The tag shows the dialog act of corresponding word shown by IOB2 tag format. The importance shows the number of degree how much the tag and word pair should influence to the RNN. The feedback training data is then used as the training data for the RNN. Suppose that the importance is used as the mask value of each RNN cell on the cost function calculation. In 12070, the phrase of “in the north part” has the importance of I because it was judged that the phrase surely has the dialog act of inform(area=north). The phrase of “mandarin cuisine”, otherwise, has the importance of 0.2. From the user feedback shown in 12020, the system judges that “mandarin cuisine” does not have the dialog act of inform(food=australian). However, the phrase of “mandarin cuisine” has another dialog act. If the importance (i.e. mask value) is set to 1 with “O” tag, the RNN learns that this phrase has no dialog act. This training is inconvenient because the phrase of “mandarin cuisine” might have another dialog act. Therefore, the importance of these words is set to a smaller value. In addition to this policy for determining the importance, a larger importance can be provided when the word-dialog act pair has been frequently seen in the previous user dialog history. Otherwise, when the word-dialog act pair is new, smaller importance may be assigned because of the possibility that the word-dialog act pair is standing on wrong feedback. Furthermore, the RNN can be trained properly from the negative feedback. For example, if the negative user feedback was obtained between “mandarin cuisine” and inform(food=australian), the RNN can be trained to avoid outputs of inform (food=australian) from the input of “mandarin cuisine” by incorporating other neural network structures, other training criteria, or other cost function calculation depending on the desired implementation.

Figure 21:
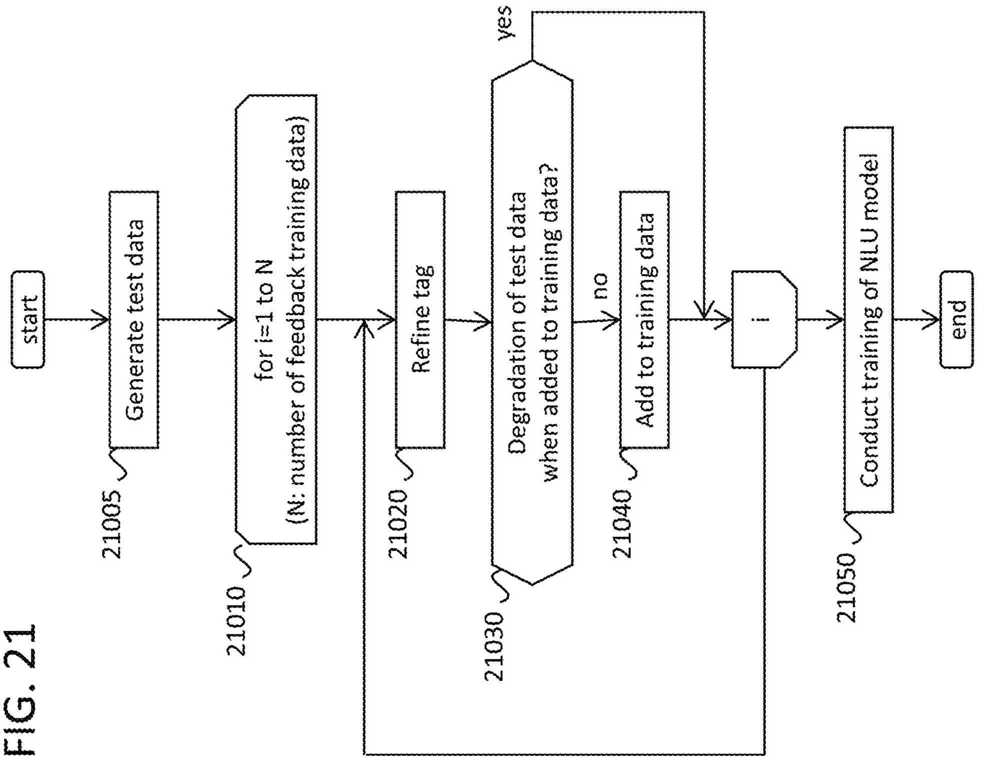
FIG. 21 illustrates an example flow of NLU update by using the user feedback, in accordance with an example implementation.

FIG. 21 illustrates the procedure of NLU update by using the user feedback, in accordance with an example implementation. The flow of FIG. 21 changes the process of 4200 in the example implementations above.

Firstly, the system generates the test data for checking the accuracy degradation (21005). The dialog system has the dialog history, where previous utterances (text) and NLU results are stored. It also has the user feedback information. Therefore, it is possible to extract the utterances and their correct dialog acts, and the extracted data is used as “test data”.

The test data can be used where each utterance involves manually tagged word-level dialog acts by human system maintainers. The utterances within the test data may include not only the utterances obtained in the confirmation dialogs, but also the standard utterances which most users utter to the dialog system, and any other test data according to the desired implementation. It is also applicable to refer all the utterances in the dialog history as the test data.

The system refers to all of the feedback training data (21010). Then, each of the feedback training data is refined (21020). This refinement process checks the relationships between words and dialog acts contained in the feedback training data. If the relationship is in conflict with the previous feedback, the dialog acts are edited so as not to conflict with previous feedback data.

Then, the system checks the data causes the accuracy degradation on the test data when the data is added to the training data of RNN. The straightforward way to determine degradation is to train the RNN model when the data is added to the training data, then evaluate the NLU accuracy on the test data. If there is test data for which the previous RNN model correctly obtains dialog acts, but the new RNN model fails to get correct dialog acts, then degradation is determined to have occurred. If the number of such degraded utterances in the test data is larger than the threshold (yes), the data is removed from the feedback training data. Otherwise (no), the feedback training data is added to the RNN training data (21030, 21040). If the RNN training is time consuming to find degradations, it is also possible to use other NLU algorithms (e.g. CRF) to find the data causing degradation. Finally, the RNN NLU model is trained by using the training data which contains added feedback training data (21050). The previous NLU model is overwritten by the new RNN model trained at 21050.

Feedback training data 21040 in FIG. 21 shows the feedback information that is generated at the server when the user feedback utterance is sent to the server and analyzed in the server. The contents and concepts are same as the feedback training data in the feedback analysis done in the dialog system.

In this third example implementation, self-learning NLU is utilized when RNN-based algorithm is used for NLU. RNN can achieve sufficient NLU accuracy as far as training sentences are available. Therefore, such an example implementation is a possibility for improving NLU by using user feedback.

Figure 23:
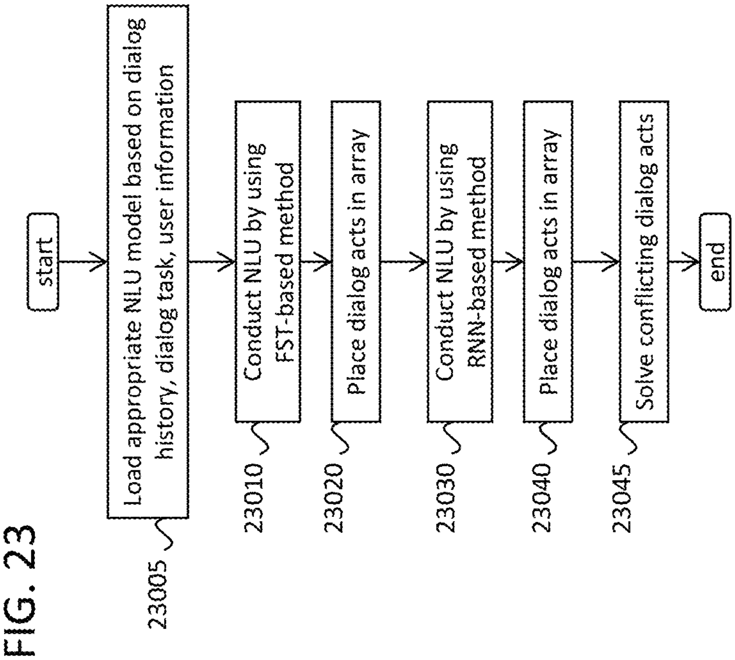
FIG. 23 illustrates an example flow for when the FST-based NLU and the RNN-based NLU are combined, in accordance with an example implementation.

Fourth Example Implementation: Dialog System Configuration with Hybrid of FST-Based NLU and RNN-Based NLU In a fourth example implementation, the FST-based NLU and the RNN-based NLU are combined. The algorithm is shown in FIG. 23. It changes the process detail on the NLU (4030, 10040, 13140) from the example implementations above. Firstly, it loads the NLU model which is appropriate for the user identification result, the current dialog task, and the dialog history (23005). Then, the FST-based NLU is done by the example implementations described above (23010, 23020). Then, the RNN-based NLU is done by the example implementations described above (23030, 23040). After doing both the FST-based and the RNN-based NLU, the obtained dialog acts are processed to resolve conflicting dialog acts (23045). This process is same as FIG. 11, although a score adjustment process is incorporated to make comparable scores between the FST-based and the RNN-based implementations.

Figure 36:
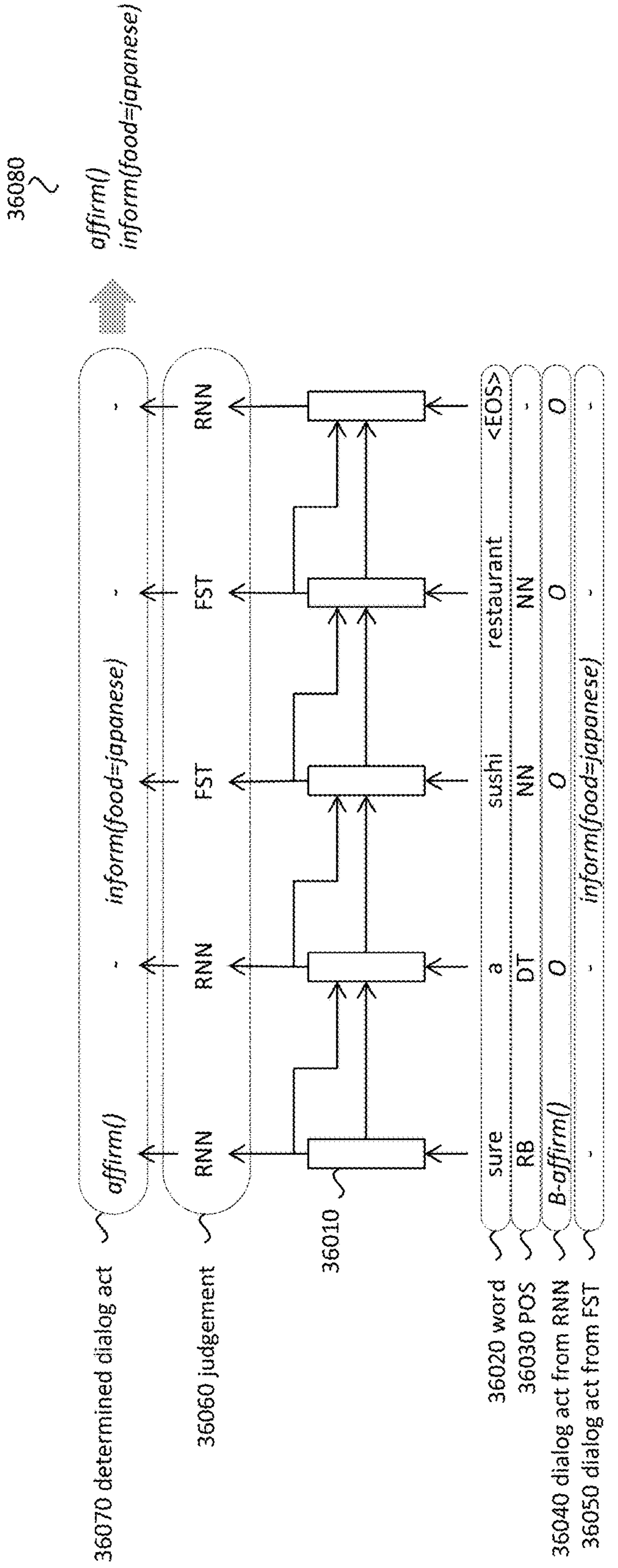
FIG. 36 illustrates another example for selecting proper dialog acts from the results of FST-based NLU and RNN-based NLU in accordance with an example implementation.

FIG. 36 illustrates another example for selecting proper dialog acts from the results of FST-based NLU and RNN-based NLU in accordance with an example implementation. A In this dialog act selection process, RNNs (36010) are utilized, which are trained to output a confidence value that indicates which NLU outputs more confident dialog act. This RNN can be trained by using a data involving sentences, correct dialog acts, RNN-based NLU outputs, and FST-based NLU outputs. The judgement (36060) shows an example of the judgment results that are judged more confident. Following the judgement results, more confident dialog acts will be output (36070, 36080). Each RNN cell (36010) receives word (36020), dialog act output from RNN-based NLU 36040, and dialog act output from FST-based NLU (36050). It can also receive additional information relating to words such as POS tag (36030). This implementation can be utilized to integrate any kinds of NLU results. For example, FIG. 11 shows a method to solve conflicts of NLU results between the client-size NLU and the server-side NLU. Instead of FIG. 11, the dialog act selection algorithm shown in FIG. 36 can be applied where the RNNs (36010) take the result of client-size NLU and the server-side NLU as RNN inputs (36040, 36050).

Another method to integrate FST-based NLU and RNN-based NLU is to train RNN-based NLU model in the configuration that each RNN receives the results of FST-based NLU. In FIG. 18, each RNN (18010, 18040) receives word input (18020, 18050). In addition to this, dialog acts of each corresponding word obtained by FST-based NLU can be input to the RNN (18010, 18040).

In addition to the hybrid NLU, the dialog system and the server may also use different NLU algorithms. For example, the FST-based NLU seems suitable for the dialog system (client) because the FST-based NLU requires small dialog act-chunk pairs in the seed to realize sufficient NLU accuracy. On the other hand, the RNN-based NLU seems suitable for the server because the RNN-based NLU requires a large amount of training data. Such training data is obtainable by the server because the server is connected to many dialog systems so that the server can get many user feedbacks from various dialog systems.

To collect the training data for the RNN-based NLU, it can be useful to use actual user logs. However, the actual user logs may involve “skewed” data; some dialog acts may be seen very frequently in the user actual utterances, but most of the dialog acts may only be seen a few times. Ultimately, some dialog acts may have no corresponding utterances in the user logs. Therefore, as far as such the user logs are used as the training data of RNN-based NLU, the trained RNN-based NLU is completely unable to recognize the dialog acts that do not occur in the training data. On the other hand, the FST-based NLU can be developed so as to recognize all the dialog acts that are assumed to occur, although the overall accuracy of FST-based NLU tends to be lower than RNN-based NLU. From this viewpoint, one possible way to integrate RNN-based and FST-based NLU is as follows. Suppose that one word has different dialog acts between RNN-based NLU and FST-based NLU. Thus a rule can be set; if the dialog act derived by FST-based NLU does not exists in the training data of RNN-based NLU, the dialog act of FST-based NLU is output as the integration result. In addition, such dialog acts may be incorrect due to low accuracy of the FST-based NLU. Therefore, all of the dialog acts output by this rule can be classified as “need to confirm” in the following process (4144).

Furthermore, the NLU update information made by the server may contain the direction on the NLU algorithm working on the dialog system. One example is that the NLU update information has the direction which NLU algorithm should be used in the dialog system. Another example is that the NLU update has the patch program to update NLU algorithm of the dialog system.

By using hybrid of the FST-based NLU and the RNN-based NLU, the dialog system can obtain both the feedback tuples (24040) and the feedback training data (24080) as illustrated in FIG. 24. There are the cases that the relationships between words and the dialog acts are different between the feedback tuples and the feedback training data. This difference can be utilized to get more precise user feedback. For instance, if one word has the same dialog act between the feedback tuples and the feedback training data, the dialog act can have a high confidence level. On the other hand, if the one word has different dialog acts between the feedback tuples and the feedback training data, the dialog system can choose one dialog act having higher confidence from among such different dialog acts. In order to choose a high confidence dialog act, the score of the dialog acts, the consistency of the feedback information against the dialog history, and any other information can be utilized in accordance with the desired implementation.

Hybrid NLU in this example implementation compensates for the merits and demerits of different NLU algorithms. The FST-based NLU basically achieve high accuracy even though the number of dialog act-chunk pairs in the seed is limited. However, if large amounts training data is available, the RNN-based NLU may overcome the accuracy of the FST-based NLU. Therefore, by using hybrid configuration of both NLU algorithms, consistently high accuracy can be obtained, regardless of whether the training data is small or large.

Fifth Example Implementation: Self-Learning NLU Incorporating N-Best ASR Outputs In a fifth example implementation, N-best ASR outputs are utilized for updating the NLU. FIG. 24 illustrates how to generate feedback information (i.e. feedback tuples, feedback training data) from N-best ASR outputs.

From the N-best ASR sentences 24010, NLU will be done 24020 by either FST-based or RNN-based algorithm as mentioned in the example implementations above. Then, the confirmation dialog is done at 24030.

In the case of making feedback tuples (i.e. when the FST-based NLU is used), the confusion network of the ASR output and the corresponding dialog acts can be obtained (24022). For instance, a part of the confusion network having the dialog act of inform(area=north) (24025) contains the words of "in", "the", "north", and "nose." This part also has arcs that show what words are connected with each other. From this part of the confusion network, all generated phrases can be expanded: "in the north", "in the nose", "in north", and "in nose." In this example, the dialog act of inform(area=north) is fed positive feedback by the user. Therefore, the dialog system takes these phrases (i.e. chunks) as the feedback tuples with the corresponding dialog act (i.e. inform(area=north)) and the feedback type (i.e. positive), as shown in 24020.

In the case of making feedback training data (i.e. when the RNN-based NLU is used), the confusion network and the corresponding dialog acts (24022) can be utilized. The confusion network and the word-level dialog acts 24025 can be used for the training data of RNN by the methods of FIG. 18 (18040, 18050, 18060, 18070). Therefore, if the feedback training data is prepared as shown in 24080, the user feedback for the training data of the RNN can be used while taking the N-best ASR outputs into account. The value 24120 indicates the word confidence value obtained from the ASR. These values can be utilized as the element value of the N-hot vectors of the input words to the RNN, as described in the example implementations above. The importance 24110 also can be determined by the word confidence value of the ASR. FIG. 24 shows an example that each importance is set to the same value as the maximum word confidence value 24120 within the corresponding recognized words. In addition, the importance can be determined by the same policy as the example implementations above.

In this fifth example implementation, the NLU updating method is shown by using the N-best ASR outputs of the dialog histories in the actual use. The characteristics of the word errors appearing in the ASR outputs can be changed depending on the level of environmental noise, the acoustic environment, the characteristics of the user speech, and so on, according to the desired implementation. In this example implementation, the characteristics of the ASR word errors that happen in the real field can be captured and incorporated to the NLU models automatically. Therefore, this example implementation automatically improves the NLU accuracies in the real field.

Sixth Example Implementation: Self-Learning NLU in Server

In this example implementation, the automatic NLU updating method in the server by using the user feedback is described.

The dialog system stores the user feedback (feedback tuples, feedback training data) obtained in the confirmation dialogs between the user and the dialog system. The information obtained in the dialog system (i.e. the dialog history, the user feedbacks, and the user profile) is uploaded to the server. The server is connected to at least one or more dialog systems as shown in FIG. 3. Therefore, the server can store many user feedbacks across different dialog systems. By using the user feedbacks in the server, the NLU models can be updated.

Figure 25:
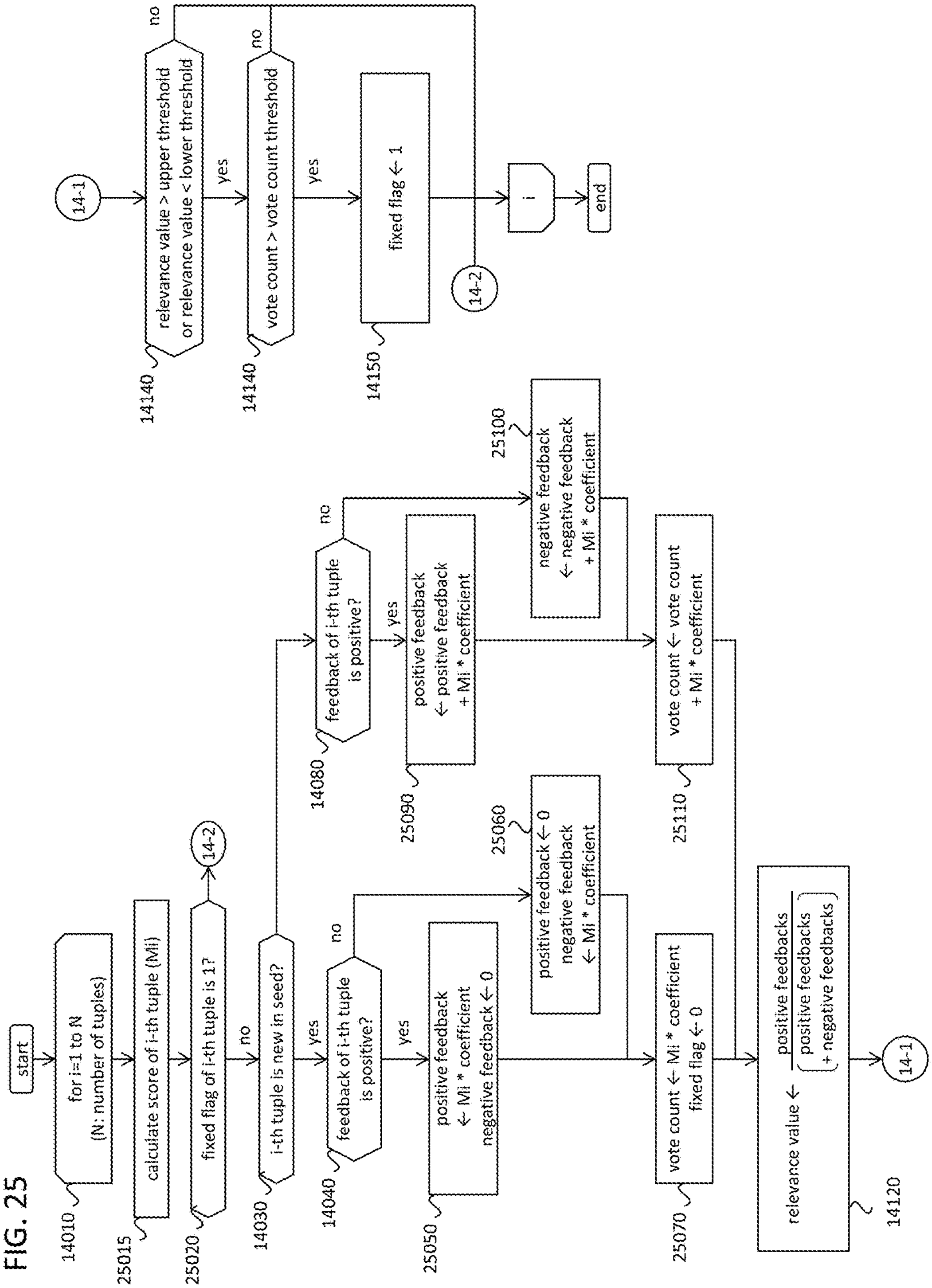
FIG. 25 illustrates how to update the seed by using feedback tuples in the server, in accordance with an example implementation.

FIG. 25 illustrates how to update the seed by using feedback tuples in the server, in accordance with an example implementation. This procedure is similar to updating the seed in the dialog system illustrated in FIG. 14. The difference from FIG. 14 is to calculate the tuple score of each tuple (25015; Mi), and the tuple score is used to update the positive feedback and the negative feedback (25050, 25060, 25090, 25100), and the voting count (25070, 25110).

The tuple score is the value that has higher when the tuple is more confident. To calculate the tuple score, the evaluation on each user will be taken to determine the user confidence. The user confidence can be calculated based on the following criteria:

- The frequency of the dialog as determined from user history (if it is more frequent, the confidence of this user will be higher)
- The consistency of the user feedback with other users (if the most of the user feedbacks are different from other users, the confidence of this user becomes lower)
- The consistency of the user feedback for the individual user (if the user feedback is not consistent against the previous confirmation dialogs, the confidence of this user becomes lower)
- Paralinguistic information on the user utterance (if the paralinguistic information, such as pitch, power, silence intervals, on the user speech is classified as abnormal, the confidence of this user becomes lower)

The tuple score is also determined by the confidence of the tuple itself. The calculation methods are as follows:

- The consistency of the feedback with other feedback (if the focused feedback is inconsistent with most of other feedbacks, the confidence of this tuple will be lower)

Further, the user confidence may vary from moment to moment. The user confidence will be determined from the dialog behavior at the moment. In addition, the user confidence can be determined by the time when the dialog is done, the kind of the dialog task, the environment of the user, and so on.

This tuple score can be determined manually, according to the desired implementation. In a manual implementation for providing the tuple confidence, a human operator checks the dialog history in the server, then the operator decides the value of the tuple score.

The user who has the dialog is determined the user identifier as mentioned in the example implementations above. However, it is also possible that the user cannot be identified. In such situations, instead of the user confidence, the confidence of the dialog system can be used. The confidence of the dialog system will be calculated from all the uploaded information from one specific dialog system by using the same manner as one when user confidence is calculated.

These criteria for calculating the tuple score are not limited to the extent we mentioned above.

Figure 26:
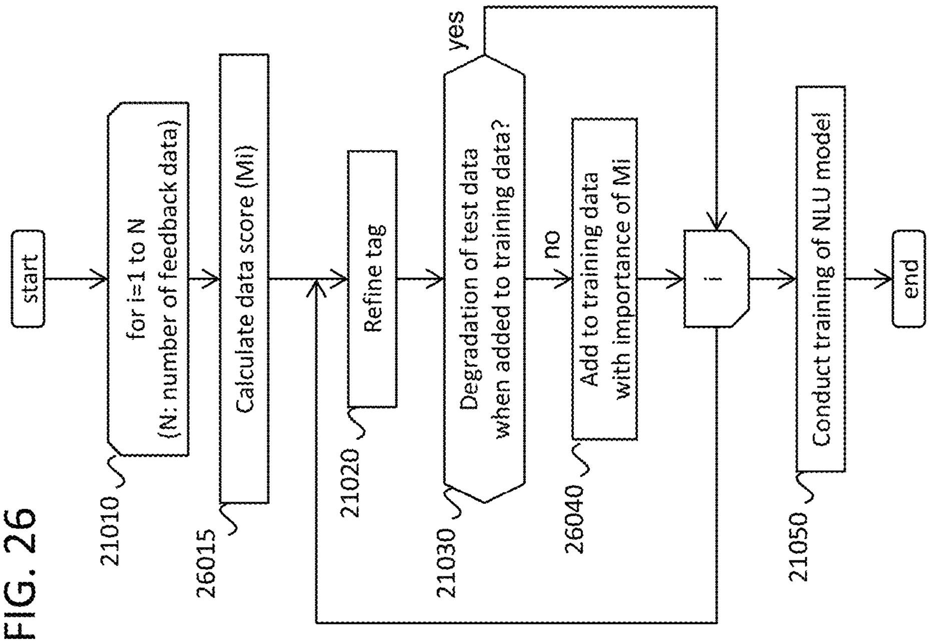
FIG. 26 illustrates a flow to update the training data of RNN-based NLU by using the feedback training data in the server, in accordance with an example implementation.

FIG. 26 illustrates a flow to update the training data of RNN-based NLU by using the feedback training data in the server, in accordance with an example implementation. This procedure is similar to the procedure of updating the seed in the dialog system as illustrated in FIG. 21. The difference from FIG. 21 includes the calculation of the data score of each tuple (26015; Mi), wherein the score is used to determine the importance of each data (26040). The method to calculate is the same as the method to calculate the tuple score as described in the other example implementations.

Figure 22B:
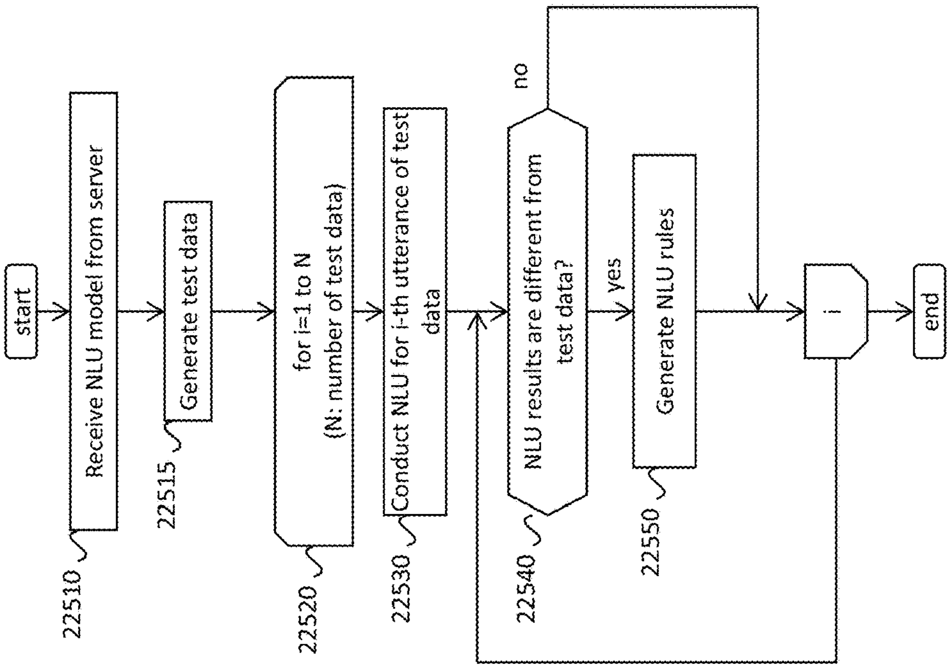
FIGS. 22(*a*) and 22(*b*) illustrate an example procedure of updating NLU models in the dialog system when it receives the updates from the server, in accordance with an example implementation.
Figure 22A:
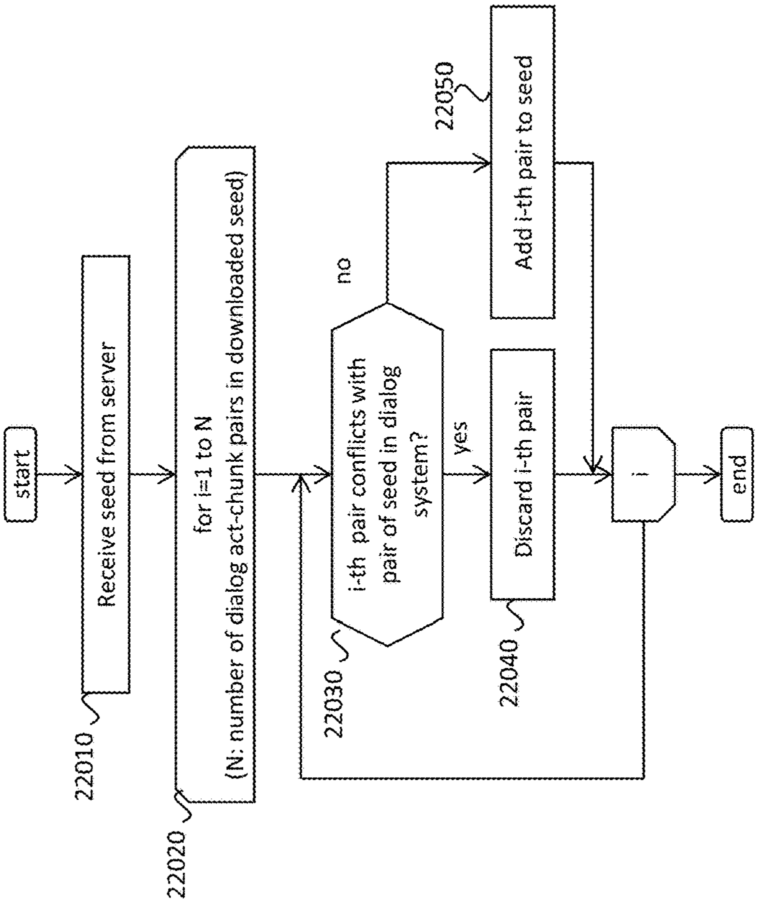

The updated NLU models in the server by the methods of FIG. 25 and FIG. 26 can be downloaded to each dialog system. FIGS. 22(*a*) and 22(*b*) illustrate an example procedure of updating NLU models in the dialog system when it receives the updates from the server, in accordance with an example implementation.

The case where FST-based NLU is used is shown in 22010-22050 of FIG. 22(*a*). Firstly, the dialog system receives the updated seed in the server (22010). Then, the system refers all the dialog act-chunk pairs in the updated seed (22020). If a dialog act-chunk pair in the updated seed conflicts with the dialog act-chunk pair in the dialog system (22030) (yes), the dialog act-chunk pair in the updated information is discarded and not used to update the seed in the dialog system (22040). If the dialog act-chunk pair in the updated seed does not conflict with the seed in the dialog system (no), it is used as the new dialog act-chunk pair in the seed of the dialog system (22050). Conflict detection can be conducted as follows: (1) check whether there are any dialog act-chunk pairs in the dialog system having the same chunk (words) as the dialog act-chunk pair in the updated seed, (2) if the pair exists, check whether the dialog acts are the same between the dialog act-chunk pairs in the dialog system and the updated seed, (3) if the dialog acts are not the same, judge the pair as conflicting.

There is the possibility that the seed in the dialog system was already adapted to the user of the dialog system. In another word, the dialog act-chunk pairs in the seed of the dialog system may contain some NLU rules that the user prefers. Therefore, if such tuples in the dialog system are overwritten, the user experience may decline because the frequent utterances of the user may not be understood by the dialog system from the timing of this update. Therefore, the system checks the confliction of the updated seed against the seed of the dialog system. Then, the system adds the dialog act-chunk pairs in the updated seed to the NLU models in the dialog system only if the pair does not conflict to the seed of the dialog system.

The case where RNN-based NLU is used is shown in 22510-22550 for FIG. 22(*b*). Firstly, the dialog system downloads the NLU models from the server (22510). Then, the dialog system generates test data (22515) by the same manner as 21005. As mentioned in the example implementations above, the dialog system can make the test data from the dialog history or any other data sources. Each of the test data can include the utterance and correct word-level dialog acts. All the utterances in the dialog history can be referred as the test data.

Then, the dialog system refers all the utterances in the test data (22520), and conducts NLU by using downloaded NLU models (22530). If the NLU results are different from ones obtained by using previous NLU models (22540) (yes), then the dialog system judges that the new NLU models causes degradation on the test data. In order to avoid to such the degradation, the dialog system generates special NLU rules (22550).

Suppose that the test data had an utterance of "I'm glad", and the dialog act was thankyou( ). In addition, the NLU process with using previous NLU models can obtain correct dialog acts; The input of "I'm glad" is successfully converted to the dialog act of thankyou( ). Once the NLU models were replaced by ones downloaded from the server, the NLU result changes from thankyou( ) to bye( ) on the utterance of "I'm glad." In such an example, a degradation occurs under 22540. To avoid this degradation, the dialog system adds a special rule to the NLU models. The special rule is to convert the input of "I'm glad" to the dialog act of thankyou( ). This special rule works by referring to the tables storing the special rules. In addition, the NLU results from the special rules overwrites the NLU results obtained from RNN-based algorithm. In this manner, the degradation can be eliminated.

There are several alternative ways to judge "conflicts" in 22030, or "degradation" in 22540. For instance, in the case of the FST-based NLU (22030), if the frequency of that the conflicting dialog act-chunk pair was used in the actual dialogs is small, such a dialog act-chunk pair may be determined not to be important for the user. Therefore, such dialog act-chunk pairs can be overwritten by the downloaded seed. In the case of RNN-based NLU (22540), if the utterance of the degraded test data is rarely uttered in the actual dialog, such test data may be important for the user. Therefore, the utterance in the test data can be ignored. In addition, if the "conflicts" or "degradation" occurred, the user can also be prompted to ensure the user wants special treatment in 22040 or 22550.

In this example implementation, the NLU updating method is conducted by using the feedback information in the server. Such an example implementation can improve NLU accuracy effectively by using a large volume of user feedbacks obtained from various dialog systems. The implementation can also cope with the uncertainty of the user feedback, and use user feedback to update the NLU models taking the uncertainty of the user feedbacks into account.

This example implementation also facilitates user adaptation on the NLU in the dialog system, and improves overall NLU accuracy by using NLU update made by the server.

Figure 27:
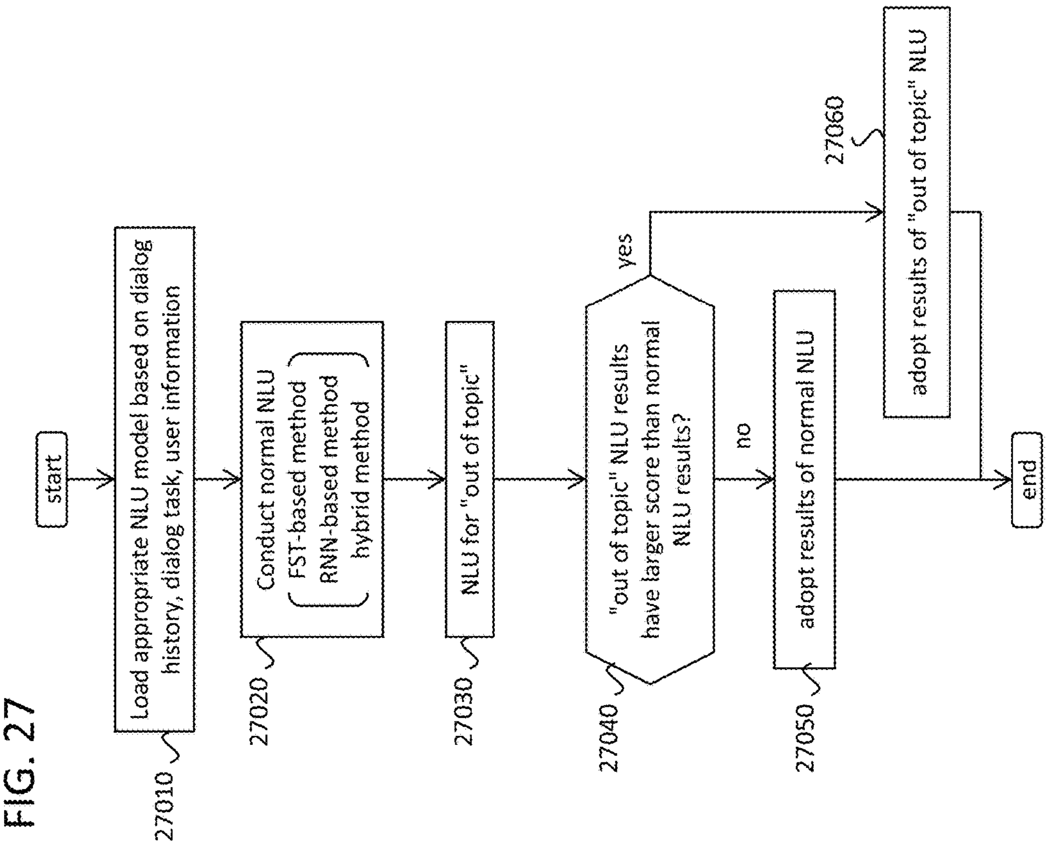
FIG. 27 illustrates a flow for an NLU algorithm combining in-topic NLU and out-of-topic NLU, in accordance with an example implementation.

Seventh Example Implementation: NLU Algorithm Combining in-Topic NLU and Out-of-Topic NLU In a seventh example implementation, there is another NLU algorithm as illustrated in FIG. 27. It alters the process detail on NLU (4030, 10040, 13140) from the example implementations above.

Firstly, the algorithm loads the NLU model based on the user identification result, the current dialog task, and the dialog history (27010). Then, the NLU is conducted by using any of the methods in the example implementations above: FST-based NLU, RNN-based NLU, or hybrid NLU (27020), referred to as "normal NLU."

Then, the system does NLU for "out of topic" dialog (27030). The normal NLU algorithms mentioned in the example implementations above stand on the idea that there are predefined dialog acts. In the actual human-machine dialog, however, it can be impossible to predict and prepare all the dialog acts that the user may utter. Therefore, an alternative NLU method can be prepared that can cope with the utterances for when the normal NLU cannot understand the dialog acts.

Any method to archive out-of-topic dialogs can be used in accordance with the desired implementation. Such methods obtain the input of the user utterance, then output the system utterance. Depending on the desired implementation, the dialog acts do not need to be output.

Figure 29:
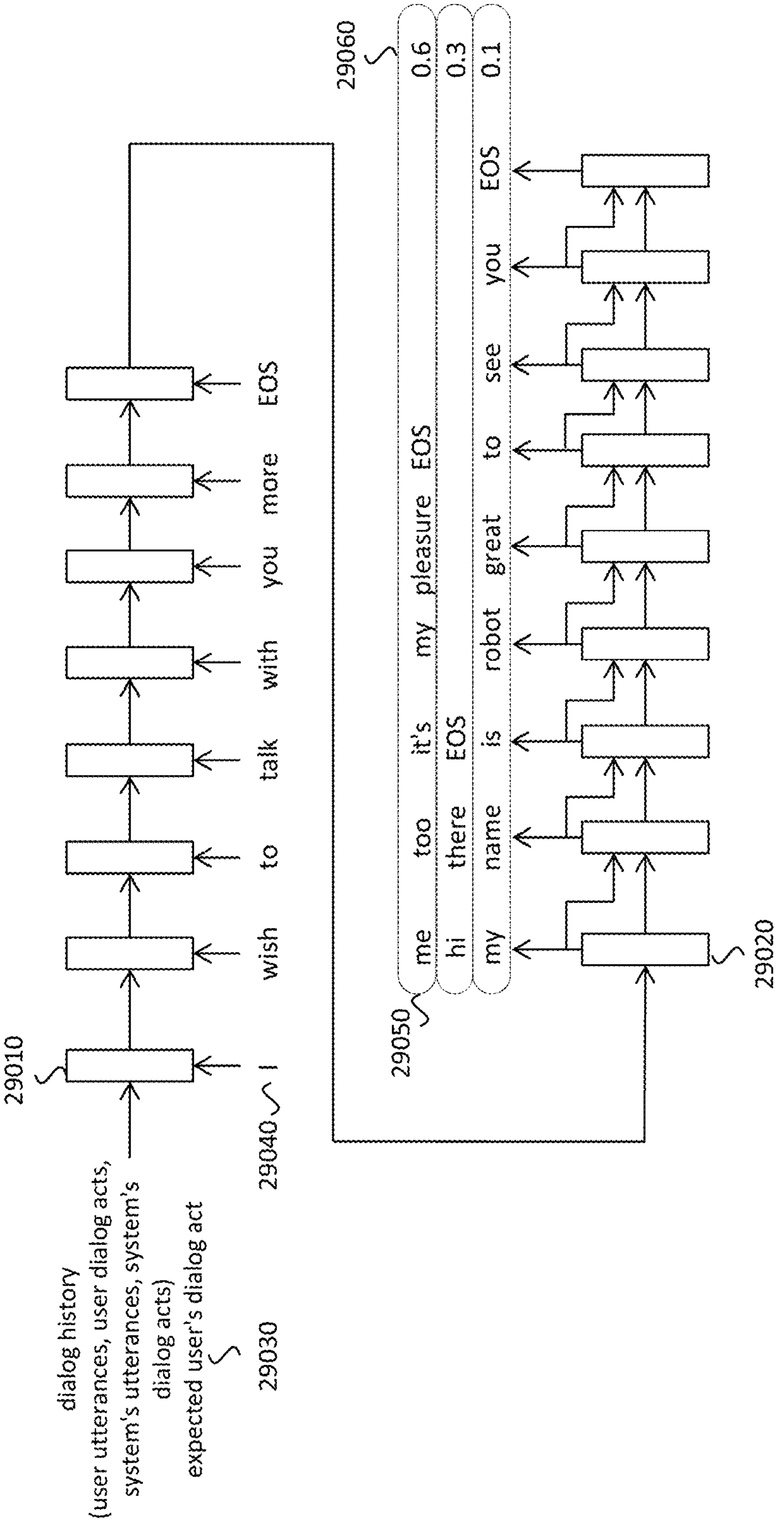
FIG. 29 illustrates an example encoder-decoder model using RNN cells, in accordance with an example implementation.

In this example implementation, the system utterance selection algorithm is utilized, as illustrated in FIGS. 28(*a*), 28(*b*) and FIG. 29. This system utterance selection algorithm stands on the RNN-based conversation model. Other configurations on the RNN structure or other structure of the neural network are also applicable.

This system utterance selection algorithm uses the dialog corpus 28010 of FIG. 28(*a*), which contains the large number of system-user utterance pairs. It is better that the conversation topics in the dialog corpus are related to the target task. However, it is also applicable that the topics of the dialog corpus is different from the topic of the target task.

The dialog corpus is sent to the trainer 28020. It trains the conversation model 28030 from the dialog corpus. In this example implementation, suppose the conversation model is realized by the encoder-decoder model using RNN cells shown in FIG. 29. This model includes the encoder RNN 29010 and the decoder RNN 29020. The encoder RNN receives the words of the user utterance (29040) which can be in the format of the one-hot vectors or the N-hot vectors as mentioned in the example implementations above. In addition, the encoder RNN may receive additional information 29030, which can involve dialog history information (including user utterances, user dialog acts, system utterances, and system dialog acts) and the expected user dialog acts at the current dialog state. The raw information received can be converted to proper vector expression by using other RNNs or other neural networks. The system dialog act is the semantic expression indicating what the dialog system wants to express to the user by outputting a system utterance. For instance, the system utterance of "What kind of food would you like?" has the dialog act of request(slot=food).

The conversation model is trained so as to output the "system" utterance in the dialog corpus when it receives the "user" utterance in the dialog corpus with the additional information mentioned at 29030. Suppose there is a situation where the additional information 29030 is not available because the annotation on the dialog corpus is not complete, or the dialog corpus is obtained from a different task from the target task. In that case, the conversation model can be trained without the additional information. If a part of the dialog corpus has the additional information and other parts have no additional information, then the conversation model can be trained in two steps: pretraining and fine-tuning. In the pretraining step, the model is trained by using the data with no additional information. In the fine-tuning step, the pretrained model is trained further by using the data with the additional information.

The trained conversation model is used for the out-of-topic NLU to generate the system utterance. The procedure of the out-of-topic NLU is shown in FIG. 28(*b*), 28510-28560. Firstly, the dialog system already has the user utterance 28510 and the dialog history 28520. The dialog history may have the corresponding system dialog act and the user dialog act (not in the figure). These are input to the sentence generator 28530 using the conversation model 28540. The sentence generator is realized by the encoder-decoder RNN model shown in FIG. 29. By inputting the user utterance and the additional information to the sentence generator, the model generates the sentence from the decoder RNN 29020. The dialog system can adopt the generated sentence as the system utterance. However, in this example implementation, there is a method that the sentence generator is used to choose most suitable system utterances from the predefined candidates of system utterances. The sentence generation methods using encoder-decoder RNN may have a disadvantage in that the developer cannot control the output sentences that the encoder-decoder RNN generates. Such situations can result in the dialog system providing improper system utterances. Therefore, example implementations utilize the model for choosing one sentence from a bunch of sentences which are properly vetted. The candidates of the system utterances are shown in 28550. The network structure of RNN is not limited to FIG. 29. For example, input information 29030 can be input not only to the encoder RNN 29010 and to the decoder RNN 29020.

To determine which sentence the system should choose form 28550, the system calculates the probability when the decoder RNN generates one of the sentences in 28550 given the user utterance and the additional information. The example of FIG. 29 shows that the sentence of "Me too! It's my pleasure" (29050) has the possibility of 0.6 (29060) which is the largest possibility in the candidates of system utterances. Therefore, the "out-of-topic" NLU 27030 outputs the generated system utterance 28560 which is "Me too! It's my pleasure."

In this moment, the dialog system has the results of normal NLU and out-of-topic NLU. Then, the system determine which NLU results should be adopted. It is done by comparing the score of NLU results (27040). The score of the normal NLU is determined by the methods in the embodiments above. The score of the out-of-topic NLU is determined by using the probability of generation of the sentence as mentioned at 29060. The score of the out-of-topic NLU may be adjusted by the number of words of the system utterance. In addition, the score of the out-of-topic NLU can be adjusted by incorporating some metrics such as the possibility that the user makes out-of-topic utterances in the current dialog state.

Then, if the score of the out-of-topic NLU result are larger than the score of the normal NLU result, it adopts the result of the out-of-topic NLU (27060). Otherwise, it adopts the result of the normal NLU (27050).

When the out-of-topic NLU results are adopted, the following behavior of the dialog system is as follows. The output of the out-of-topic NLU is the system utterance. Therefore, it is not necessary to utilize coping processes with the dialog acts which the normal NLU outputs. For example, should the NLU in 4030 output the out-of-topic NLU result, the dialog system then jumps to the process of 4120 where it makes actions. At this process, dialog system outputs the system utterance using the speech synthesis corresponding to the output sentence of the out-of-topic NLU.

When the out-of-topic NLU results are adopted, the next dialog state is not determined yet. There are several alternatives to determine the next state on the dialog scenario. First, it is possible that no dialog state transition occurs whenever the out-of-topic NLU result was adopted. Second, it is also possible that the dialog scenario has the definition of the next dialog state when the out-of-topic NLU result is adopted. It is also possible that the next dialog state is defined depending on the system utterance that are adopted by the out-of-topic NLU. Lastly, if the suitable dialog corpus can be prepared, it is possible to make encoder-decoder RNN model where the decoder RNN outputs not only the words of the system utterance but also any other information such as the next dialog state, the next expected dialog acts of the user, and so on. By utilizing the RNN model trained in such a way, the next state can be determined on the dialog scenario when the out-of-topic NLU result was adopted.

This example implementation shows an alternative NLU algorithm which can not only understand a user utterance that intends predefined dialog acts, but also a user utterance which show an intent that the developer did not expect to be said by the user. It improves the robustness of the system utterance against the variety of the user utterances and the variety of user intents.

Eighth Example Implementation: System Utterance Conversion

In an eighth example implementation, system utterances are converted. The purpose of the sentence conversion is to generate a variety of the system utterances from a fixed system utterance stored in the dialog scenario.

FIGS. 30(*a*) and 30(*b*) illustrate the processes of the utterance conversion, in accordance with an example implementation. To realize the utterance conversion, the utterance conversion model 30030 is trained from the utterance-to-utterance corpus 30010 and the trainer 30020 (30005) as shown in FIG. 30(*a*). The utterance-to-utterance corpus for the training is shown in FIG. 31. The utterance-to-utterance corpus includes the regular utterance (31010), the system dialog act (31020), and the rewritten utterance (31030). The regular utterances are the utterances which have the similar characteristics to the system utterances in the dialog scenario: It means that the regular utterances usually have concise, clear, and formal expressions or grammars. The rewritten system utterances have the sentence having the same meanings as the corresponding regular utterance. The rewritten utterances are supposed to have more variety of the expressions (e.g. familiar expressions, informal words) than the regular utterances. The system dialog act indicates the dialog act of the corresponding regular utterance and the rewritten utterance.

There are several ways to make the utterance-to-utterance corpus. One possible way is that the human developer first makes the regular utterances, then manually makes the rewritten utterances by thinking of alternative expressions of each of the regular utterances. Another way is that firstly a lot of sentences are gathered from the dialog corpus, Web resources, or any other information sources. The gathered sentences are used as the rewritten utterances. Then, the regular utterances will be made by simplifying the gathered sentences. The simplification of the sentences can be done by any desired implementation, such as an integer linear programming approach.

Figure 32:
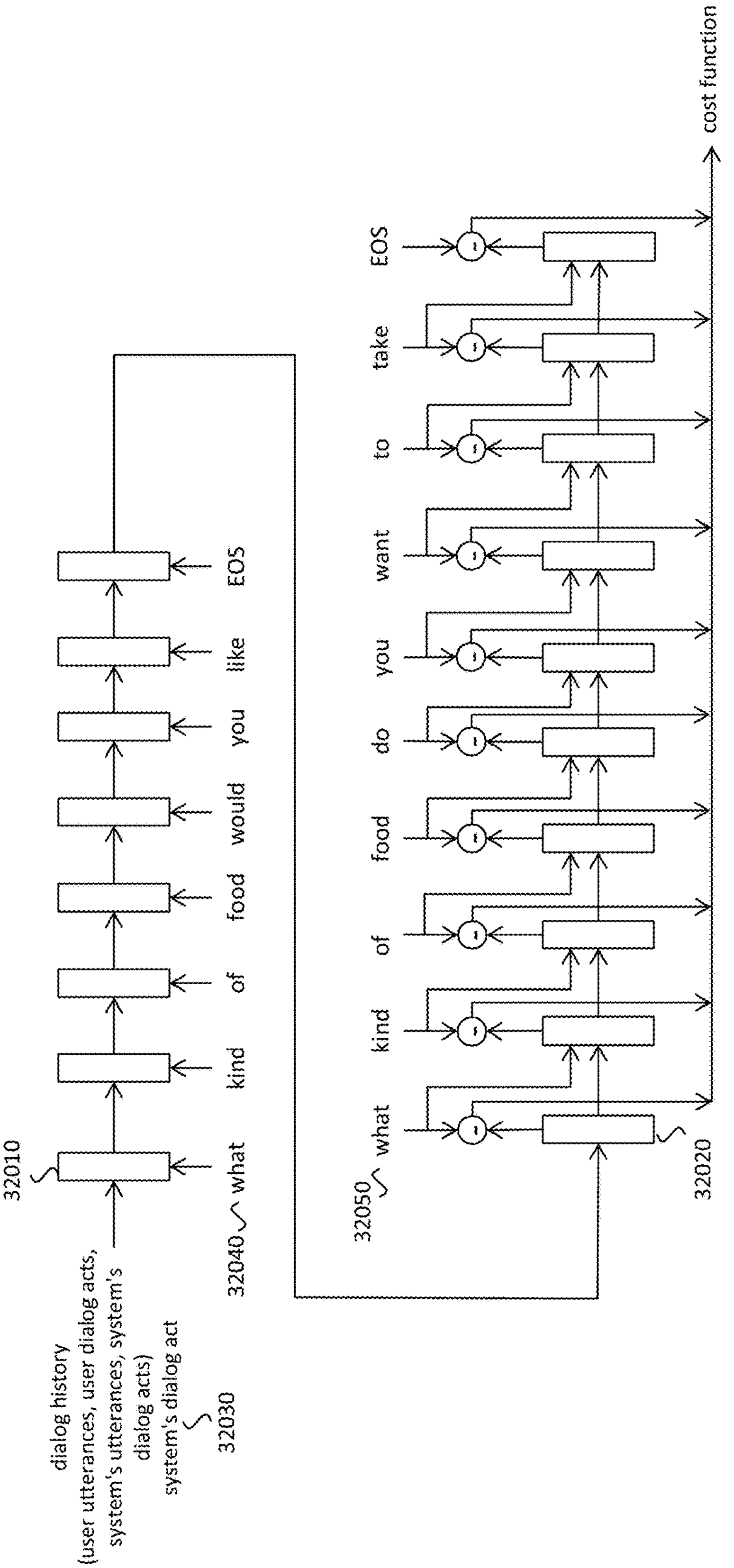
FIG. 32 illustrates an example utterance conversion model, in accordance with an example implementation.

The detail of the utterance conversion model is shown in FIG. 32. It is implemented by the encoder-decoder RNN models. The encoder RNN 32010 takes the regular utterances as its input (32040). It also takes the input of the additional information 32030: which can involve dialog history information and the system dialog act specified in the utterance-to-utterance corpus. Given that inputs, the RNN cells are trained so as to output the rewritten utterances (32050) from the decoder RNN (32020). The network structure of RNN is not limited to FIG. 32. For example, input information 32030 can be input not only to the encoder RNN 32010 and to the decoder RNN 32020. The additional information 32030 can include information of user status: engagement on the ongoing conversation, emotion status, or user's personality, estimated by information such as user's face, posture, movement and speech.

The trained utterance conversion model (30540) is used by the system utterance converter (30530) to convert the sentence in the dialog scenario (30510) to a converted system utterance (30550). The system utterance converter (30530) also receives the system dialog act (30515) the dialog history (30520) as the input. The dialog history may have the corresponding system dialog act and the user dialog act (which is not drawn in the figure). The converted system utterance (30550) is then output from the dialog system to the user.

When the utterance-to-utterance corpus is made from dialogs from tasks that are different than the target tasks, it can be difficult to choose a proper system dialog for each utterance from the dialog acts in the target task. One alternative way is to use general dialog acts. If the general dialog acts are utilized, it is possible to determine the dialog acts on the utterance in automatic way. Although such general dialog acts are different from the dialog acts defined for the target task, the usual dialog control basically utilizes the task-specific dialog acts, and the sentence refiner basically utilizes the general dialog acts: It means that one system utterance should have two types of the dialog acts.

This example implementation showed a way to convert system utterances to improve the quality of the expression. The most of previous dialog systems output the fixed system utterances registered in the dialog scenario. The system utterances are fixed ones so that the user gets to feel bored impression on the conversation with the dialog system. This example implementation provides refinement methods of system utterances, and facilitates the creation of a variety of the system utterances from the fixed system utterance in the dialog scenario. Therefore, such an example implementation achieves more natural and more attractive conversation for the users.

Ninth Example Implementation: User Dialog Act Prediction

In this example implementation, there is an alternative way of the prediction of the user dialog acts in a dialog state. The original process of that is shown in 9130 in FIG. 9. This process is replaced by the method described in the following example implementation.

Figure 33:
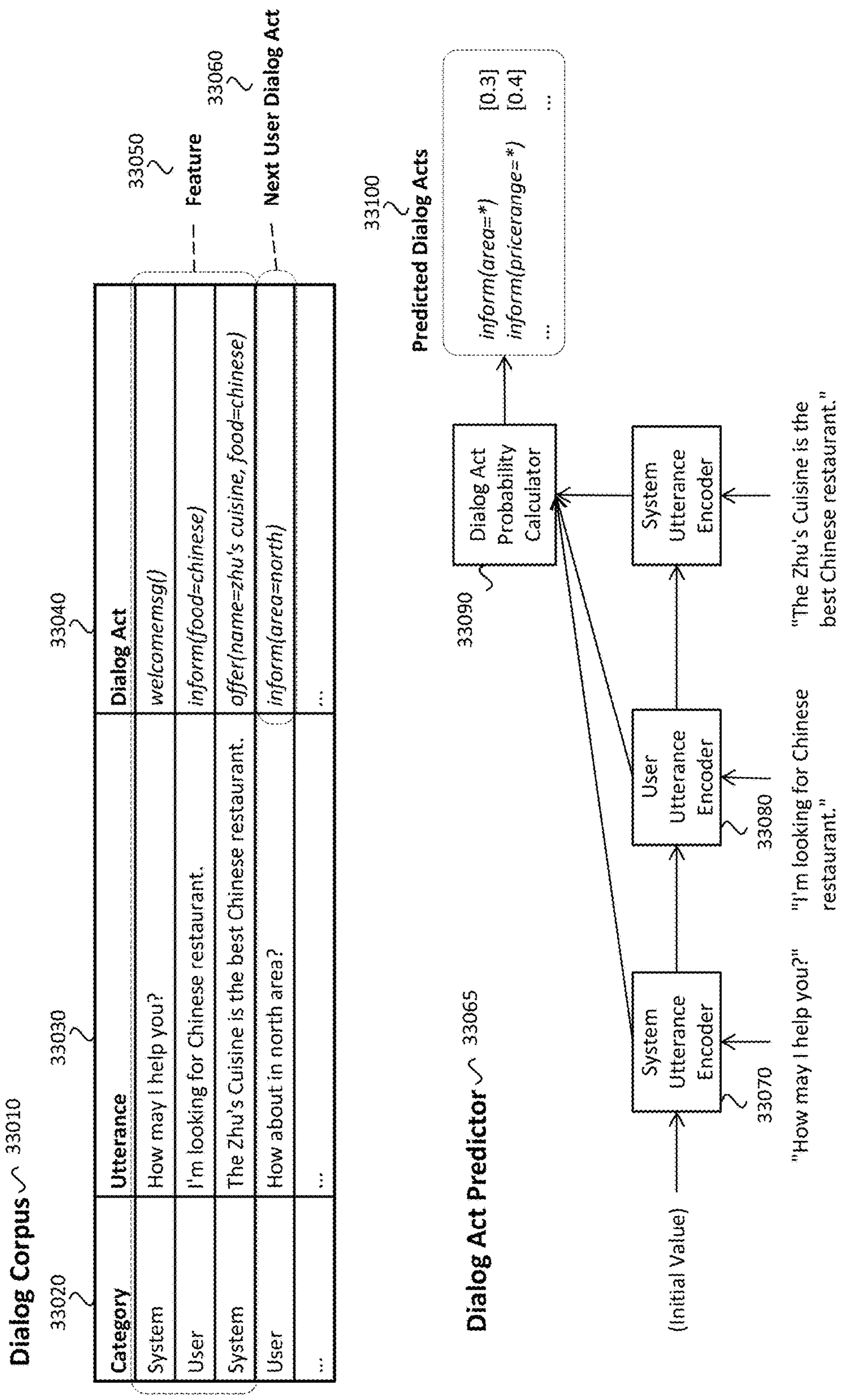
FIG. 33 illustrates the procedure to predict the user dialog acts, in accordance with an example implementation.

FIG. 33 illustrates the procedure to predict the user dialog acts, in accordance with an example implementation. The dialog act prediction in this example implementation utilizes a machine learning method. Firstly, the dialog corpus is prepared as shown in 33010. The dialog corpus includes the system utterances, user's utterances, and the corresponding dialog acts. The system utterances are shown in 33030 with the category 33020 of "system." The user utterances are shown in 33030 with the category 33020 of "user." The dialog acts of each utterance are shown in 33040. This dialog corpus can be made from the dialog histories stored in the dialog system or the server.

The objective of the dialog act predictor is that, given the dialog history, the dialog act predictor predicts the next dialog act of the user. Therefore, the training process of the dialog act predictor takes the dialog history shown in 33050 as the input features, then trains the model so as to output user's next dialog act 33060.

The form of the dialog act predictor is shown in 33065. The dialog act predictor includes the system utterance encoder 33070, the user utterance encoder 33080, and the dialog act probability calculator 33090. The system utterance encoder and the user utterance encoder receive the system utterance or the user utterance as input respectively. Then the input utterance will be encoded. If these encoders are implemented by RNN, the encoding process preserves the input information as the hidden layer values. Finally, the outputs 33100 of these encoders are sent to the dialog act probability calculator. The dialog act probability calculator calculates the probabilities of the user dialog acts in terms of the possibility that the dialog acts appears at next. The components of the dialog act predictors are implemented by various forms of the neural networks.

The method of prediction of the next user dialog acts uses machine learning based algorithm. Therefore, when a large amount of the dialog corpus is prepared, the dialog act prediction with high accuracy can be achieved.

Figure 34:
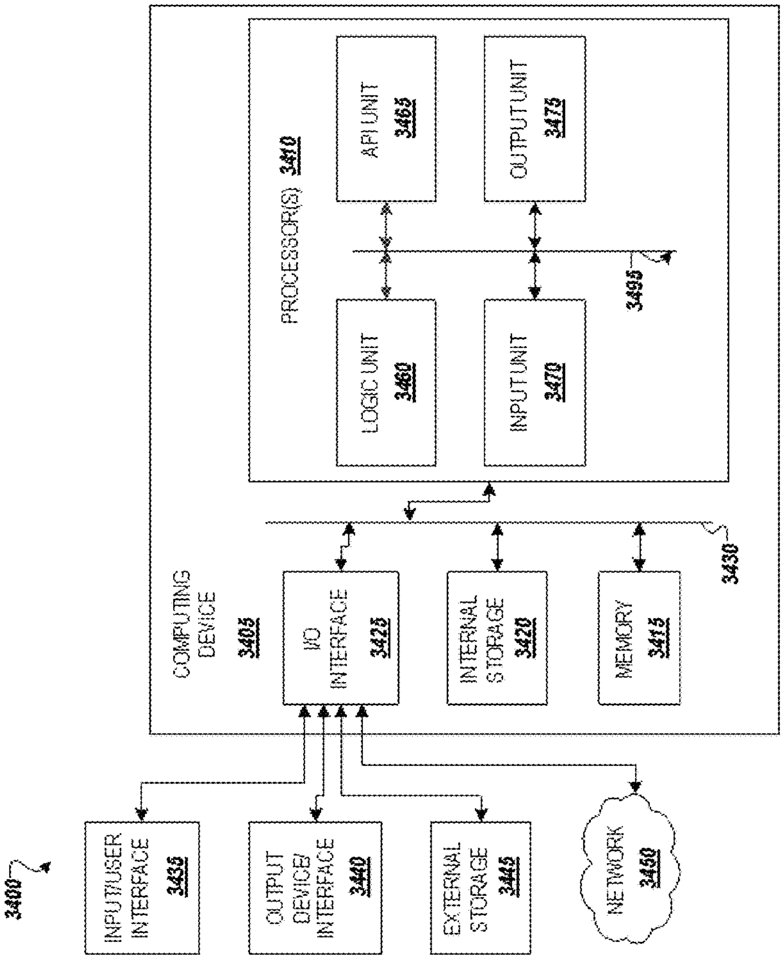
FIG. 34 illustrates an example computing environment with an example computer device suitable for use in some example implementations.

FIG. 34 illustrates an example computing environment with an example computer device suitable for use in some example implementations, such as a client device or server facilitated to implement the functions of the dialog system as illustrated in FIG. 1 and FIG. 3.

Computer device 3405 in computing environment 3400 can include one or more processing units, cores, or processors 3410, memory 3415 (e.g., RAM, ROM, and/or the like), internal storage 3420 (e.g., magnetic, optical, solid state storage, and/or organic), and/or I/O interface 3425, any of which can be coupled on a communication mechanism or bus 3430 for communicating information or embedded in the computer device 3405.

Computer device 3405 can be communicatively coupled to input/user interface 3435 and output device/interface 3440. Either one or both of input/user interface 3435 and output device/interface 3440 can be a wired or wireless interface and can be detachable. Input/user interface 3435 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 3440 may include a display, television, monitor, printer, speaker, braille, or the like. In some example implementations, input/user interface 3435 and output device/interface 3440 can be embedded with or physically coupled to the computer device 3405. In other example implementations, other computer devices may function as or provide the functions of input/user interface 3435 and output device/interface 3440 for a computer device 3405.

Examples of computer device 3405 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 3405 can be communicatively coupled (e.g., via I/O interface 3425) to external storage 3445 and network 3450 for communicating with any number of networked components, devices, and systems, including one or more computer devices of the same or different configuration. Computer device 3405 or any connected computer device can be functioning as, providing services of, or referred to as a server, client, thin server, general machine, special-purpose machine, or another label.

I/O interface 3425 can include, but is not limited to, wired and/or wireless interfaces using any communication or I/O protocols or standards (e.g., Ethernet, 802.11 x, Universal System Bus, WiMax, modem, a cellular network protocol, and the like) for communicating information to and/or from at least all the connected components, devices, and network in computing environment 3400. Network 3450 can be any network or combination of networks (e.g., the Internet, local area network, wide area network, a telephonic network, a cellular network, satellite network, and the like).

Computer device 3405 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 3405 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 3410 can execute under any operating system (OS) (not shown), in a native or virtual environment. One or more applications can be deployed that include logic unit 3460, application programming interface (API) unit 3465, input unit 3470, output unit 3475, and inter-unit communication mechanism 3495 for the different units to communicate with each other, with the OS, and with other applications (not shown). The described units and elements can be varied in design, function, configuration, or implementation and are not limited to the descriptions provided.

In some example implementations, when information or an execution instruction is received by API unit 3465, it may be communicated to one or more other units (e.g., logic unit 3460, input unit 3470, output unit 3475). In some instances, logic unit 3460 may be configured to control the information flow among the units and direct the services provided by API unit 3465, input unit 3470, output unit 3475, in some example implementations described above. For example, the flow of one or more processes or implementations may be controlled by logic unit 3460 alone or in conjunction with API unit 3465. The input unit 3470 may be configured to obtain input for the calculations described in the example implementations, and the output unit 3475 may be configured to provide output based on the calculations described in example implementations.

Figure 35:
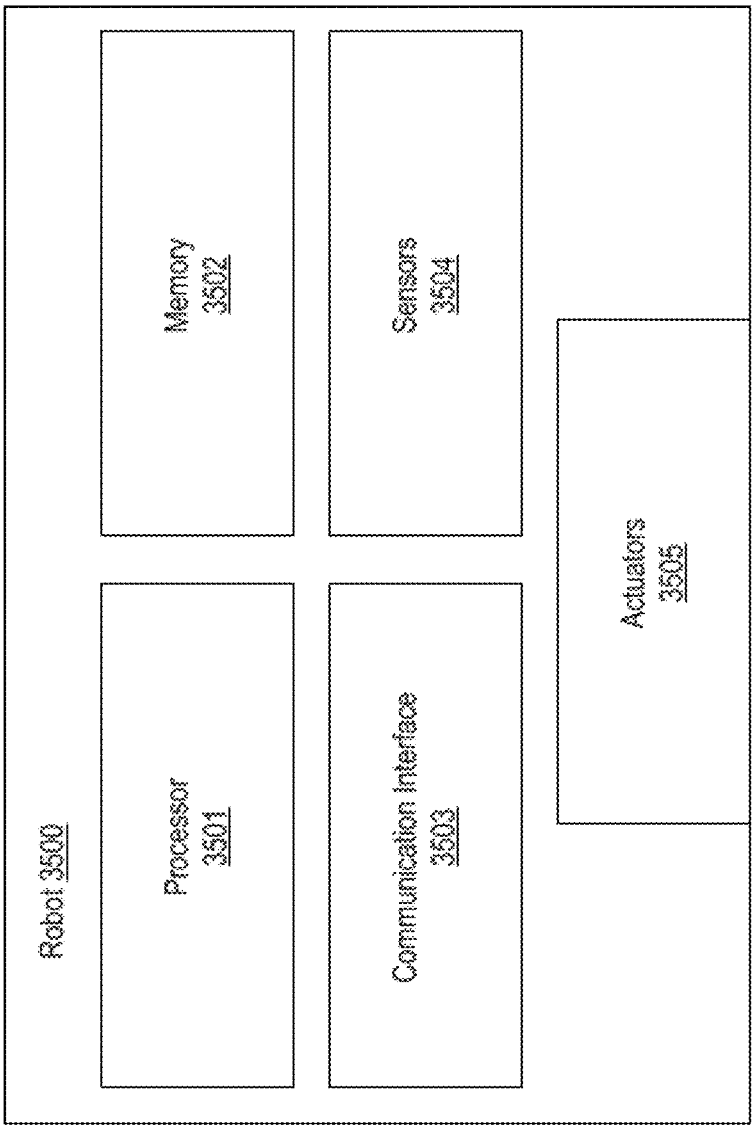
FIG. 35 illustrates an example hardware diagram for a client device, such as a robot, in accordance with an example implementation.

FIG. 35 illustrates an example hardware diagram for a client device, such as a robot, in accordance with an example implementation. In an implementation involving a robot 3500, the robot 3500 may be configured to interact with users via speech or text input and may include a processor 3501, a memory 3502, a communication interface 3503, one or more sensors such as a camera 3504, and one or more actuators 3505. Memory 3502 may store instructions that can be loaded into processor 3501 to execute the flow diagrams as described herein. Communication interface 3503 may be configured to interact with a server as described in FIG. 3 through a baseband processor, and can also provide a local communication interface, such as a display or a speaker to output dialog acts in the form of speech or displayed text depending on the desired implementation. Sensors 3504 can include a microphone for taking speech from a user as input that is converted to an input dialog, or can involve other input devices such as keyboards or touch interfaces configured to receive textual input. Actuators 3505 can be configured to actuate parts of the robot 3500 (e.g., arms, legs, wheels, etc.) which can be synchronized to the output speech or text in accordance with the desired implementation.

Example implementations can involve systems, computer-readable mediums, and methods for a dialog system as illustrated in FIG. 1, which includes a client device configured with a text input method to receive user input such as illustrated in FIGS. 34 and 35, and a first natural language understanding (NLU) model configured to communicate with the server as illustrated in FIG. 1, the user input involving at least one of text input typed by the user or Automatic Speech Recognition (ASR) output obtained from the user speech as described in FIG. 4(*a*), and a server including a second NLU model as illustrated in FIG. 3, wherein the first NLU model and the second NLU model are different. Such methods can include determining NLU results of an input dialog at the client device from applying the first NLU model; for a confidence score or value of the NLU results obtained from applying the first NLU model not meeting a threshold, having the client device access the server to execute an NLU process by using the second NLU model on the input dialog; and for the confidence score or value of the NLU results obtained from applying the first NLU model meeting the threshold, having the client device execute actions based on the NLU results obtained from applying the first NLU model as illustrated, for example in FIG. 4(*a*).

Example implementations can also involve having the client device access the server to execute the NLU process only for when the NLU results obtained by applying the first NLU model are elicited from a number of words in the input dialog falling below another threshold, and the NLU results are fewer than a number of NLU outputs expected in a dialog state of the input dialog; wherein the NLU outputs expected are determined from a dialog scenario associated with the input dialog as illustrated, for example, in FIGS. 4(*a*) and 4(*b*).

Example implementations can also involve comparing dialog acts in the NLU results of the client device with dialog acts obtained in NLU results of the server for conflicts; and for the comparing indicative of conflicts, discarding conflicting dialog acts having a lower confidence score as illustrated in FIG. 11.

Example implementations can also involve adopting the NLU results of the client device having a higher confidence score or value than a first threshold; for the NLU results having a lower confidence score or value than the first threshold and a higher confidence score or value than a second threshold, conducting a confirmation dialog to confirm the NLU results; and for the NLU results having a lower confidence score or value than the second threshold, discarding the NLU results as illustrated in FIG. 8. In such an example implementation, the confirmation, the adopting, and the discarding can be done based at least one of: whether dialog acts of the NLU results were derived from semantic space, whether the dialog acts were obtained from the server, and whether the dialog acts and phrase pair are associated with a true fixed flag referred from a dialog act-chunk information as described in FIG. 8. The conducting the confirmation dialog can also involve querying whether an extracted dialog act is correct; and creating feedback tuples in response, the creating the feedback tuples involving in response to the querying that the extracted dialog act is correct, associating a pair comprising the dialog act and a corresponding phrase with positive feedback, in response to the querying that the extracted dialog act is incorrect, associating the pair of the dialog act and the corresponding phrase with negative feedback; utilizing the feedback tuples to update dialog act-chunk information, the utilizing the feedback tuples involving: for the feedback tuples associated with the positive feedback, incrementing a positive feedback value in the dialog act-chunk information, for the feedback tuples associated with negative feedback, incrementing a negative feedback value in the dialog act-chunk information; and for a fixed flag indicative of being false for a dialog-act chunk pair, calculating a relevance value of the dialog act-chunk pair as a ratio of the positive feedback value to the negative feedback value as illustrated in FIGS. 6, 8, 11 and 14.

In example implementations, the conducting the confirmation dialog to confirm the NLU results can involve for a confirmation response having a confidence score or value below another threshold, requesting from the client device to the server to execute the NLU process for the confirmation response by applying the second NLU model in the server as illustrated in FIG. 4(*a*) or FIG. 4(*b*).

In example implementations, the conducting the confirmation dialog to confirm the NLU results can involve evaluating, from at least one of the client and the server, a confidence score or value based on a response to the confirmation dialog, wherein a value of the incrementing of the positive feedback and the negative feedback is determined based on the confidence score as illustrated, for example, in FIGS. 6-14.

Example implementations can also involve collecting, at the server, feedback from the client device; generating, at the server, NLU update information; providing the NLU update information to the client device; and updating the first NLU model from the NLU information, the updating involving executing the updating at the client device such that degradation of NLU accuracy is prevented through checking at least one of: conflicting NLU updates against the first NLU model and checking the accuracy on test data from applying the NLU update information as illustrated in FIG. 21.

Example implementations can also involve, for the execution of the NLU process by using the second NLU model on the input dialog, providing the NLU results obtained from the NLU process from the server to the client device, registering the provided NLU results to the first NLU model such that the first NLU model is configured to output the provided NLU results without accessing the server in response to the input dialog as illustrated in FIGS. 4(*a*) and 4(*b*).

In example implementations, the first NLU model and the second NLU model can be generated from a Finite State Transducer (FST)-based algorithm where phrases in the input dialog are mapped on a FST and arcs in the FST are tied with a corresponding dialog act and a weight based on dialog act-chunk pair information; wherein the determining NLU results of the input dialog from applying the first NLU model or the second NLU model can involve conducting a shortest path search on the FST; and outputting dialog acts along one or more paths of the shortest path search for a summation of the weight being below another threshold as illustrated in FIGS. 5-7, 11, 15 and 16. The arcs in the FST comprises dialog acts can be based on a semantic distance between a phrase in the input dialog and already-known phrases in the dialog act-chunk pair information as illustrated in FIGS. 5-7, 16 and 17.

In example implementations, the dialog act-chunk pairs information can involve relevance scores, positive feedback, negative feedback, voting count, and fixed flags; the relevance scores is utilized to determine the weights in the FST arcs, the positive feedback is incremented in response to positive feedback responses to a confirmation dialog, the negative feedback is incremented in response to negative feedback responses to the confirmation dialog, the voting count stores feedback frequency, the fixed flags are predefined and indicative of whether a corresponding dialog act-chunk pair is not allowed to be modified in further process and configured to be changed from false to true when the voting count is larger than a voting count threshold and the relevance value is higher than a relevance threshold or is lower than a relevance threshold as described in FIGS. 7-14.

In example implementations, the first NLU model and the second NLU model are generated from a training algorithm configured to conduct a sequence labeling method utilizing machine learning; wherein the first NLU model and the second NLU model are trained by using training data involving sentences and associated dialog acts for at least one of each word in the sentences and each sentence as described in FIG. 17 or 26. Individual words and sentences may be associated with zero dialog acts, or can be associated with one or more dialog acts.

Example implementations can further involve providing a confirmation dialog configured to prompt whether an extracted dialog act is correct; creating feedback training data based on a response to the confirmation dialog that is added to the training data for the NLU algorithm training, the creating the feedback training data involving for the response to the confirmation dialog being positive, labelling a corresponding phrase with the extracted dialog act; and for the response to the confirmation dialog being negative, labelling the corresponding phrase to not generate the extracted dialog act as described in various implementations from FIGS. 3 to 36.

In example implementations, the text input can involve one or more candidates of sentences input that is converted to a confusion network, and the method further involves converting the confusion network to a first FST at which weights of arcs are determined based on word confidence; and converting dialog act-chunk information to a second FST which receives word input and outputs dialog acts; wherein the NLU process involves composing the first FST derived from the text input and the second FST derived from the dialog act-chunk information as illustrated in FIGS. 20-24. Depending on the desired implementation, the machine learning algorithm can be a recurrent neural network (RNN) configured to receive an input involving one or more candidates of words and output dialog acts corresponding to the input as illustrated in FIGS. 17 and 18(*a*) to (*b*).

In example implementations, the first NLU model and the second NLU model are associated with an NLU algorithm that is a combination of a finite state transducer (FST) based algorithm and a sequence labeling algorithm as illustrated in FIGS. 17 to 26.

In example implementations, each of the first NLU model and the second NLU model involves out-of-topic NLU that is trained by a dialog corpus and configured to receive at least one of dialog history information and the input dialog; and output system utterances; wherein for the outputs having a larger confidence than other NLUs configured in the first NLU model and the second NLU model, the system utterances output by the out-of-topic NLU are adopted as illustrated in FIGS. 4(*a*), 4(*b*) and 27. In such example implementations, the out-of-topic NLU can be configured to choose one confident system utterance within pre-defined list of the system utterance based on the output probability of each system sentence from the out-of-topic NLU model.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for a dialog system comprising a client device configured with a text input method to receive user input, and a first natural language understanding (NLU) model configured to communicate with a server, the user input involving at least one of text input typed by the user or Automatic Speech Recognition (ASR) output obtained from the user speech, and wherein the server manages a second NLU model, wherein the first NLU model and the second NLU model are different, the method comprising:

determining NLU results of an input dialog at the client device from applying the first NLU model;

determining a confidence score for the NLU results;

for the confidence score of the NLU results obtained from applying the first NLU model not meeting a threshold, having the client device access the server to execute an NLU process by using the second NLU model on the input dialog; and for the confidence score of the NLU results obtained from applying the first NLU model meeting the threshold, having the client device execute actions based on the NLU results obtained from applying the first NLU model;

wherein the first NLU model and the second NLU model are generated from a training algorithm configured to conduct a sequence labeling method utilizing machine learning;

wherein the first NLU model and the second NLU model are trained by using training data comprising sentences and associated dialog acts for at least one of each word in the sentences and each sentence.

2. The method according to claim 1, wherein the having the client device access the server to execute the NLU process is conducted only for when a number of words in the input dialog that were used to elicit the NLU results from applying the first NLU model falls below another threshold, and a number of NLU outputs is fewer than expected in a dialog state of the input dialog; wherein the NLU outputs expected are determined from a dialog scenario associated with the input dialog.

3. The method according to claim 1, further comprising:

comparing dialog acts in the NLU results of the client device with dialog acts obtained in NLU results of the server for conflicts;

wherein the determining the confidence score for the NLU results comprises determining the confidence score for the dialog acts in the NLU results and for the dialog acts obtained in the NLU results of the server;

for the comparing indicative of conflicts, discarding conflicting dialog acts having a lower confidence score.

4. The method according to claim 1, further comprising:

adopting the NLU results of the client device having the confidence score higher than a first threshold;

for the NLU results having the confidence score lower than the first threshold and higher than a second threshold, conducting a confirmation dialog to confirm the NLU results; and for the NLU results having the confidence score lower than the second threshold, discarding the NLU results.

5. The method according to claim 4, wherein the confirmation, the adopting, and the discarding are done based on one of:

whether dialog acts of the NLU results were derived from semantic space, whether the dialog acts were obtained from the server, whether the dialog acts and phrase pair are associated with a true fixed flag referred from a dialog act-chunk information.

6. The method according to claim 4, wherein the conducting the confirmation dialog comprises:

querying whether an extracted dialog act is correct;

creating feedback tuples in response, the creating the feedback tuples comprising:

in response to the querying that the extracted dialog act is correct, associating a pair comprising the dialog act and a corresponding phrase with positive feedback, in response to the querying that the extracted dialog act is incorrect, associating the pair of the dialog act and the corresponding phrase with negative feedback;

utilizing the feedback tuples to update dialog act-chunk information, the utilizing the feedback tuples comprising:

for the feedback tuples associated with the positive feedback, incrementing a positive feedback value in the dialog act-chunk information, for the feedback tuples associated with negative feedback, incrementing a negative feedback value in the dialog act-chunk information; and for a fixed flag indicative of being false for a dialog-act chunk pair, calculating a relevance value of the dialog act-chunk pair as a ratio of the positive feedback value to the negative feedback value.

7. The method according to claim 6, wherein the conducting the 1 confirmation dialog to confirm the NLU results comprises:

for a confirmation response having a confidence score below another threshold, requesting from the client device to the server to execute the NLU process for the confirmation response by applying the second NLU model in the server.

8. The method according to claim 6, wherein the conducting the confirmation dialog to confirm the NLU results comprises:

evaluating, from at least one of the client and the server, a confidence score based on a response to the confirmation dialog, wherein a value of the incrementing of the positive feedback and the negative feedback is determined based on the confidence score.

9. The method according to claim 4, further comprising:

collecting, at the server, feedback from the client device;

generating, at the server, NLU update information;

providing the NLU update information to the client device; and updating the first NLU model from the NLU information, the updating comprising executing the updating at the client device such that degradation of NLU accuracy is prevented through checking at least one of: conflicting NLU updates against the first NLU model and checking the accuracy on test data from applying the NLU update information.

10. The method according to claim 1, further comprising:

for the execution of the NLU process by using the second NLU model on the input dialog, providing the NLU results obtained from the NLU process from the server to the client device, registering the provided NLU results to the first NLU model such that the first NLU model is configured to output the provided NLU results without accessing the server in response to the input dialog.

11. A method for a dialog system comprising a client device configured with a text input method to receive user input, and a first natural language understanding (NLU) model configured to communicate with a server, the user input involving at least one of text input typed by the user or Automatic Speech Recognition (ASR) output obtained from the user speech, and wherein the server manages a second NLU model, wherein the first NLU model and the second NLU model are different, the method comprising:

determining NLU results of an input dialog at the client device from applying the first NLU model;

determining a confidence score for the NLU results;

for the confidence score of the NLU results obtained from applying the first NLU model not meeting a threshold, having the client device access the server to execute an NLU process by using the second NLU model on the input dialog; and for the confidence score of the NLU results obtained from applying the first NLU model meeting the threshold, having the client device execute actions based on the NLU results obtained from applying the first NLU model;

wherein the first NLU model and the second NLU model are generated from a Finite State Transducer (FST)-based algorithm where phrases in the input dialog are mapped on a FST and arcs in the FST are tied with a corresponding dialog act and a weight based on dialog act-chunk pair information;

wherein the determining NLU results of the input dialog from applying the first NLU model or the second NLU model comprises:

conducting a shortest path search on the FST; and outputting dialog acts along one or more paths of the shortest path search for a summation of the weight being below another threshold.

12. The method according to claim 11, wherein the arcs in the FST comprises dialog acts based on a semantic distance between a phrase in the input dialog and already-known phrases in the dialog act-chunk pair information.

13. The method according to claim 11, wherein the dialog act-chunk pairs information comprises relevance scores, positive feedback, negative feedback, voting count, and fixed flags;

the relevance scores are utilized to determine the weights in the FST arcs, the positive feedback is incremented in response to positive feedback responses to a confirmation dialog, the negative feedback is incremented in response to negative feedback responses to the confirmation dialog, the voting count stores feedback frequency, the fixed flags are pre-defined and indicative of whether a corresponding dialog act-chunk pair is not allowed to be modified in further process and configured to be changed from false to true when the voting count is larger than a voting count threshold and the relevance value is higher than a relevance threshold or is lower than a relevance threshold.

14. The method according to claim 1, further comprising:

providing a confirmation dialog configured to prompt whether an extracted dialog act is correct;

creating feedback training data based on a response to the confirmation dialog that is added to the training data for the NLU algorithm training, the creating the feedback training data comprising:

for the response to the confirmation dialog being positive, labelling a corresponding phrase with the extracted dialog act; and for the response to the confirmation dialog being negative, labelling the corresponding phrase to not generate the extracted dialog act.

15. The method according to claim 1, wherein the text input comprises one or more candidates of sentences input that is converted to a confusion network, and wherein the method further comprises:

converting the confusion network to a first Finite State Transducer (FST) at which weights of arcs are determined based on word confidence; and converting dialog act-chunk information to a second FST which receives word input and outputs dialog acts;

wherein the NLU process comprises composing the first FST from the text input and the second FST from the dialog act-chunk information.

16. The method according to claim 1, wherein the machine learning algorithm is a recurrent neural network (RNN) configured to receive an input comprising one or more candidates of words and output dialog acts corresponding to the input.

17. The method according to claim 1, wherein the first NLU model and the second NLU model are associated with an NLU algorithm that is a combination of a finite state transducer (FST) based algorithm and a sequence labeling algorithm.

18. The method according to claim 1, wherein each of the first NLU model and the second NLU model comprises an out-of-topic NLU model that is trained by a dialog corpus and configured to:

receive at least one of dialog history information and the input dialog; and output system utterances; wherein for the outputs having a larger confidence than other NLUs configured in the first NLU model and the second NLU model, the system utterances output by the out-of-topic NLU model are adopted.

19. The method according to claim 18, wherein the out-of-topic NLU model is configured to choose one confident system utterance within a pre-defined list of the system utterance based on the output probability of each system sentence from the out-of-topic NLU model.

* * * * *